(12) United States Patent
Mullet et al.

(10) Patent No.: US 9,615,687 B2
(45) Date of Patent: Apr. 11, 2017

(54) ROTATABLE DRIVE ELEMENT FOR MOVING A WINDOW COVERING

(71) Applicant: QMOTION INCORPORATED, Pensacola, FL (US)

(72) Inventors: Willis Jay Mullet, Gulf Breeze, FL (US); Daniel T. Matthews, Pensacola, FL (US); Michael D. Fox, Pensacola, FL (US)

(73) Assignee: Current Products Corp., Pensacola, FL (US)

( * ) Notice: Subject to any disclaimer, the term of this patent is extended or adjusted under 35 U.S.C. 154(b) by 0 days.

(21) Appl. No.: 14/719,438

(22) Filed: May 22, 2015

(65) Prior Publication Data

US 2015/0272370 A1  Oct. 1, 2015

Related U.S. Application Data

(63) Continuation of application No. 14/029,210, filed on Sep. 17, 2013, now Pat. No. 9,095,908.

(Continued)

(51) Int. Cl.
*A47H 5/06* (2006.01)
*B23B 1/00* (2006.01)

(Continued)

(52) U.S. Cl.
CPC ............... *A47H 5/06* (2013.01); *A47H 1/02* (2013.01); *A47H 23/00* (2013.01); *B23B 1/00* (2013.01);

(Continued)

(58) Field of Classification Search
CPC . A47H 5/02; A47H 5/032; A47H 5/06; A47H 5/0325

(Continued)

(56) References Cited

U.S. PATENT DOCUMENTS

| D5,178 S | 8/1871 | Gould |
|---|---|---|
| D22,271 S | 3/1893 | Ruxton |

(Continued)

FOREIGN PATENT DOCUMENTS

| DE | 3402122 | 8/1984 |
|---|---|---|
| JP | 2006304984 | 11/2006 |

(Continued)

OTHER PUBLICATIONS

European Search Report, EP13837043.2, PCT-US2013-060205, dated Jun. 27, 2016.

(Continued)

*Primary Examiner* — Katherine Mitchell
*Assistant Examiner* — Jeremy Ramsey
(74) *Attorney, Agent, or Firm* — Christopher A. Proskey; BrownWinick Law Firm

(57) ABSTRACT

A curtain assembly comprises a rotatable drive element wherein at least one helical guide structure is formed on, or into, the outer surface of the drive element. A drive attachment element having a structure that communicates with the helical guide structure to move the drive attachment element axially along the drive element when the drive element is rotated. Specific embodiments incorporate either a manual or motor-driven rotation assembly for rotating the drive element. Further specific embodiments involve a helical guide structure that comprises a helical groove and a structure that comprises a tooth that engages with the helical groove.

19 Claims, 49 Drawing Sheets

Related U.S. Application Data

(60) Provisional application No. 61/702,093, filed on Sep. 17, 2012.

(51) Int. Cl.
    *A47H 1/02*                 (2006.01)
    *E06B 9/72*                 (2006.01)
    *A47H 23/00*               (2006.01)
    *E06B 9/40*                 (2006.01)
    *B23B 29/26*               (2006.01)
    *B23B 3/00*                 (2006.01)
    *B23B 5/08*                 (2006.01)
    *B23Q 1/76*                 (2006.01)

(52) U.S. Cl.
CPC ............... *B23B 3/00* (2013.01); *B23B 5/08* (2013.01); *B23B 29/26* (2013.01); *B23Q 1/766* (2013.01); *E06B 9/40* (2013.01); *E06B 9/72* (2013.01); *B23B 2215/72* (2013.01); *B23B 2220/12* (2013.01); *B23B 2220/445* (2013.01); *B23B 2260/024* (2013.01); *Y10T 29/49826* (2015.01); *Y10T 82/10* (2015.01)

(58) Field of Classification Search
USPC ........................................................ 160/84.02
See application file for complete search history.

(56) References Cited

U.S. PATENT DOCUMENTS

| | | |
|---|---|---|
| 537,681 A | 4/1895 | Furbish |
| D25,521 S | 5/1896 | Ill |
| D41,567 S | 7/1911 | Rouse |
| 1,509,620 A * | 9/1924 | Taylor .................. B60S 1/18 15/250.26 |
| 1,823,909 A | 9/1931 | Meier |
| 2,801,690 A * | 8/1957 | Bennett ................. A47H 5/06 160/343 |
| 3,208,507 A * | 9/1965 | Breen ................... E06B 9/364 160/168.1 V |
| 3,631,659 A | 1/1972 | Horowitz et al. |
| 3,774,665 A * | 11/1973 | Bourne .................. A47H 5/06 16/87.6 R |
| 3,853,166 A | 12/1974 | Wrono |
| 3,930,738 A | 1/1976 | Thuss et al. |
| 3,999,110 A | 12/1976 | Ramstrom et al. |
| 4,023,609 A | 5/1977 | Rosenquist |
| 4,096,903 A | 6/1978 | Ringle, III |
| 4,131,831 A | 12/1978 | Bochenek et al. |
| 4,160,348 A | 7/1979 | Chapman et al. |
| 4,171,845 A | 10/1979 | Hirsch |
| 4,223,714 A | 9/1980 | Weinreich et al. |
| 4,305,448 A | 12/1981 | Stoll |
| 4,399,855 A | 8/1983 | Volfson |
| 4,427,050 A | 1/1984 | Toppen |
| RE31,793 E | 1/1985 | Berman et al. |
| 4,495,978 A | 1/1985 | Carroll |
| 4,532,194 A | 7/1985 | Liautaud et al. |
| 4,572,467 A | 2/1986 | Farrell |
| 4,644,244 A | 2/1987 | Kittelson |
| 4,724,885 A | 2/1988 | Chang |
| 4,731,965 A | 3/1988 | Jensen |
| 4,766,941 A | 8/1988 | Sloop et al. |
| 4,807,686 A | 2/1989 | Schnebly et al. |
| 4,831,509 A | 5/1989 | Jones et al. |
| 4,832,104 A | 5/1989 | De Labarthe et al. |
| 4,865,107 A | 9/1989 | Dube |
| 4,926,922 A | 5/1990 | Shimazaki |
| 4,956,588 A | 9/1990 | Ming |
| 4,979,582 A | 12/1990 | Forester |
| D315,415 S | 3/1991 | Anthony et al. |
| 5,054,605 A | 10/1991 | Bavis |
| D324,328 S | 3/1992 | Pagan |
| D324,645 S | 3/1992 | Magro et al. |
| 5,123,079 A | 6/1992 | Tanii et al. |
| 5,133,330 A | 7/1992 | Sharp |
| 5,133,399 A | 7/1992 | Hiller et al. |
| 5,271,446 A | 12/1993 | Hwang |
| 5,278,480 A | 1/1994 | Murray |
| D355,353 S | 2/1995 | Pozzi |
| D355,587 S | 2/1995 | Pozzi |
| 5,419,010 A | 5/1995 | Mullet |
| 5,434,487 A | 7/1995 | Long et al. |
| 5,445,209 A | 8/1995 | Lichy |
| 5,462,105 A | 10/1995 | Supernak |
| 5,467,808 A | 11/1995 | Bell |
| 5,482,100 A | 1/1996 | Kuhar |
| 5,509,239 A | 4/1996 | Fullwood |
| 5,547,008 A | 8/1996 | Sullivan |
| 5,566,736 A | 10/1996 | Crider et al. |
| 5,655,342 A | 8/1997 | Guillemet et al. |
| 5,655,343 A | 8/1997 | Seals |
| 5,714,855 A | 2/1998 | Domel et al. |
| D391,476 S | 3/1998 | Gourlay |
| 5,729,103 A | 3/1998 | Domel et al. |
| 5,752,557 A | 5/1998 | Crider et al. |
| 5,760,558 A | 6/1998 | Popat |
| 5,785,105 A | 7/1998 | Crider et al. |
| 5,793,174 A | 8/1998 | Kovach et al. |
| 5,813,447 A | 9/1998 | Lysyj |
| RE36,058 E | 1/1999 | Sokol |
| 5,883,480 A | 3/1999 | Domel et al. |
| 5,889,377 A | 3/1999 | Mao |
| 5,905,442 A | 5/1999 | Mosebrook et al. |
| 5,907,227 A | 5/1999 | Domel et al. |
| 5,929,580 A | 7/1999 | Mullet et al. |
| 5,960,847 A | 10/1999 | Crider et al. |
| 5,990,646 A | 11/1999 | Kovach et al. |
| 6,004,298 A | 12/1999 | Levander |
| D418,741 S | 1/2000 | Rouse |
| 6,020,829 A | 2/2000 | Hormann |
| 6,024,156 A | 2/2000 | Chu |
| 6,055,885 A | 5/2000 | Shea |
| 6,060,852 A | 5/2000 | Domel et al. |
| 6,069,465 A | 5/2000 | De Boois et al. |
| 6,082,433 A | 7/2000 | Vafaie et al. |
| 6,125,907 A | 10/2000 | Tokuyama et al. |
| 6,144,177 A | 11/2000 | Mao |
| 6,181,089 B1 | 1/2001 | Kovach et al. |
| 6,189,592 B1 | 2/2001 | Domel |
| 6,212,221 B1 | 4/2001 | Wakayama et al. |
| 6,259,218 B1 | 7/2001 | Kovach et al. |
| 6,286,579 B1 | 9/2001 | Gottschalk |
| 6,369,530 B2 | 4/2002 | Kovach et al. |
| 6,376,832 B1 | 4/2002 | Smith et al. |
| 6,433,498 B1 | 8/2002 | Domel et al. |
| 6,489,169 B1 | 12/2002 | Cohen et al. |
| 6,497,267 B1 | 12/2002 | Azar et al. |
| 6,533,017 B1 | 3/2003 | Toti |
| 6,550,733 B1 | 4/2003 | Lassen et al. |
| 6,606,072 B1 | 8/2003 | Hayward et al. |
| 6,680,594 B2 | 1/2004 | Huber et al. |
| 6,708,750 B2 | 3/2004 | Collett et al. |
| 6,733,413 B2 | 5/2004 | Lagarde et al. |
| 6,736,186 B2 | 5/2004 | Anderson et al. |
| 6,850,017 B1 | 2/2005 | Domel et al. |
| 6,870,338 B2 | 3/2005 | Walker et al. |
| 6,959,748 B2 | 11/2005 | Hudoba |
| 6,967,565 B2 | 11/2005 | Lingemann |
| 6,979,962 B2 | 12/2005 | Cavarec et al. |
| 7,033,695 B2 | 4/2006 | Sawachi |
| 7,104,305 B1 | 9/2006 | Apollon |
| 7,111,659 B2 | 9/2006 | Harper et al. |
| 7,137,530 B2 | 11/2006 | Chirnomas |
| 7,193,502 B2 | 3/2007 | Vandrunen et al. |
| 7,231,953 B2 | 6/2007 | Varley et al. |
| 7,240,716 B2 | 7/2007 | Nichols, Jr. et al. |
| 7,259,485 B2 | 8/2007 | Cavarec et al. |
| D553,965 S | 10/2007 | Ellbogen |
| 7,281,561 B2 | 10/2007 | Anderson et al. |
| 7,299,848 B2 | 11/2007 | Streib et al. |
| 7,346,016 B2 | 3/2008 | Nielsen et al. |
| 7,350,736 B2 | 4/2008 | Caamano et al. |

(56) References Cited

U.S. PATENT DOCUMENTS

| | | |
|---|---|---|
| 7,356,041 B2 | 4/2008 | Nielsen et al. |
| 7,389,806 B2 | 6/2008 | Kates |
| 7,438,111 B2 | 10/2008 | Grimes et al. |
| 7,590,433 B2 | 9/2009 | Sung et al. |
| 7,673,667 B2 | 3/2010 | Domel et al. |
| 7,690,414 B2 | 4/2010 | Knowles |
| 7,931,068 B2 | 4/2011 | Carmen, Jr. et al. |
| 7,975,748 B2 | 7/2011 | Yu et al. |
| 8,125,167 B1 | 2/2012 | Mullet et al. |
| 8,299,734 B2 | 10/2012 | Mullet et al. |
| 8,340,975 B1 | 12/2012 | Rosenberger |
| 8,368,328 B2 | 2/2013 | Mullet et al. |
| 8,371,358 B1 | 2/2013 | Mullet et al. |
| 8,540,005 B2 | 9/2013 | Baugh et al. |
| 8,575,872 B2 | 11/2013 | Mullet et al. |
| 8,659,246 B2 | 2/2014 | Mullet et al. |
| 8,723,455 B2 | 5/2014 | Mullet et al. |
| 8,757,239 B2 | 6/2014 | Colson et al. |
| D714,132 S | 9/2014 | Hazantonis |
| 8,892,262 B2 | 11/2014 | Mullet et al. |
| 8,919,419 B2 | 12/2014 | Mullet et al. |
| 8,968,900 B2 | 3/2015 | Mullet et al. |
| 9,045,939 B2 | 6/2015 | Blair et al. |
| 2004/0169116 A1 | 9/2004 | Nogare et al. |
| 2006/0000565 A1* | 1/2006 | Billebault ............... E06B 9/36 160/343 |
| 2006/0086874 A1 | 4/2006 | Habel et al. |
| 2007/0261801 A1 | 11/2007 | Mullet et al. |
| 2007/0284053 A1 | 12/2007 | Mullet et al. |
| 2009/0127369 A1 | 5/2009 | Mullet et al. |
| 2011/0056630 A1* | 3/2011 | Buccola, Jr. ............. E06B 9/36 160/168.1 V |
| 2012/0181979 A1 | 7/2012 | Hudspeth et al. |
| 2012/0279075 A1 | 11/2012 | Amsel |
| 2013/0199735 A1* | 8/2013 | Colson ..................... E06B 9/42 160/2 |
| 2013/0204408 A1 | 8/2013 | Thiruvengada et al. |
| 2013/0333848 A1 | 12/2013 | Mullet et al. |
| 2014/0014281 A1 | 1/2014 | Mullet et al. |

FOREIGN PATENT DOCUMENTS

| | | |
|---|---|---|
| JP | 2006314389 | 11/2006 |
| JP | 2009034301 | 2/2009 |
| JP | 2011062497 | 3/2011 |
| KR | 100903201 | 6/2009 |
| KR | 20100006476 | 1/2010 |
| WO | 8602970 | 5/1986 |

OTHER PUBLICATIONS

International Preliminary Report on Patentability, PCT/US2013/060205, dated Mar. 26, 2015.

International Search Report, PCT/US2014/045633, dated Nov. 7, 2014.

Written Opinion of the International Searching Authority, PCT/US2014/045663, dated Nov. 7, 2014.

* cited by examiner

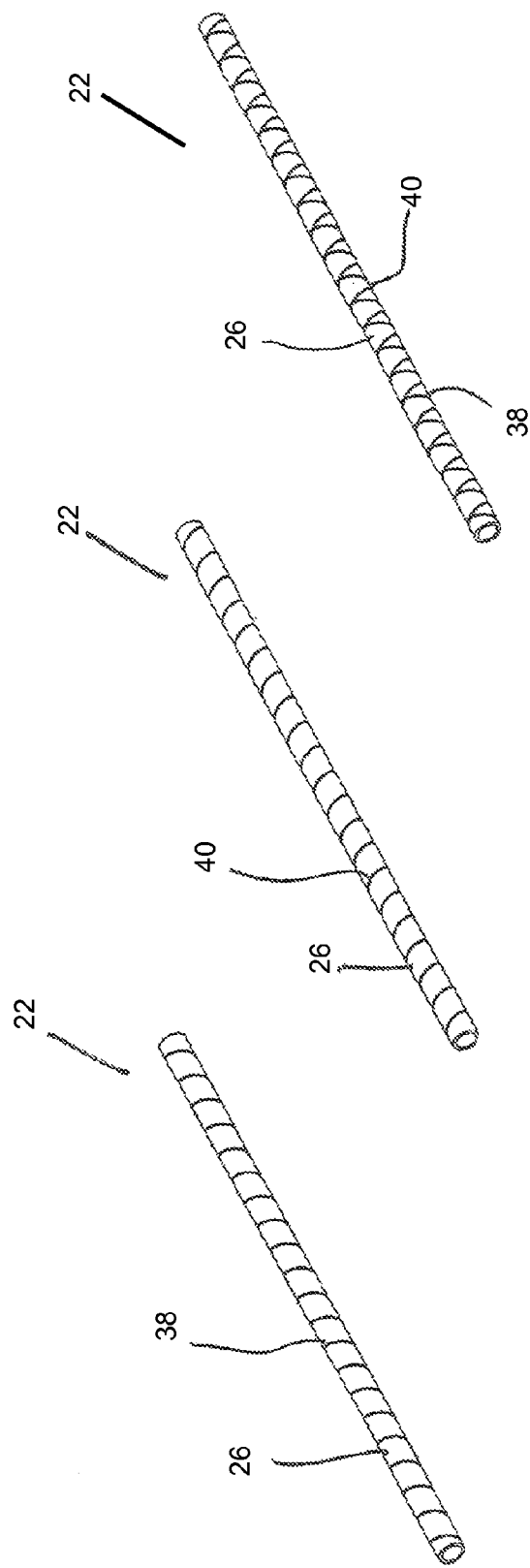

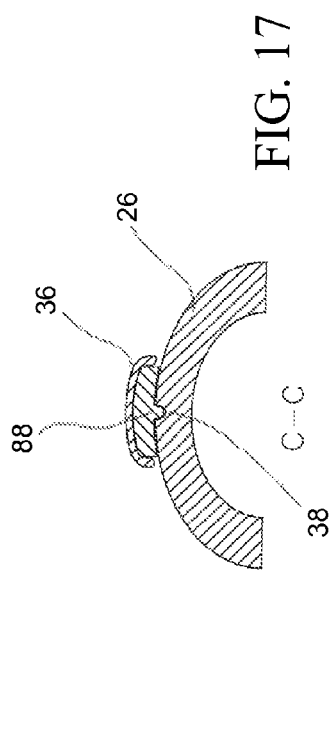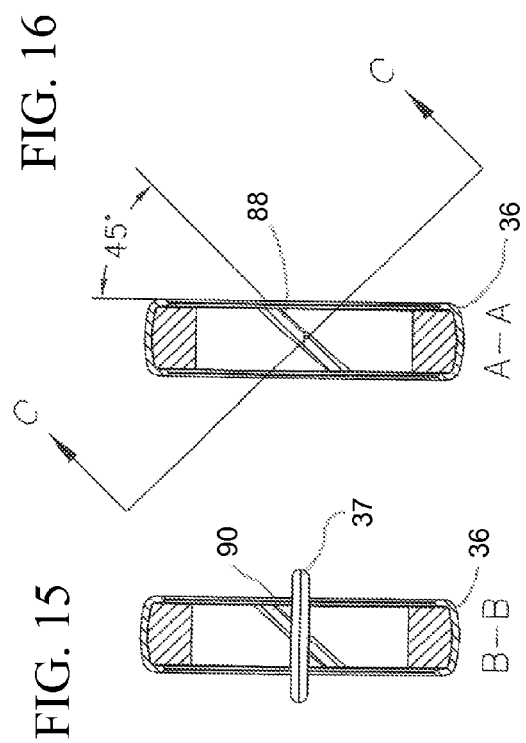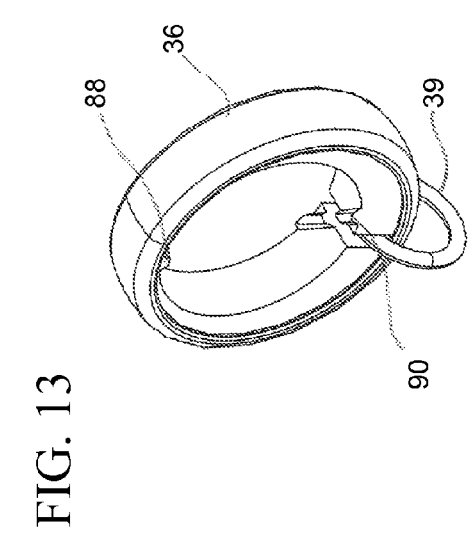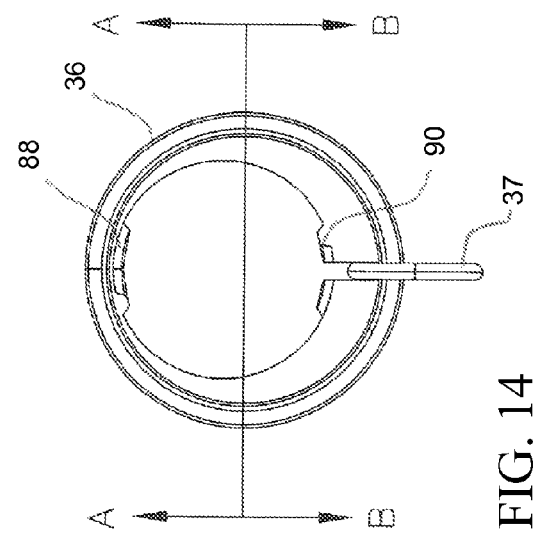

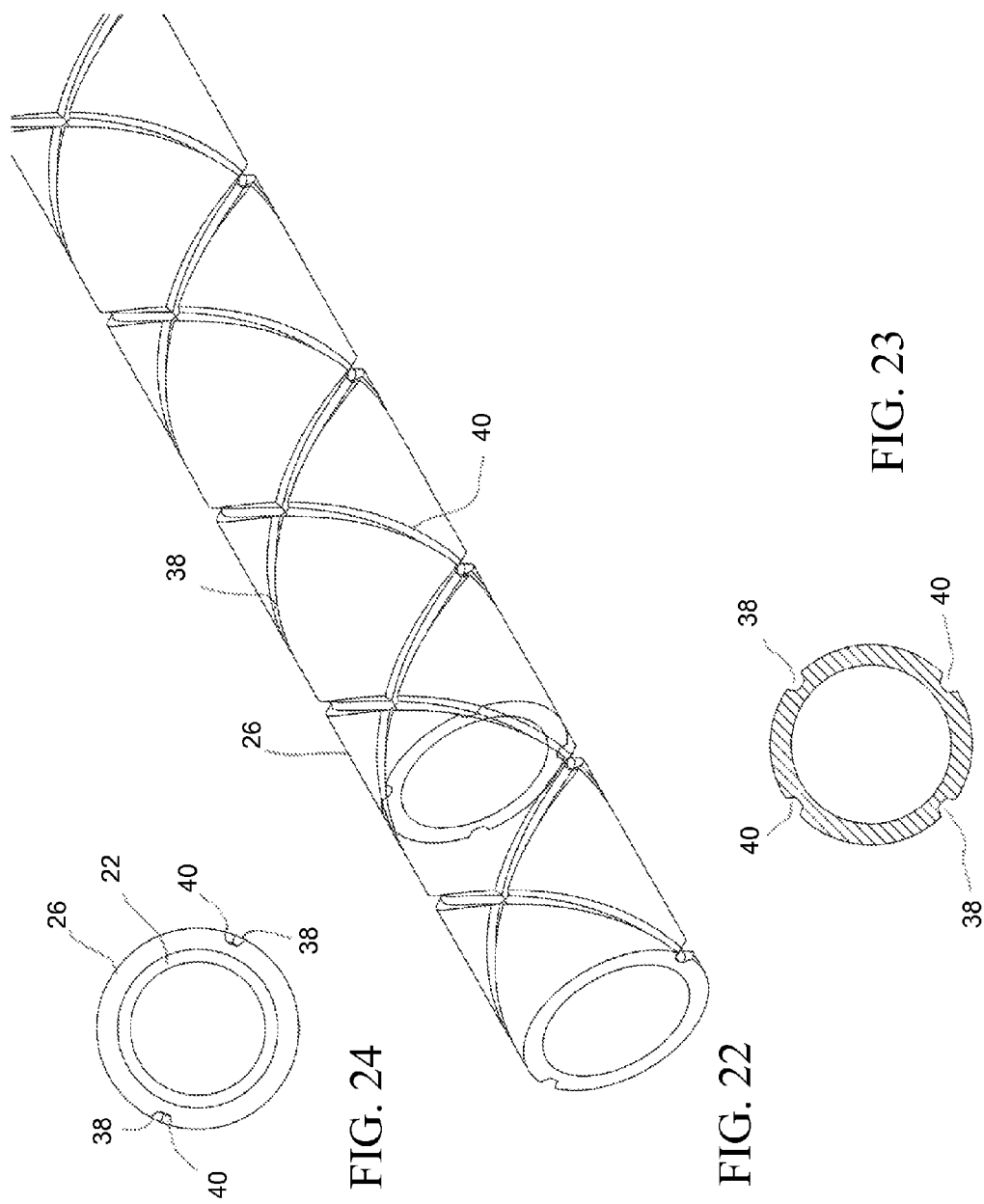

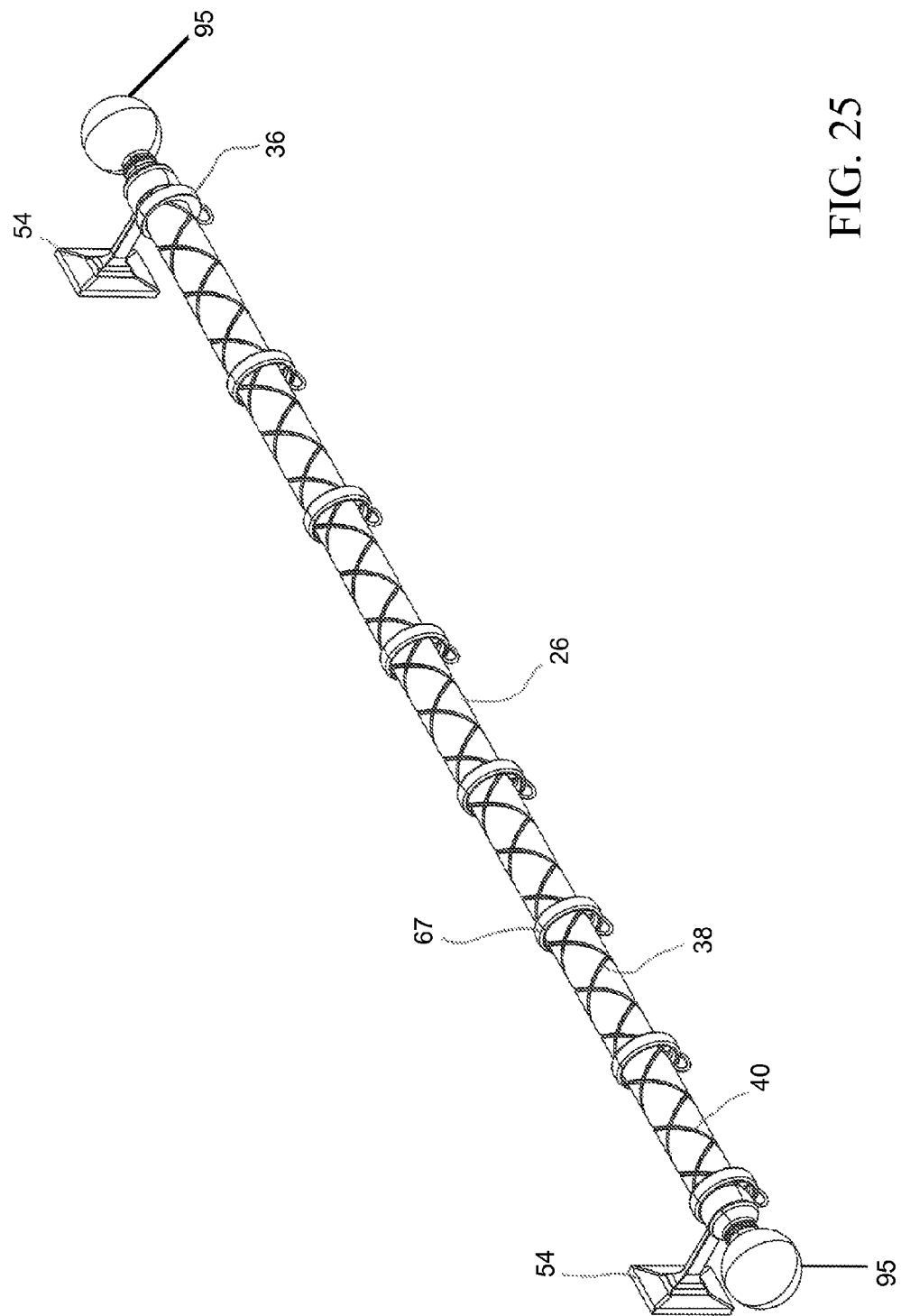

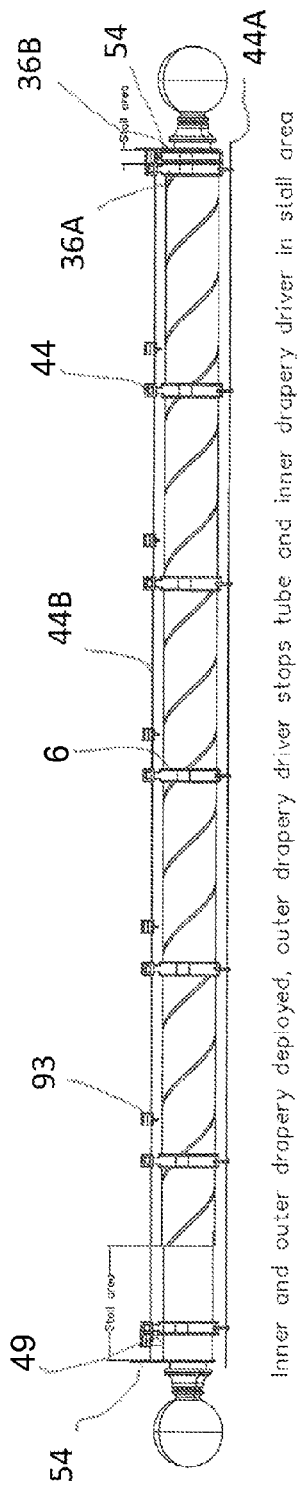
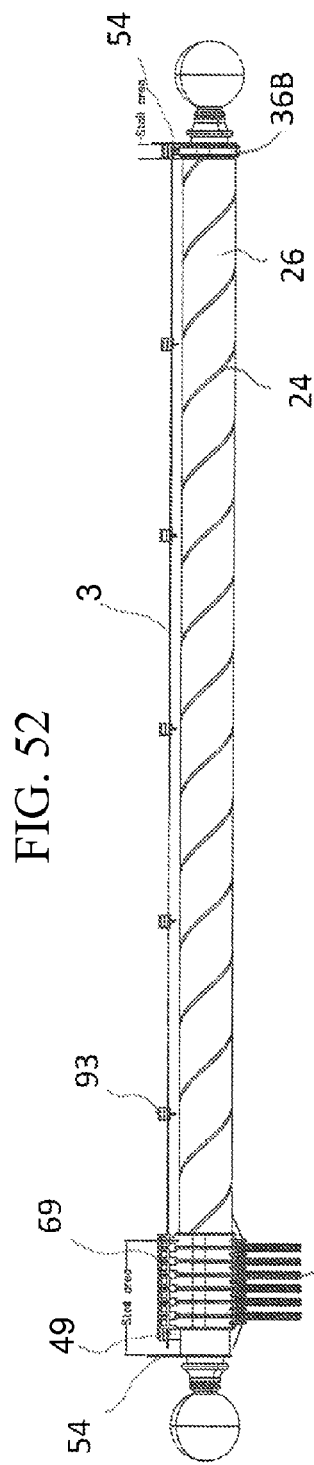
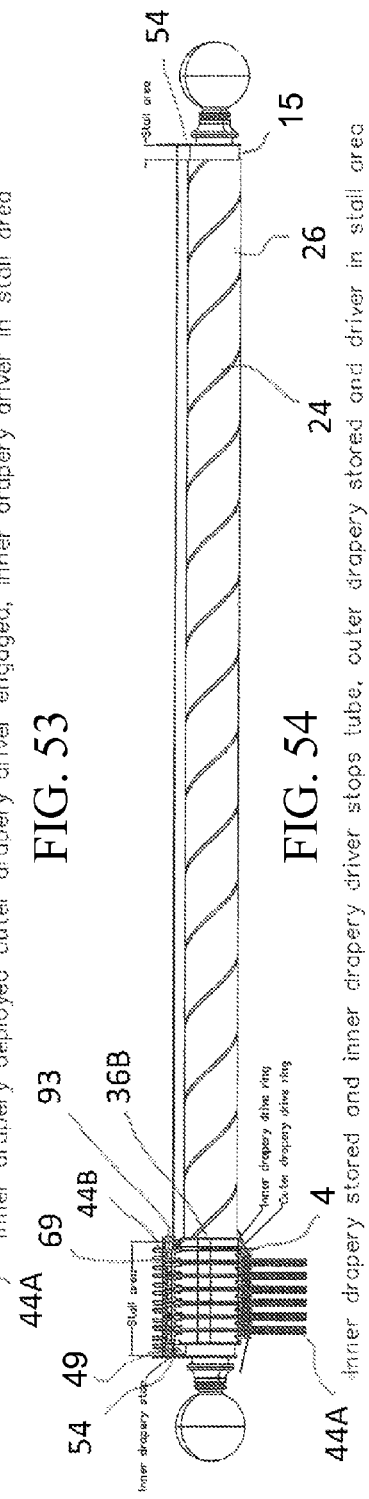

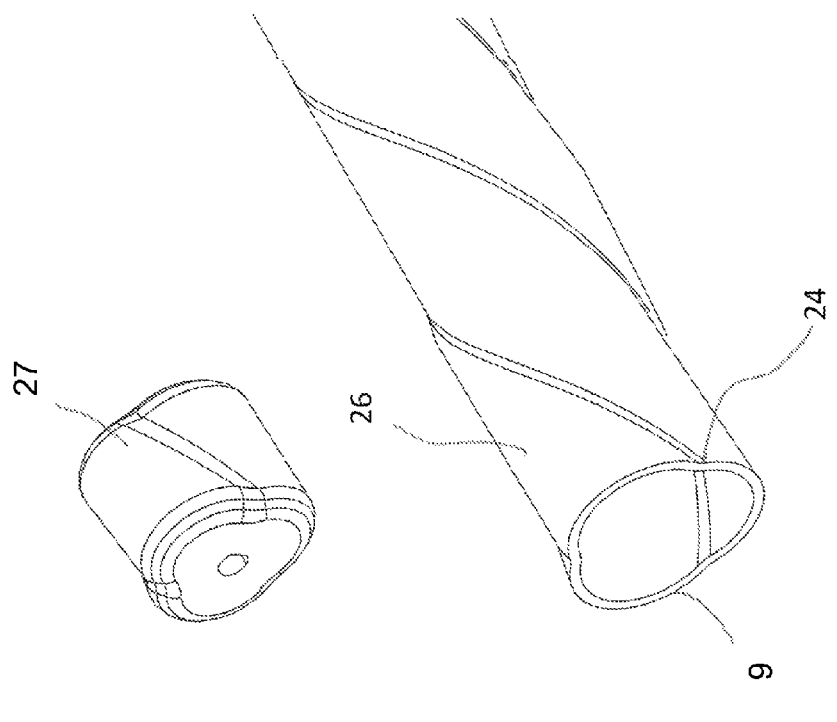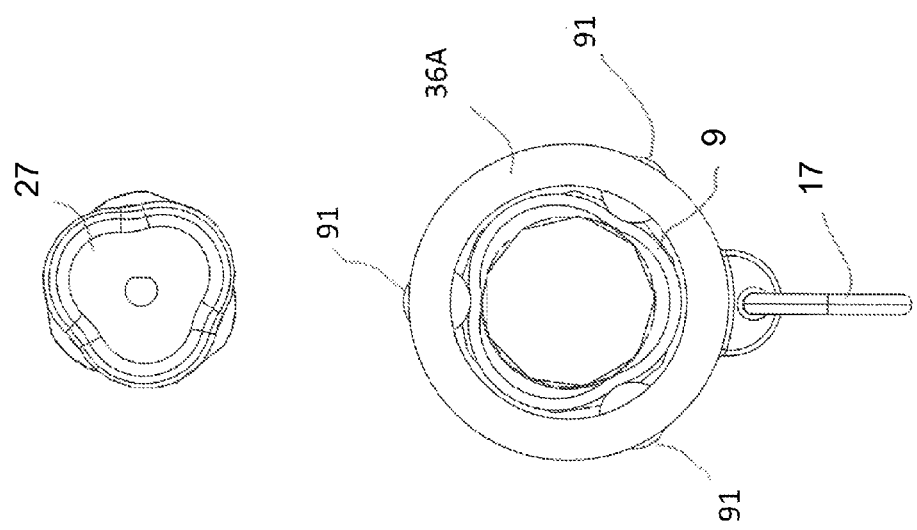
FIG. 60

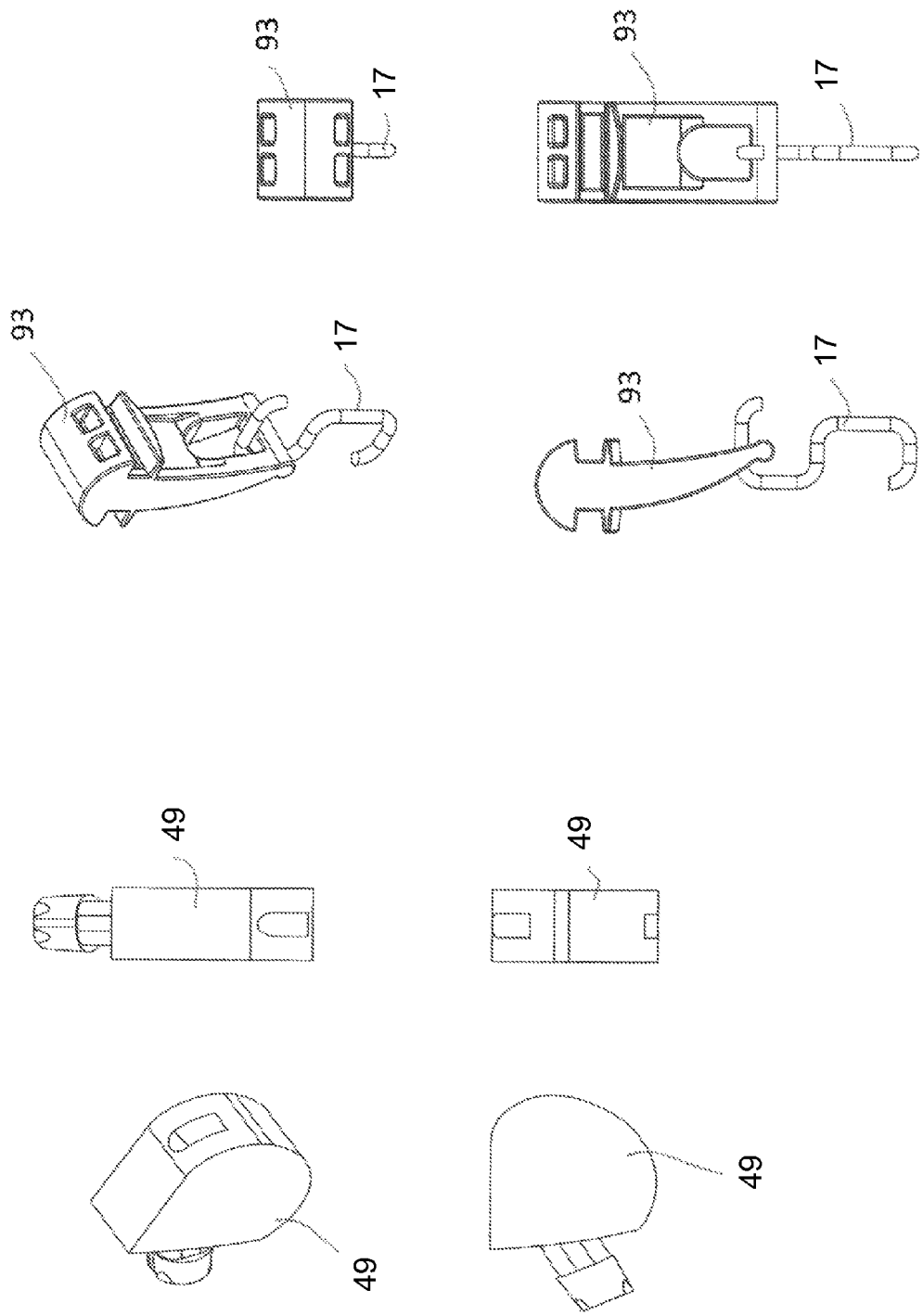

ROTATABLE DRIVE ELEMENT FOR MOVING A WINDOW COVERING

CROSS-REFERENCE TO RELATED APPLICATION

The present application is a continuation of U.S. Ser. No. 14/029,210 filed Sep. 17, 2013, which claims the benefit of U.S. Provisional Patent Application Ser. No. 61/702,093, filed Sep. 17, 2012, which is hereby incorporated by reference herein in its entirety, including any figures, tables, or drawings.

FIELD OF THE INVENTION

Embodiments of the present invention relate generally to a window covering assembly used to cover windows. Specific embodiments of the invention relate to a window covering assembly with a rotatable drive element that has a structure formed into or on the outer surface of the rotatable drive element such that a window covering moves axially along the rotatable drive element when the rotatable drive element rotates. Further specific embodiments relate to a window covering assembly in which two different curtains are operated by the same rotating drive element such that the user is able to independently move each curtain.

BACKGROUND OF THE INVENTION

Window coverings, such as curtains, are frequently used to provide privacy and to limit the amount of light that is permitted to pass through a window and into a room.

There are numerous types of window coverings known in the art. Curtains can be composed of panel(s) of fabric. For example, a curtain may be a single panel curtain that opens and closes from left to right. There is also a center closing curtain that is composed of two fabric panels that meet in the center of the window to close and cover the window.

Many different types of fabrics may be used depending on the user's needs and preferences. For example, sometimes it is necessary not only to cover but to also fully blackout the window such that no light passes through. In this instance, a blackout curtain composed of opaque fabric that completely darkens the window may be useful. There may also be other situations, however, where some light is desired and some visibility is desired. A sheer curtain composed of a translucent fabric may be useful in this instance.

The curtain panels are attached to and suspended from a transverse curtain rod that is hung above the window. The panels are usually joined to the curtain rod by hooks or rings. The curtains are able to be moved manually across the curtain rod(s) as desired by a pull rod or the like to either cover or uncover the window.

There are various mechanisms, both electrical and manual, to mechanically move a curtain back and forth across an opening. Typical designs use a curtain guide track where the curtains are suspended. Some curtain assemblies use a series of pulleys, cables, and belts to move the curtain. In some cases these mechanisms are motorized. In these cases, the number of components used adds complexity to the assembly and also increases the cost of the assembly.

Many different types of fabrics may be used depending on the user's needs and preferences. For example, sometimes it is preferred to not only cover but to also fully blackout the window such that no light passes through. In this instance, a blackout curtain composed of opaque fabric that completely darkens the window may be useful. There may also be other situations, however, where some light is desired and some visibility is desired. A sheer curtain composed of a translucent fabric may be useful in this instance.

A sheer curtain is often hung with a blackout curtain on the same window to accommodate different preferences for light and visibility at different times. For example, a blackout curtain may be used to block out unwanted early morning sun. The blackout curtain may then be opened to allow the sun to filter through the sheer curtain later in the day. When a blackout curtain is hung with a sheer curtain, utility bills may also be lowered by using the different curtains to keep a home cool or warm, depending on the weather.

Hanging two different curtains, however, requires the installation of two different curtain guide tracks, one guide track for each curtain. If two curtains are hung from the same curtain guide track, there is not the ability to move one curtain without moving the other curtain and it prevents both curtains from being in the deployed position simultaneously.

Therefore, it would be advantageous to have a simple curtain assembly that will move a curtain from the deployed position to the stored position with the minimum number of components that can be motorized as well as manually operated. It would further be advantageous to have a dual curtain assembly that will move two separate curtains.

SUMMARY OF THE INVENTION

Embodiments of the present invention relate to a window covering assembly. For convenience, various embodiments will be described with respect to curtains with the understanding that the description applies to other window coverings as well. Embodiments of the curtain assembly include a drive element wherein at least one guide structure is formed on or into the outer surface of the drive element; a drive attachment element having a corresponding structure that communicates with the at least one guide structure to move the drive attachment element axially along the drive element when the drive element is rotated; and a rotation assembly for rotating the drive element. In some embodiments of the invention, the guide structure forms a helical pattern on the rotatable drive element and the corresponding structure is a tooth that is moved by the groove when the drive element is rotated. The guide structure can also be a ridge or other structure that can cause the corresponding structure to move axially along the drive element when the drive rotates.

In specific embodiments the drive element can be a tube.

In specific embodiments according to the present invention, the curtain assembly includes a rotatable drive element having a clockwise helical guide structure and a counter clockwise helical guide structure formed on, or into, the outer surface of the drive element; a first drive attachment element having a structure that communicates with the clockwise helical guide structure to move the drive attachment element axially along the drive element when the drive element is rotated; and a second drive attachment element having a structure that communicates with the counterclockwise helical guide structure to move the drive attachment element axially along the drive element when the drive element is rotated; and a rotation assembly for rotating the drive element.

In accordance with some embodiments of the present invention, a dual curtain assembly is provided. A specific embodiment of dual curtain assembly includes a rotatable drive element having at least one guide structure formed on, or into, the outer surface of the drive element; at least two drive attachment elements having a corresponding at least two structures that communicate with the at least one guide structure to move the at least two drive attachment elements axially along the drive element when the drive tube is rotated. Further specific embodiments can also incorporate a rotation assembly for rotating the drive element. The rotation assembly can be manual or motorized.

In accordance with some embodiments of the invention, a dual curtain assembly includes a drive element having at least one guide structure formed on, or into, the outer surface of the drive element; at least one outer drive attachment element having a corresponding at least one outer structure that communicates with the at least one guide structure to move the at least one drive attachment element axially along the drive element when the drive element is rotated; at least one inner drive attachment element having a corresponding at least one feature that communicates with the at least one guide structure to move the at least one inner drive attachment element axially along the drive element when the drive element is rotated; and a rotation assembly for rotating the drive element.

In accordance with yet other embodiments of the invention, applicable, for example, to a center closing curtain system, the curtain assembly may include a drive element having at least one guide structure formed on, or into, the outer surface of the drive element; a left outer drive attachment element having a corresponding left outer structure that communicates with the at least one guide structure to move the left outer drive attachment element axially along the drive element when the drive element rotates; a right outer drive attachment element having a right outer structure that communicates with the at least one guide structure to move the right outer drive attachment element axially along the drive element when the drive element rotates; a left inner drive attachment element having a corresponding left inner structure that communicates with the at least one guide structure to move the left inner drive attachment element axially along the drive element when the drive element is rotated; a right inner drive attachment element having a corresponding right inner structure that communicates with the at least one guide structure to move the right inner drive attachment element axially along the drive element when the drive element is rotated; and a rotation assembly for rotating the drive element, wherein the rotation of the drive element moves the left and right outer drive attachment elements axially along the drive element when the drive element is rotated and independently moves the left and right inner drive attachment elements along the drive element when the drive element is rotated.

These features and aspects of the invention as well as its advantages are understood by referring to the following description, appended claims, and accompanying drawings, in which:

FIG. 7 is an enlarged perspective view of one embodiment of the curtain assembly showing the rotatable drive element with a clockwise helical groove.

FIG. 8 is an enlarged perspective view of one embodiment of the curtain assembly showing the rotatable drive element with a counter clockwise helical groove.

FIG. 9 is an enlarged perspective view of one embodiment of the curtain assembly showing the rotatable drive element with a clockwise helical groove and a counter clockwise helical groove.

FIG. 13 is an enlarged perspective view of the drive attachment element having a first drive tooth and a second drive tooth according to one embodiment.

FIG. 14 is an enlarged side view of the drive attachment element 36 having a first drive tooth and a second drive tooth according to one embodiment.

FIG. 15 is an enlarged cross-sectional view of the drive attachment element 36 showing the angle of the second drive tooth 90 according to one embodiment.

FIG. 16 is an enlarged cross-sectional view of the drive attachment element 36 showing the angle of the first drive tooth 88 according to one embodiment.

FIG. 17 is a section view of the tube 26 and the drive attachment element 36 showing the engagement of the first drive tooth 88 in the first helical groove 38.

Figures 18, 21:
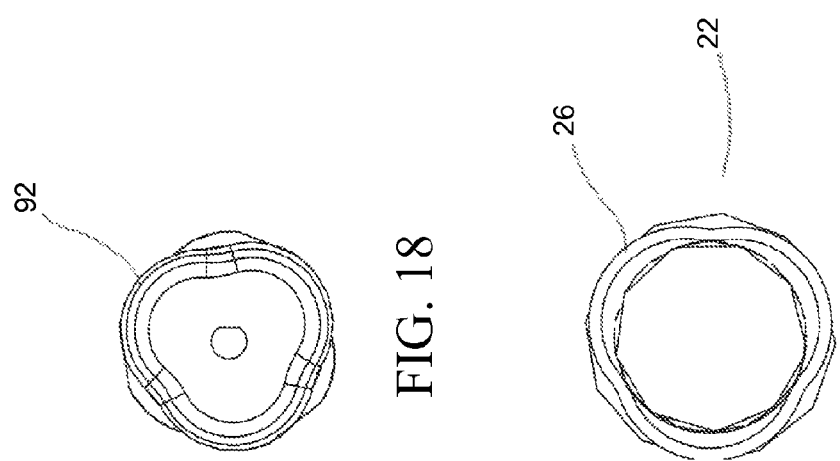

FIG. 18 is an enlarged end view of a motor drive adapter according to one embodiment of the curtain assembly.

Figures 19, 20:
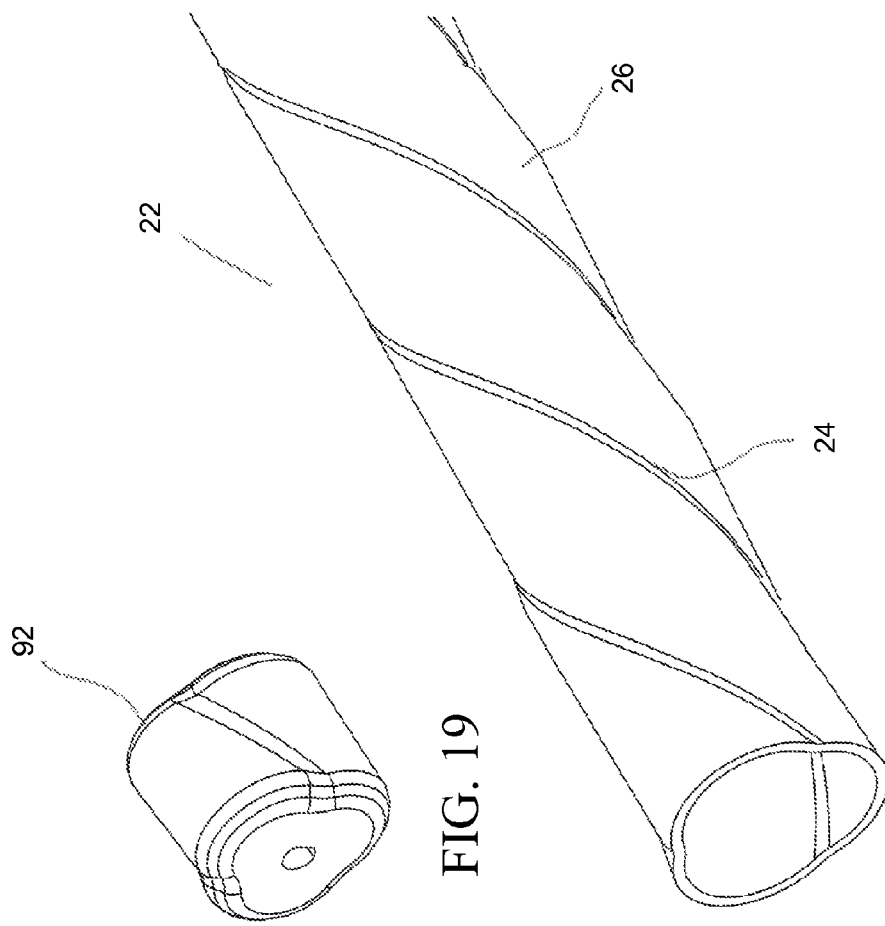

FIG. 19 is an enlarged perspective view of a motor drive adapter according to one embodiment of the curtain assembly.

FIG. 20 is an enlarged perspective view of the rotatable drive element according to one embodiment.

FIG. 21 is an enlarged end view of the rotatable drive element according to one embodiment.

FIG. 22 is an enlarged perspective view of the preferred tube embodiment with the position a section was taken to reflect the two clockwise helical grooves 38 and two counter clockwise grooves 40 in the tube 26.

FIG. 23 is an end view of the drive element assembly of the preferred embodiment showing the starting points of the clockwise helical grooves 38 and the counter clockwise grooves 40.

FIG. 24 is the cross section view taken from FIG. 22.

FIG. 25 is the preferred embodiment curtain assembly.

Figure 26:
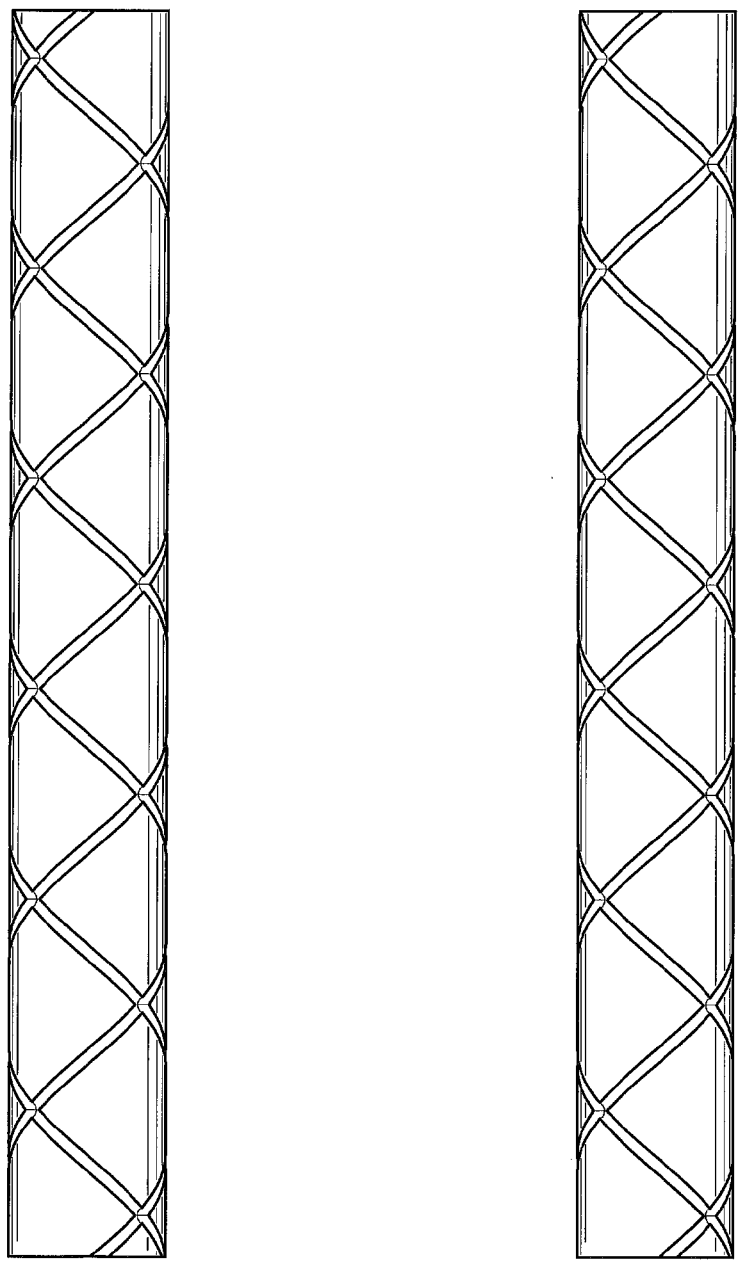

FIG. 26 is a drawing of the functional relationship of the helical grooves 38 and 40 to the midpoint of the drive element to assure the drive attachment elements meet in the midpoint of the drive element on center close draperies.

Figure 27:
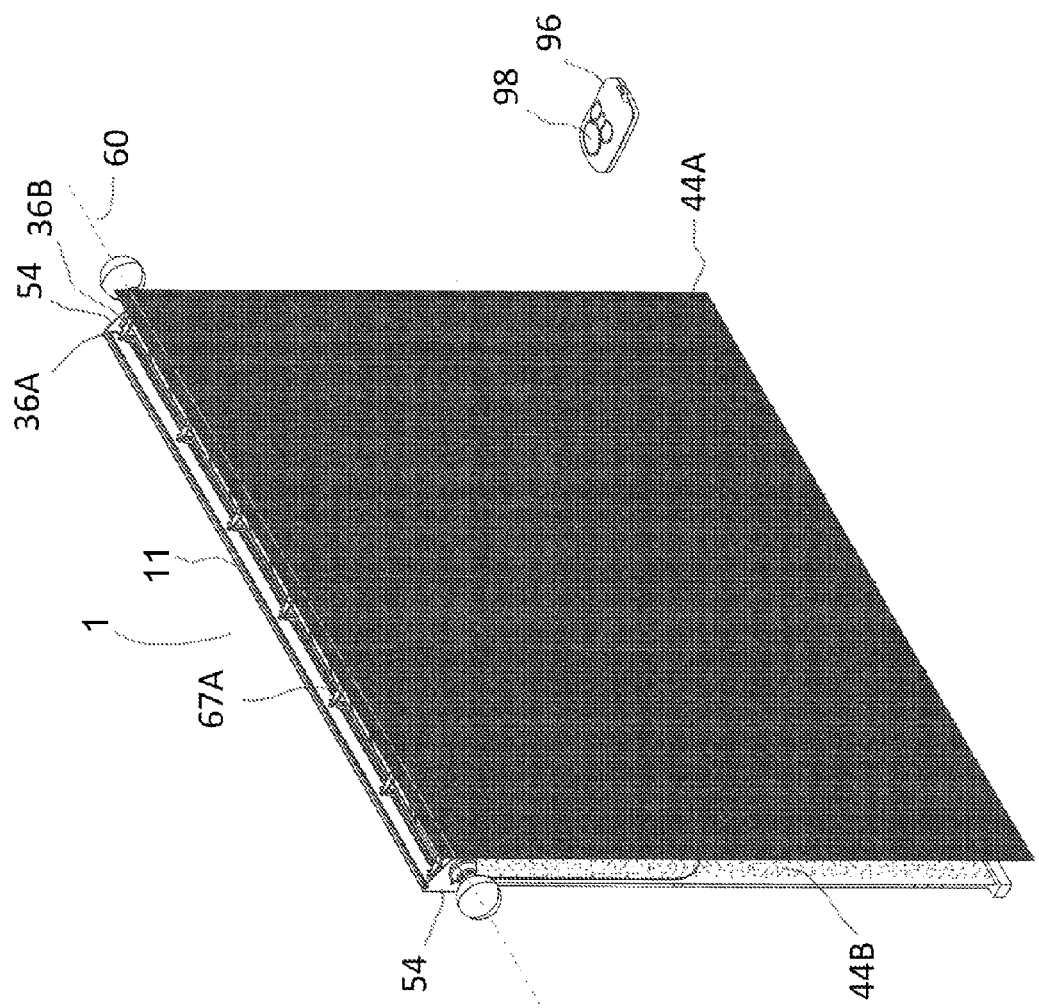

FIG. 27 is a perspective view of one embodiment of the curtain assembly when the outer curtain is a blackout curtain in the deployed position and the inner curtain is a sheer curtain in the deployed position.

Figure 28:
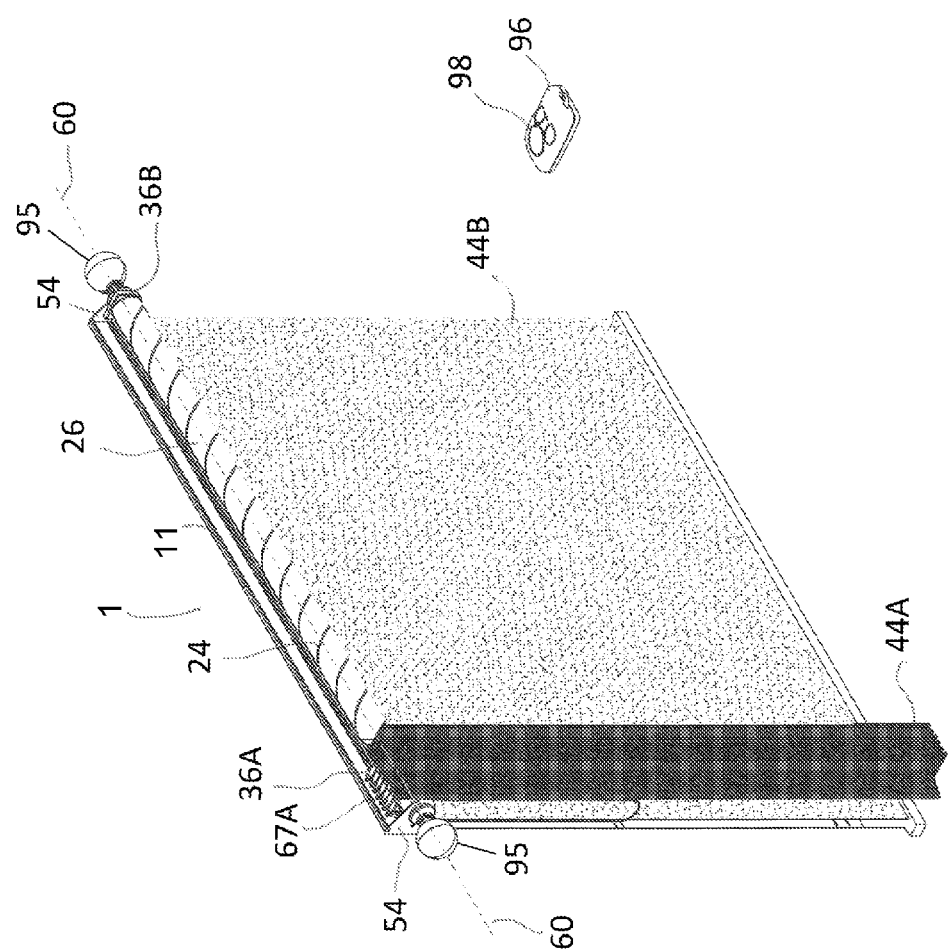

FIG. 28 is a perspective view of one embodiment of the curtain assembly when the outer curtain is a blackout curtain in the stored position and the inner curtain is a sheer curtain in the deployed position.

Figure 29:
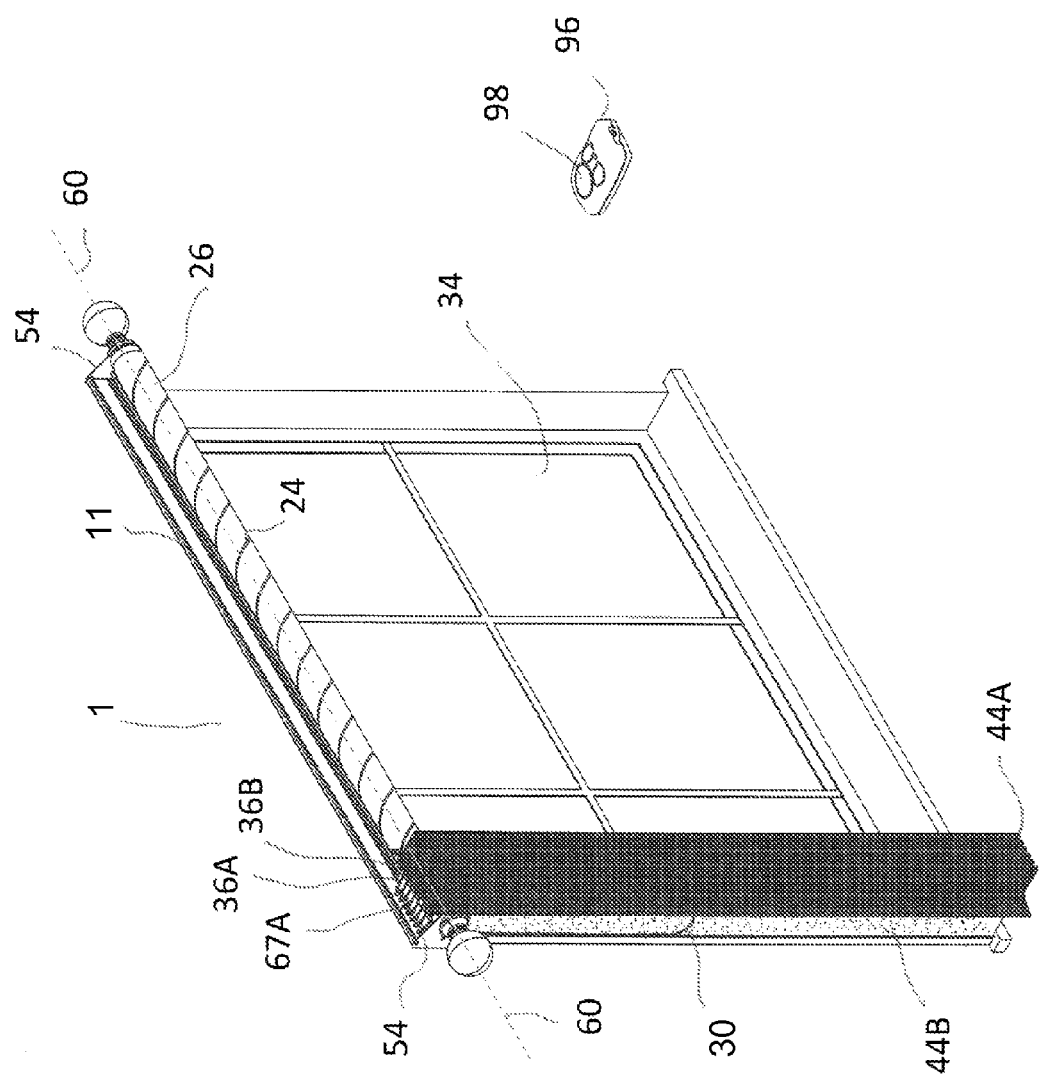

FIG. 29 is a perspective view of the embodiment of the curtain assembly when both the outer and inner curtains are in the stored position.

Figure 6:
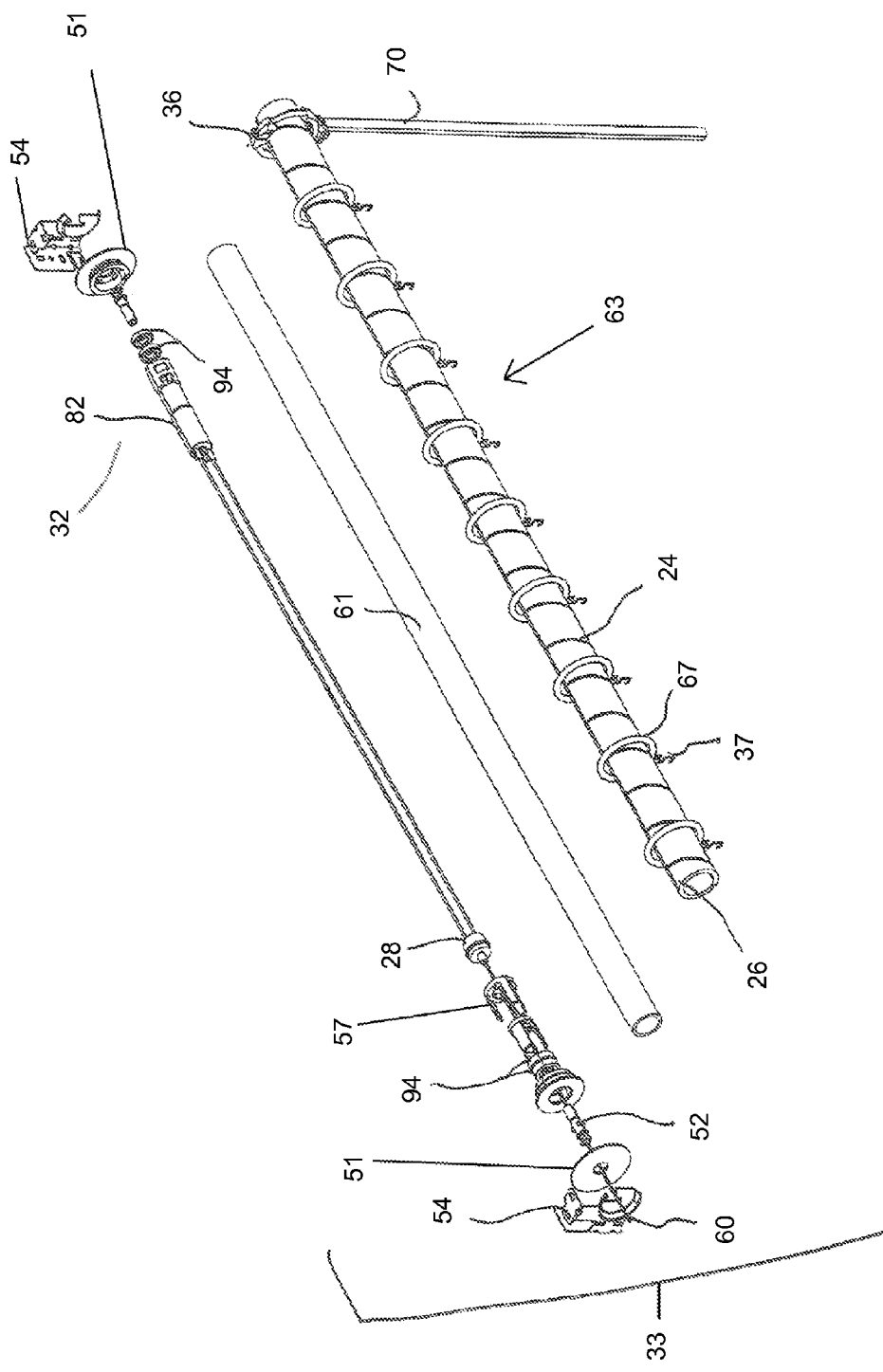
FIG. 6 is an enlarged perspective view of the components of the rotatable drive element according to one embodiment of the curtain assembly in which the power supply to the motor is external to the drive element.
Figure 30:
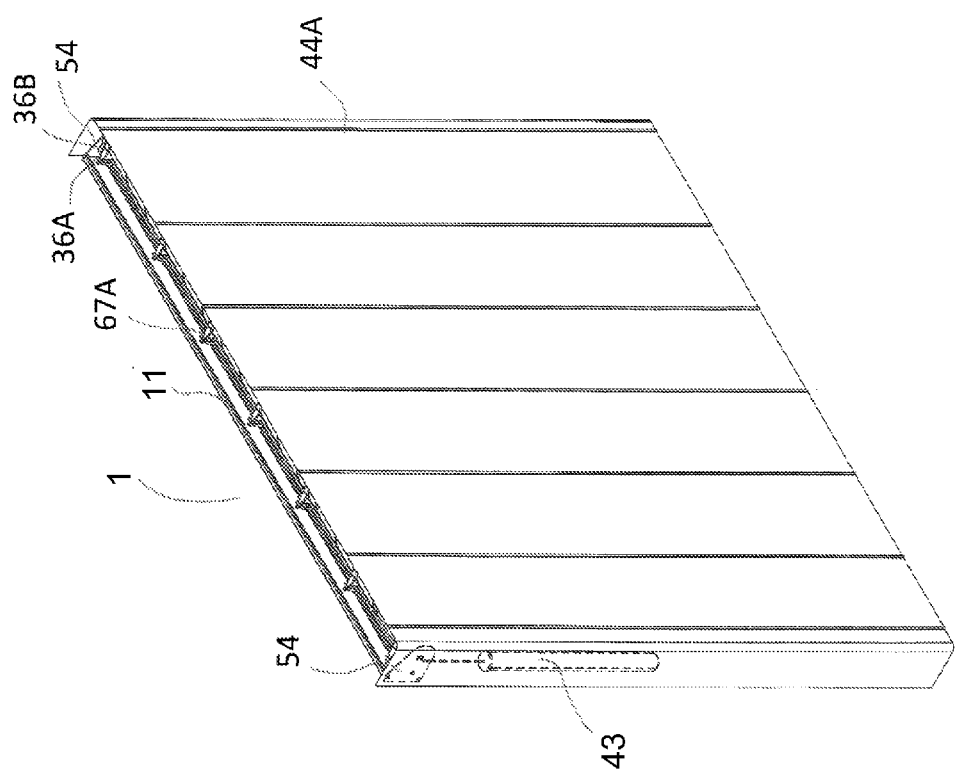

FIG. 30 is a perspective view of the preferred embodiment with the outer curtain is a blackout curtain with a portion cut away to show the position of the external battery pack from FIG. 6.

Figure 31:
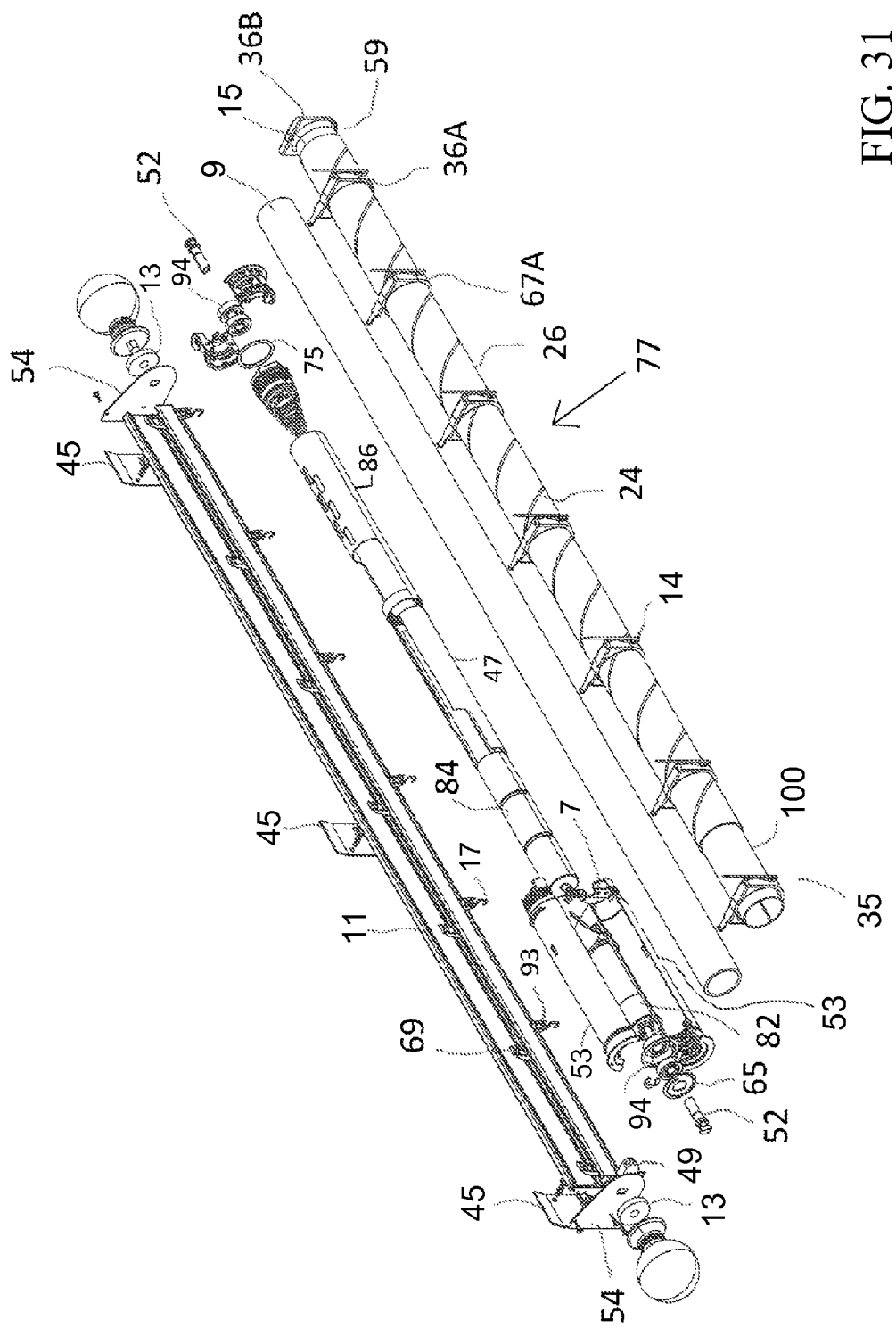

FIG. 31 is an enlarged perspective view of the components of the rotatable drive element according to one embodiment of the curtain assembly showing an internal battery power supply.

Figure 32:
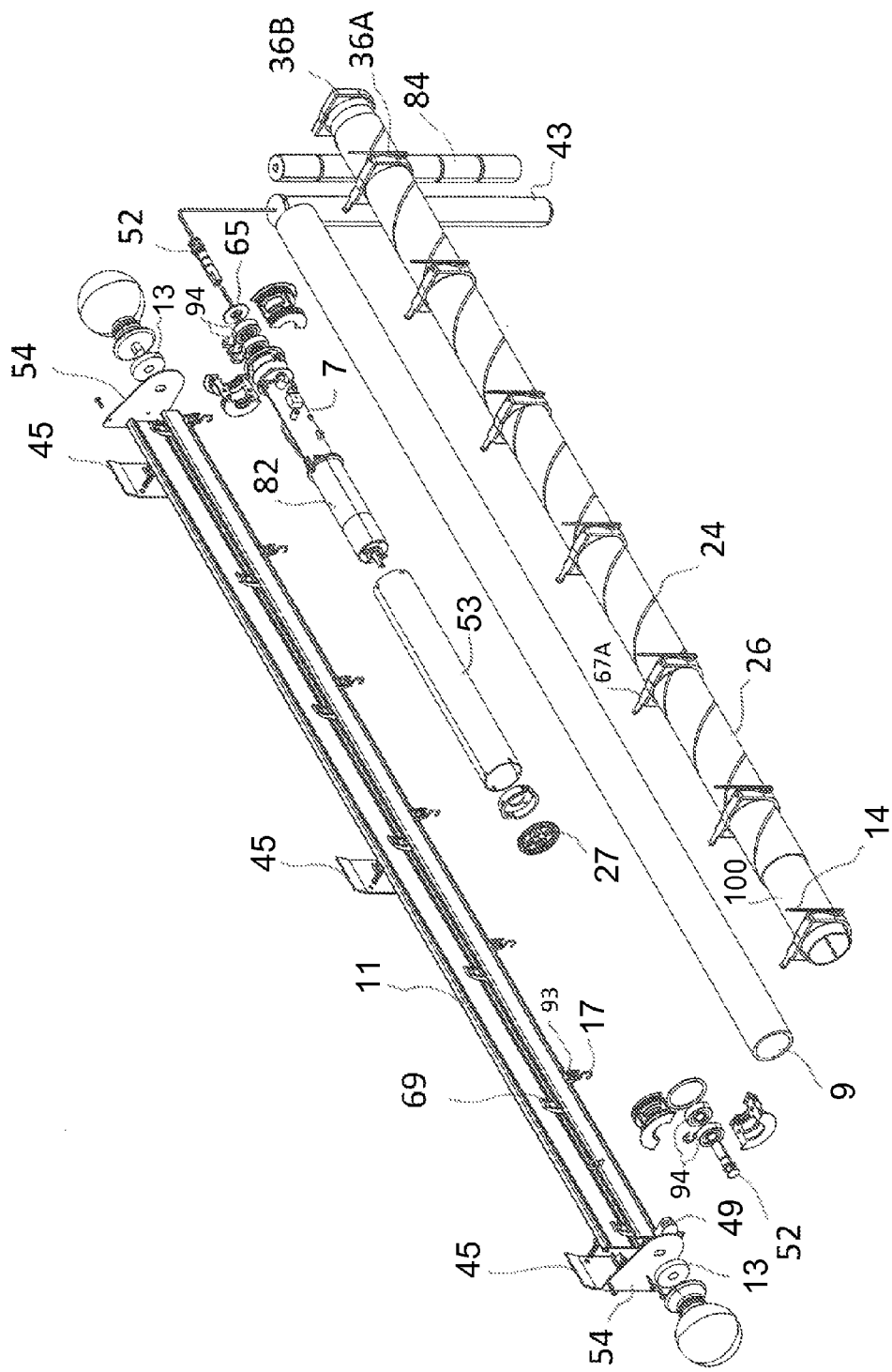

FIG. 32 is an enlarged perspective view of the components of the rotatable drive element according to one embodiment of the curtain assembly show an external power supply.

Figure 33:
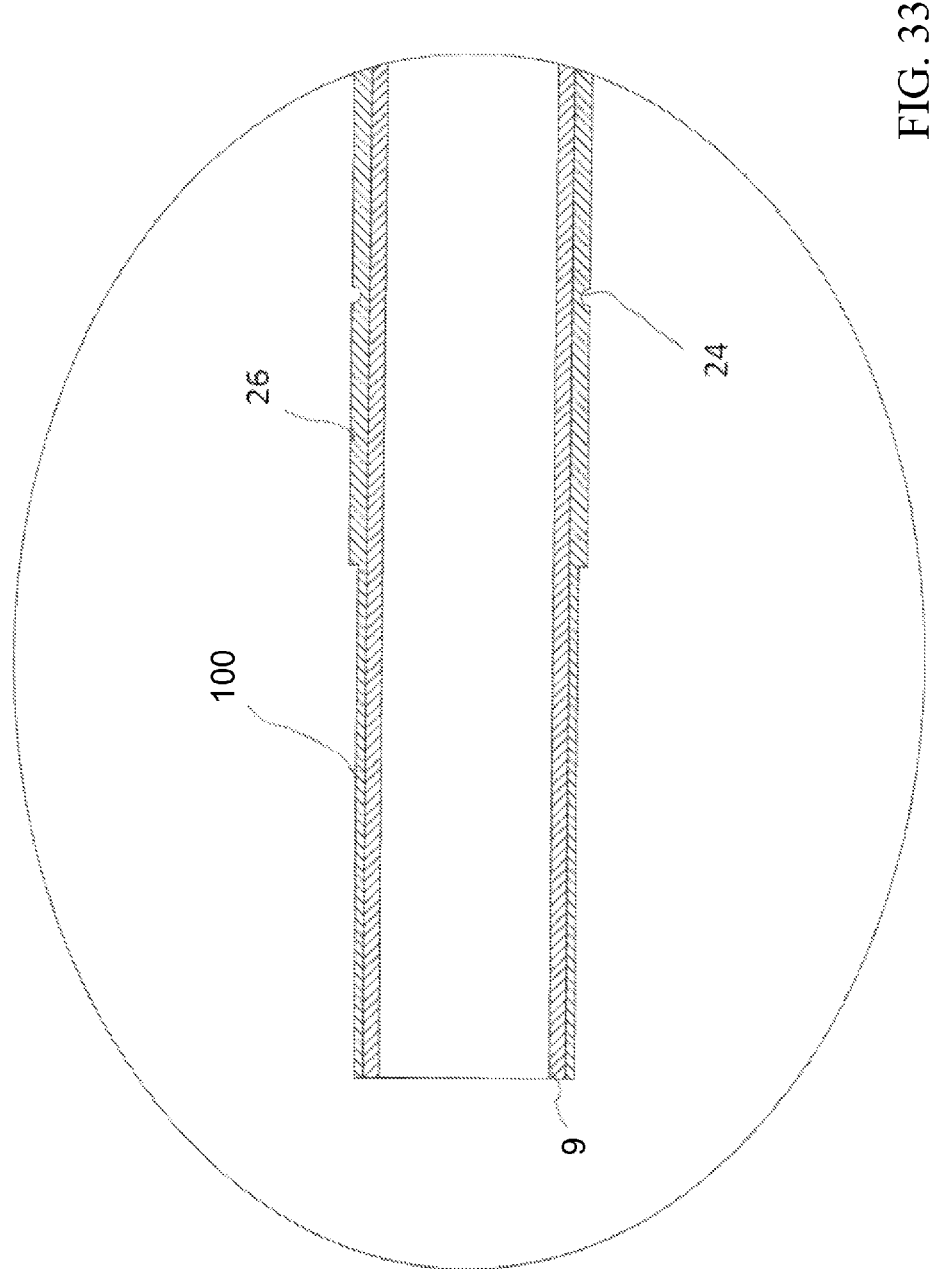

FIG. 33 is a cross-sectional view of the drive section of the rotatable drive element showing the helical groove and a non-driving groove according to one embodiment of the curtain assembly.

Figure 34:
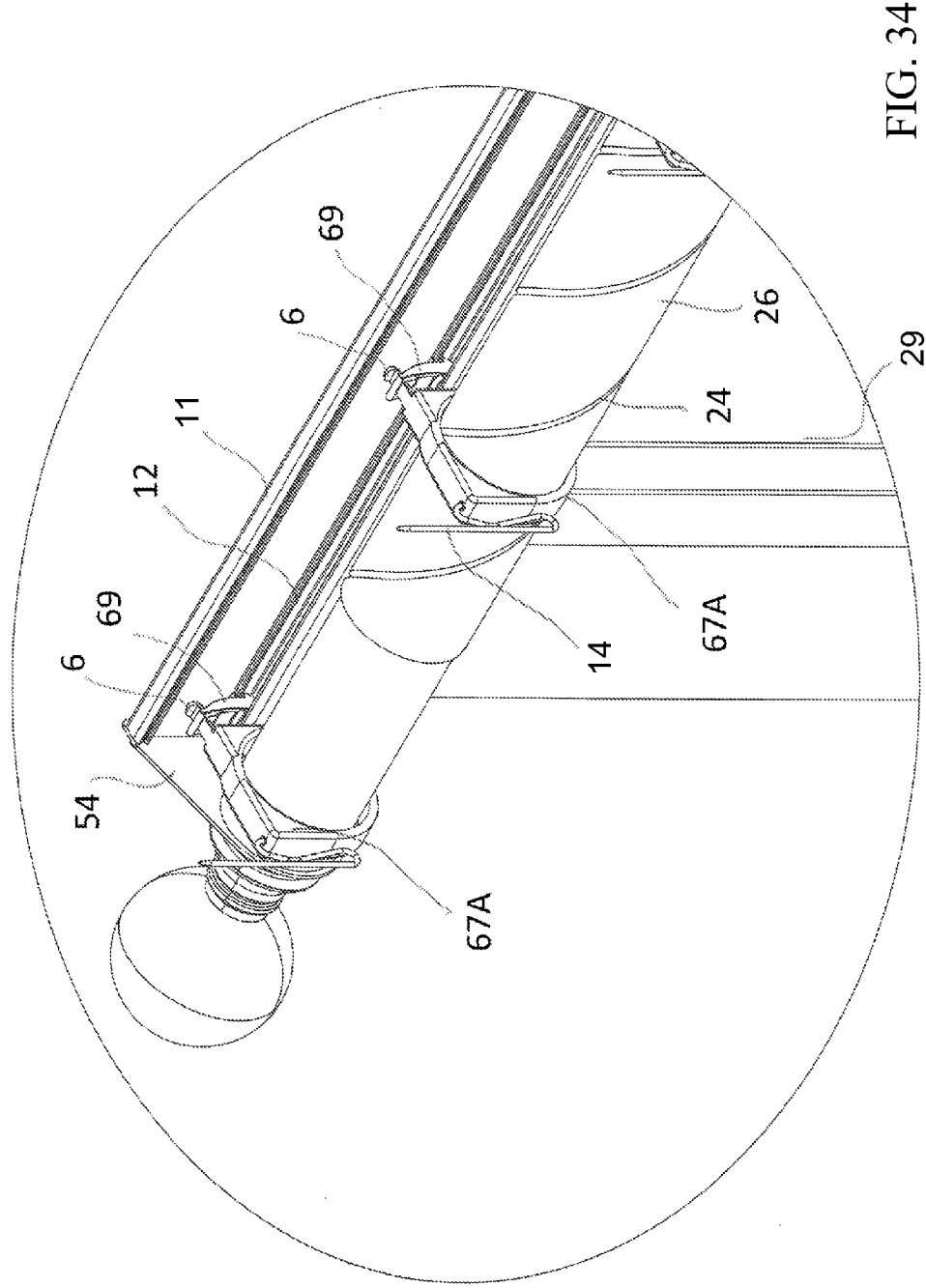

FIG. 34 is an enlarged perspective view of one embodiment of the curtain assembly non-driving groove.

Figure 35:
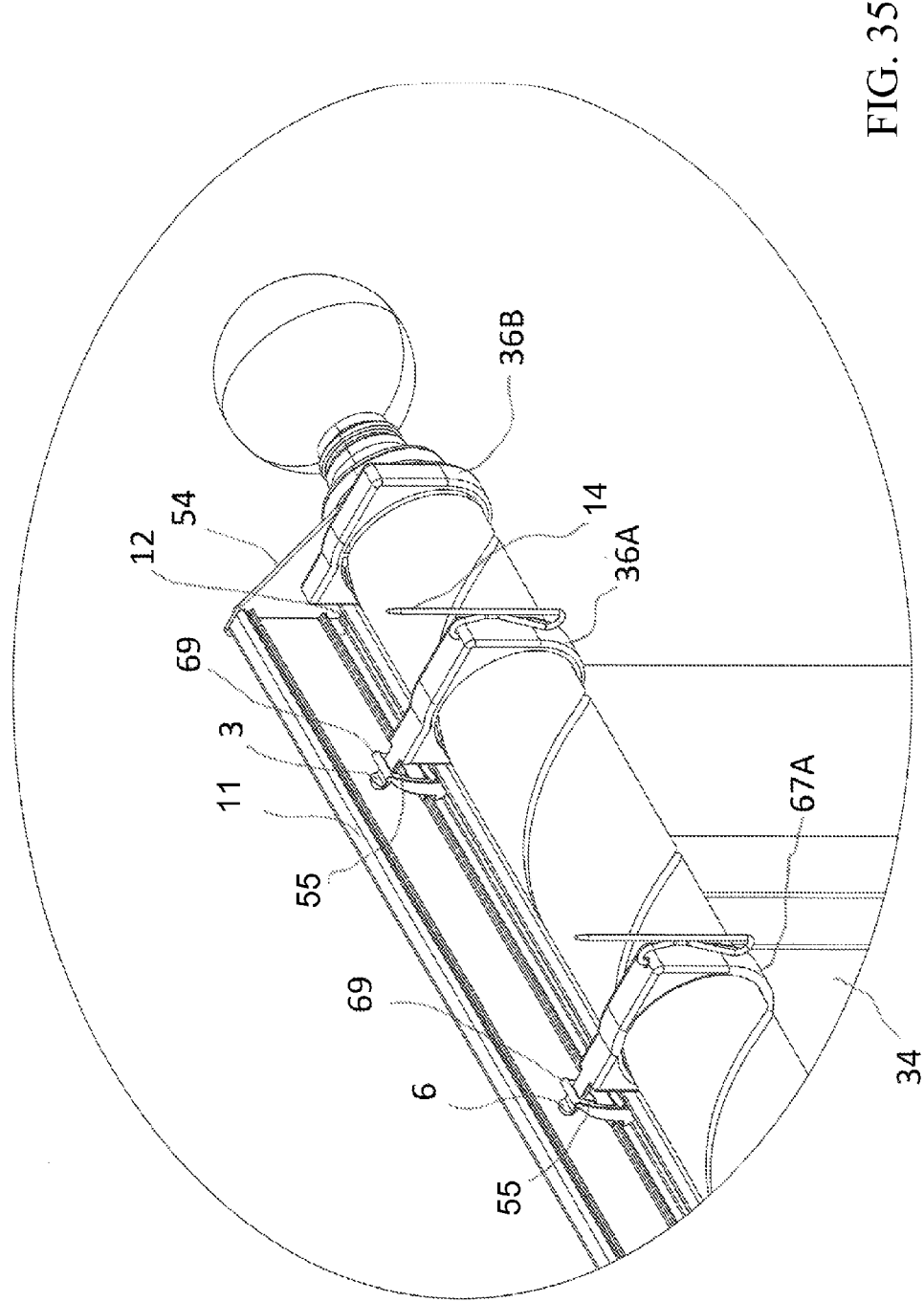

FIG. 35 is an enlarged perspective view of one distal end of the rotatable drive element showing the inner drive attachment element and the inner driver stall area according to the same embodiment of the curtain assembly shown in FIG. 34.

Figure 36:
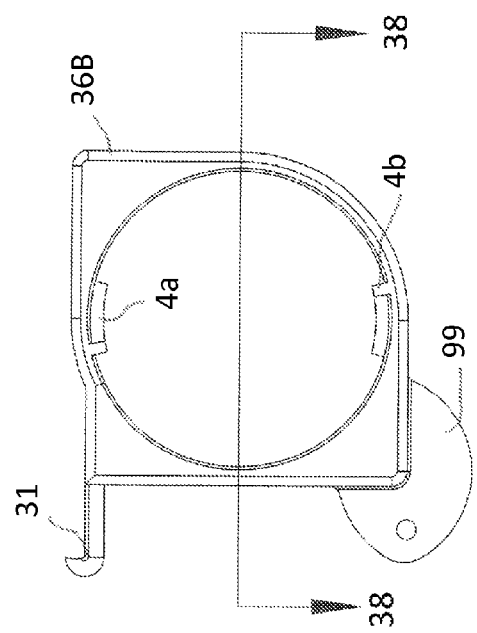

FIG. 36 is an enlarged side view of the inner drive attachment element according to one embodiment of the curtain assembly.

Figure 37:
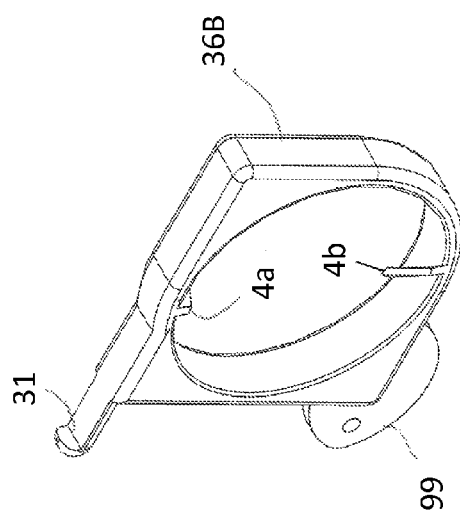

FIG. 37 is an enlarged perspective view of the inner drive attachment element according to one embodiment of the curtain assembly.

Figure 38:
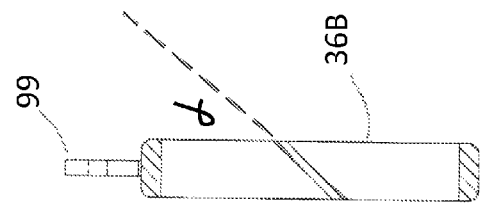

FIG. 38 is an enlarged sectioned view of the inner drive attachment element according to one embodiment of the curtain assembly.

Figure 39:
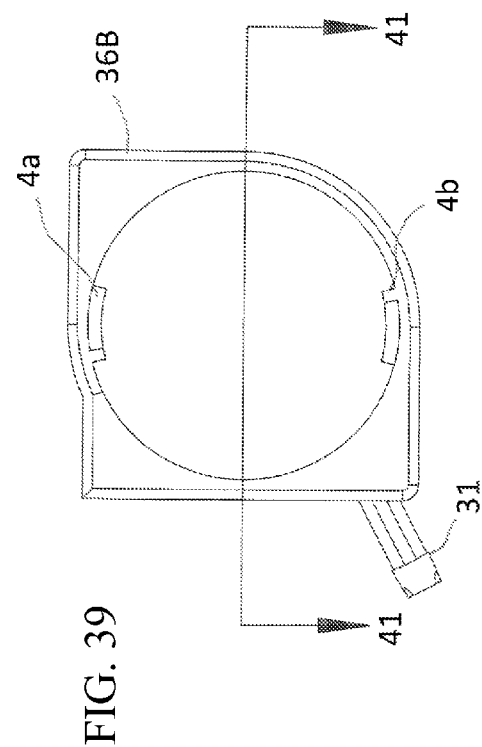

FIG. 39 is an enlarged side view of the inner drive attachment element according to one embodiment of the curtain assembly.

Figure 40:
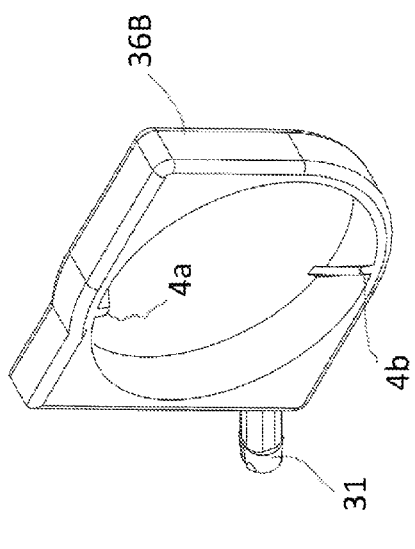

FIG. 40 is an enlarged perspective view of the inner drive attachment element according to one embodiment of the curtain assembly.

Figure 41:
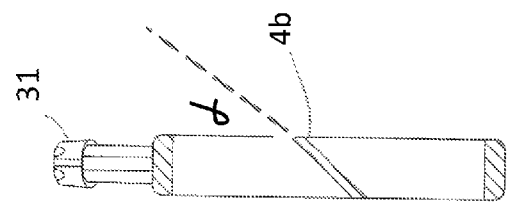

FIG. 41 is an enlarged sectioned view of the inner drive attachment element according to one embodiment of the curtain assembly.

Figure 42:
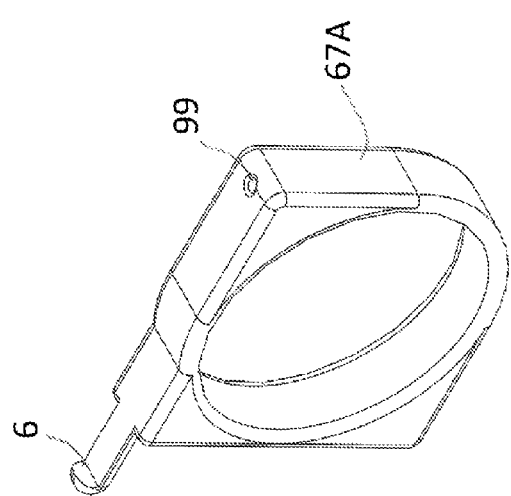

FIG. 42 is an enlarged perspective view of an outer idler attachment element according to one embodiment of the curtain assembly.

Figure 43:
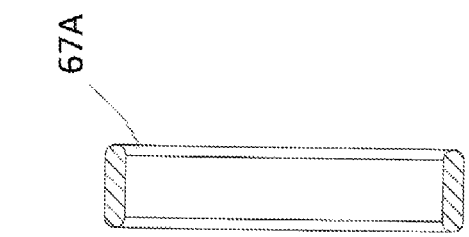

FIG. 43 is an enlarged sectioned view of an outer idler attachment element according to one embodiment of the curtain assembly.

Figure 44:
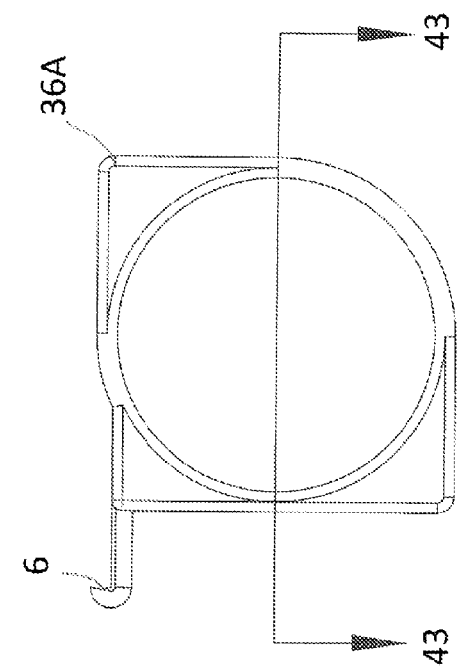

FIG. 44 is an enlarged side view of an outer idler attachment element according to one embodiment of the curtain assembly.

Figure 45:
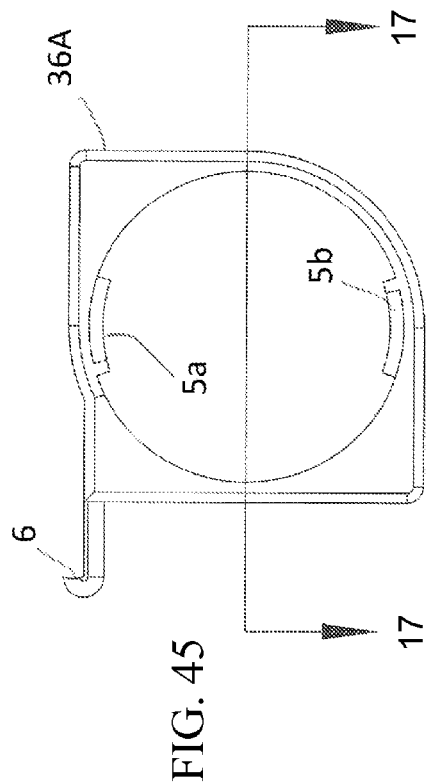

FIG. 45 is an enlarged side view of an outer drive attachment element according to one embodiment of the curtain assembly.

Figure 46:
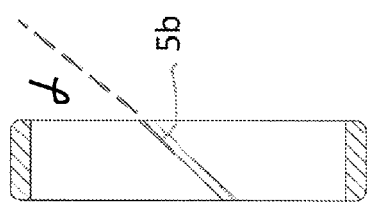

FIG. 46 is an enlarged sectioned view of an outer drive attachment element according to one embodiment of the curtain assembly.

Figure 47:
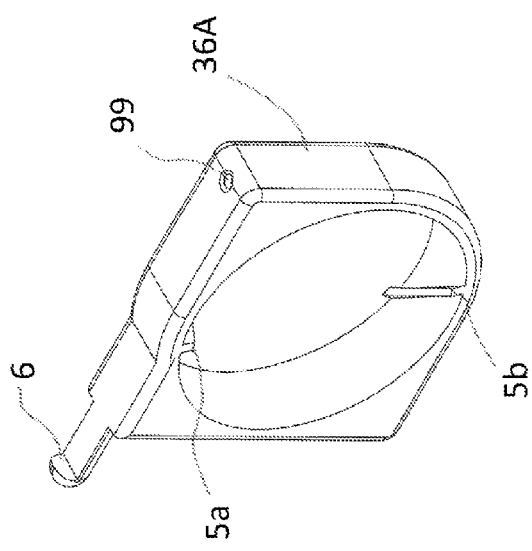

FIG. 47 is an enlarged perspective view of an outer drive attachment element according to one embodiment of the curtain assembly.

Figure 48:
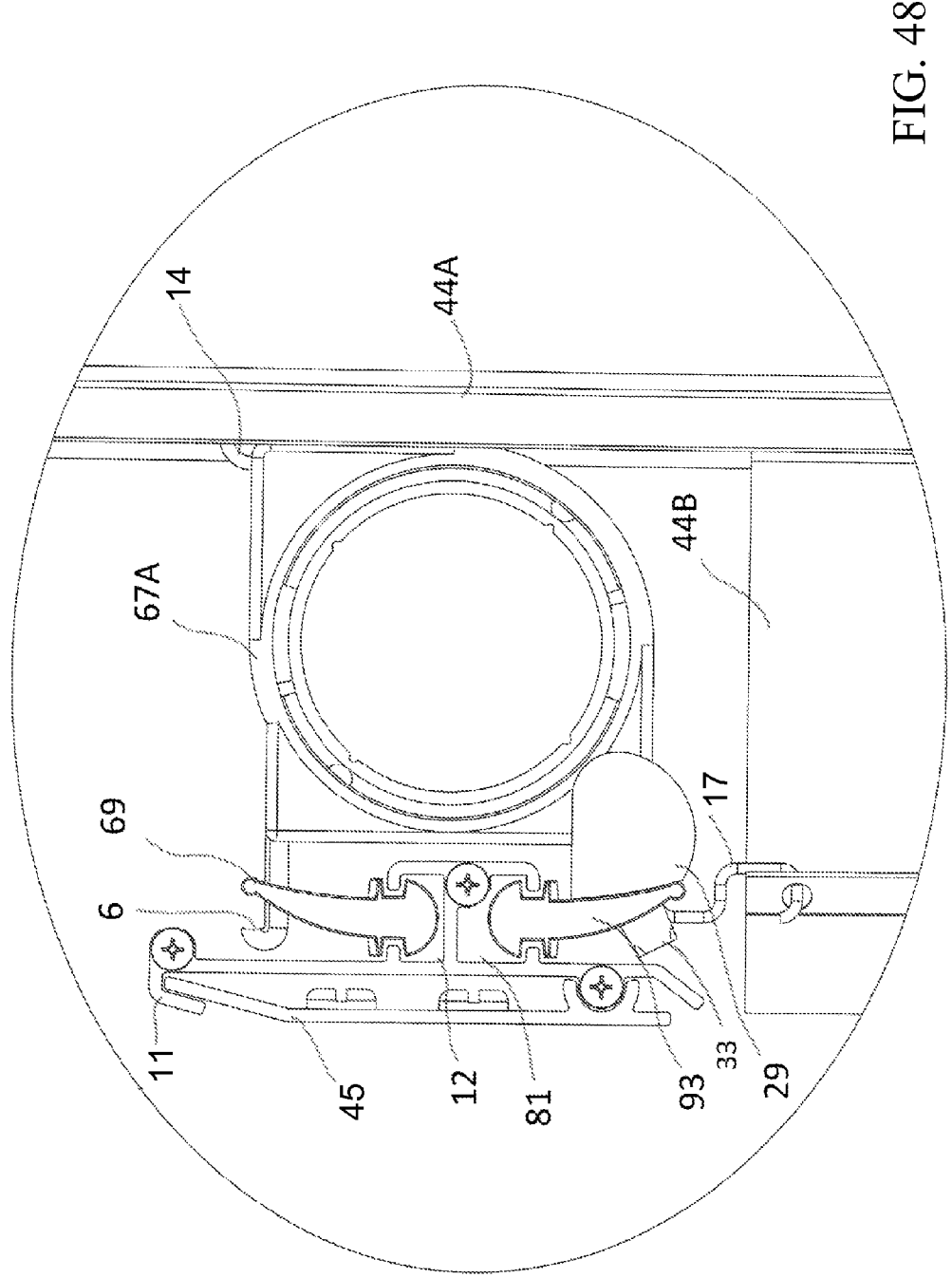

FIG. 48 is an end view of the curtain assembly showing the guide track, guides, attachment elements, and the position of the inter-curtain engager.

Figure 49:
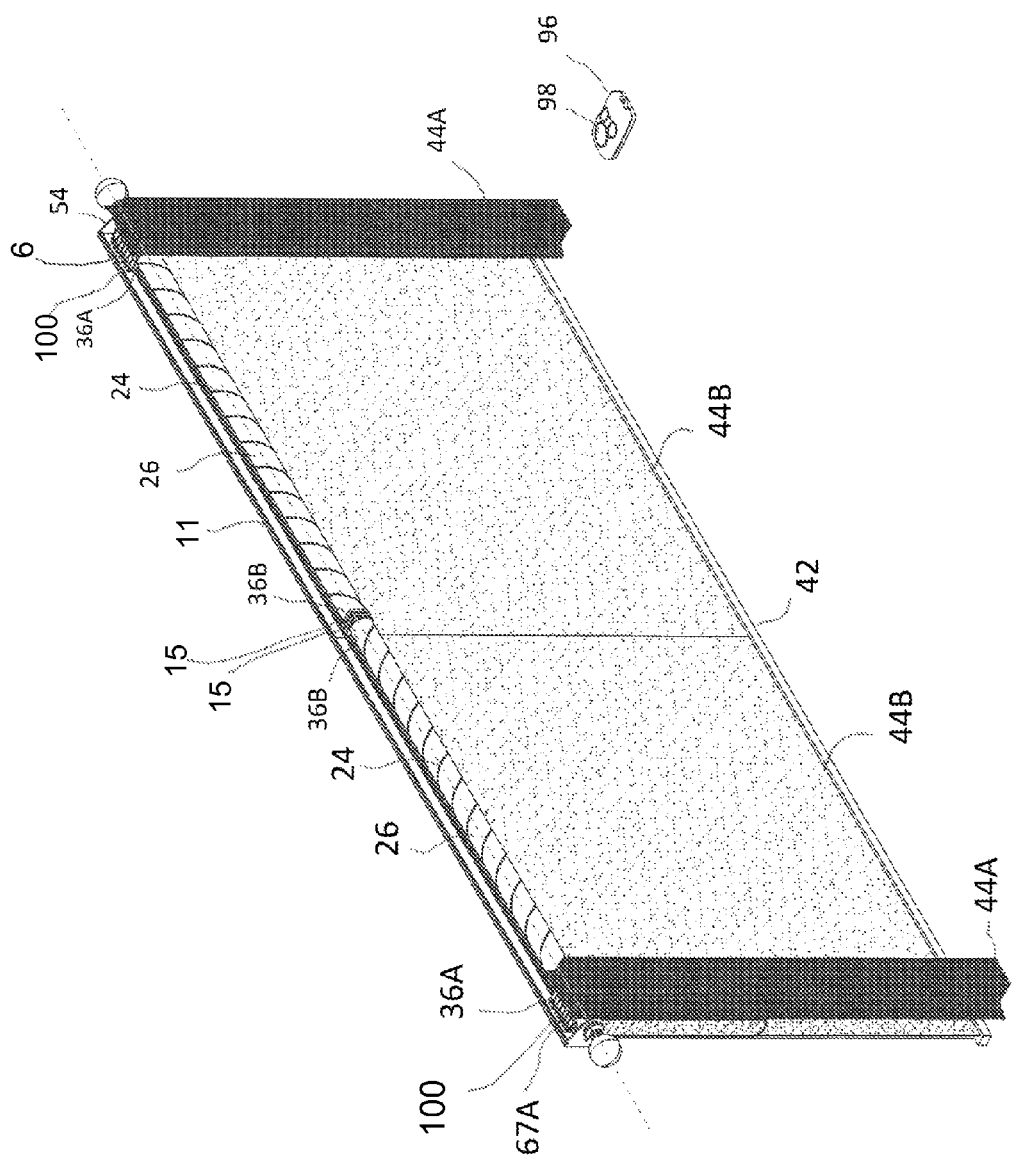

FIG. 49 is a is a perspective view of a curtain assembly according to one embodiment when the outer curtains are center closing blackout curtains in the stored position and the inner curtains are center closing sheer curtains in the deployed position.

Figure 50:
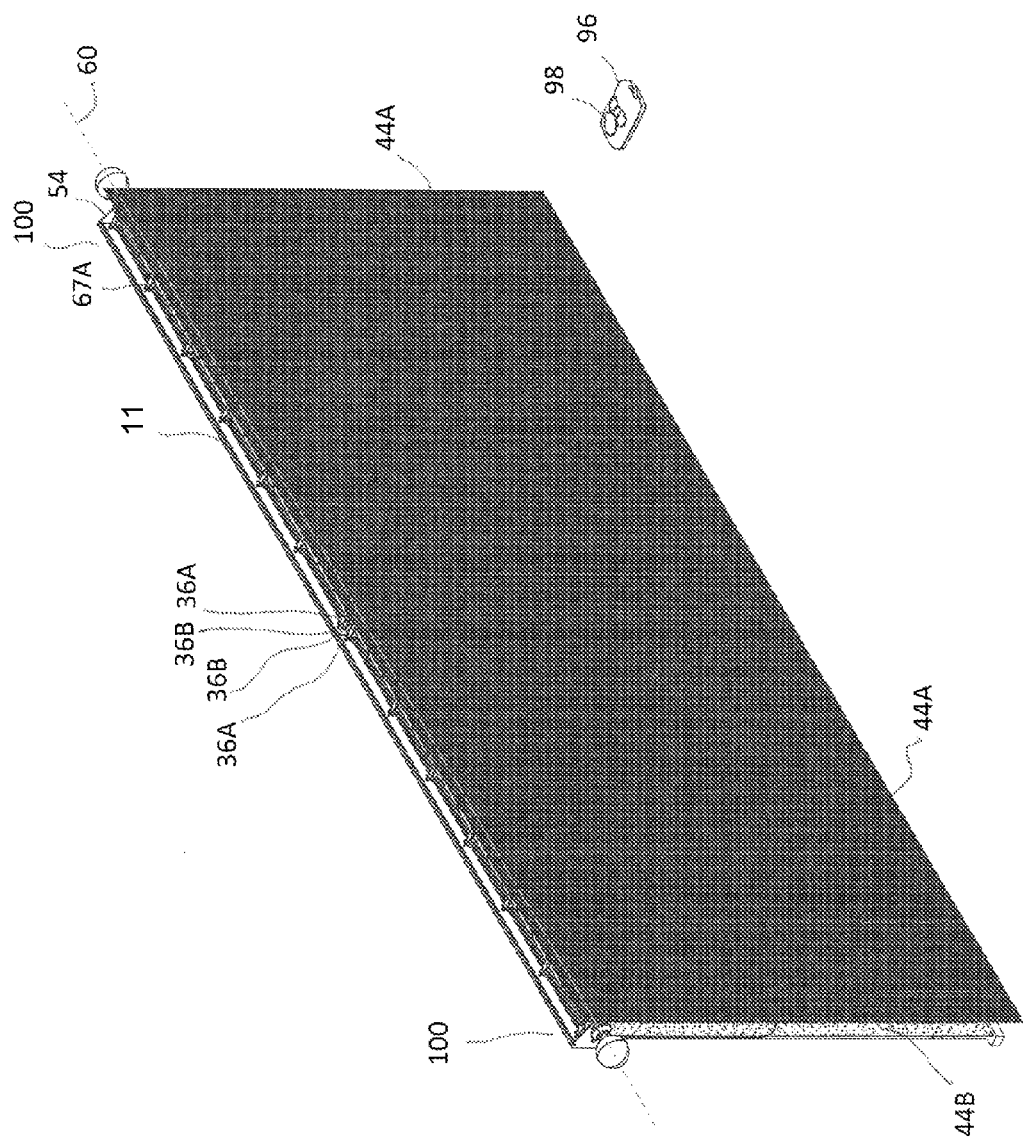

FIG. 50 is a perspective view of a curtain assembly according to one embodiment when the outer curtains are center closing blackout curtains in the deployed position and the inner curtains are center closing sheer curtains in the stored position.

Figure 51:
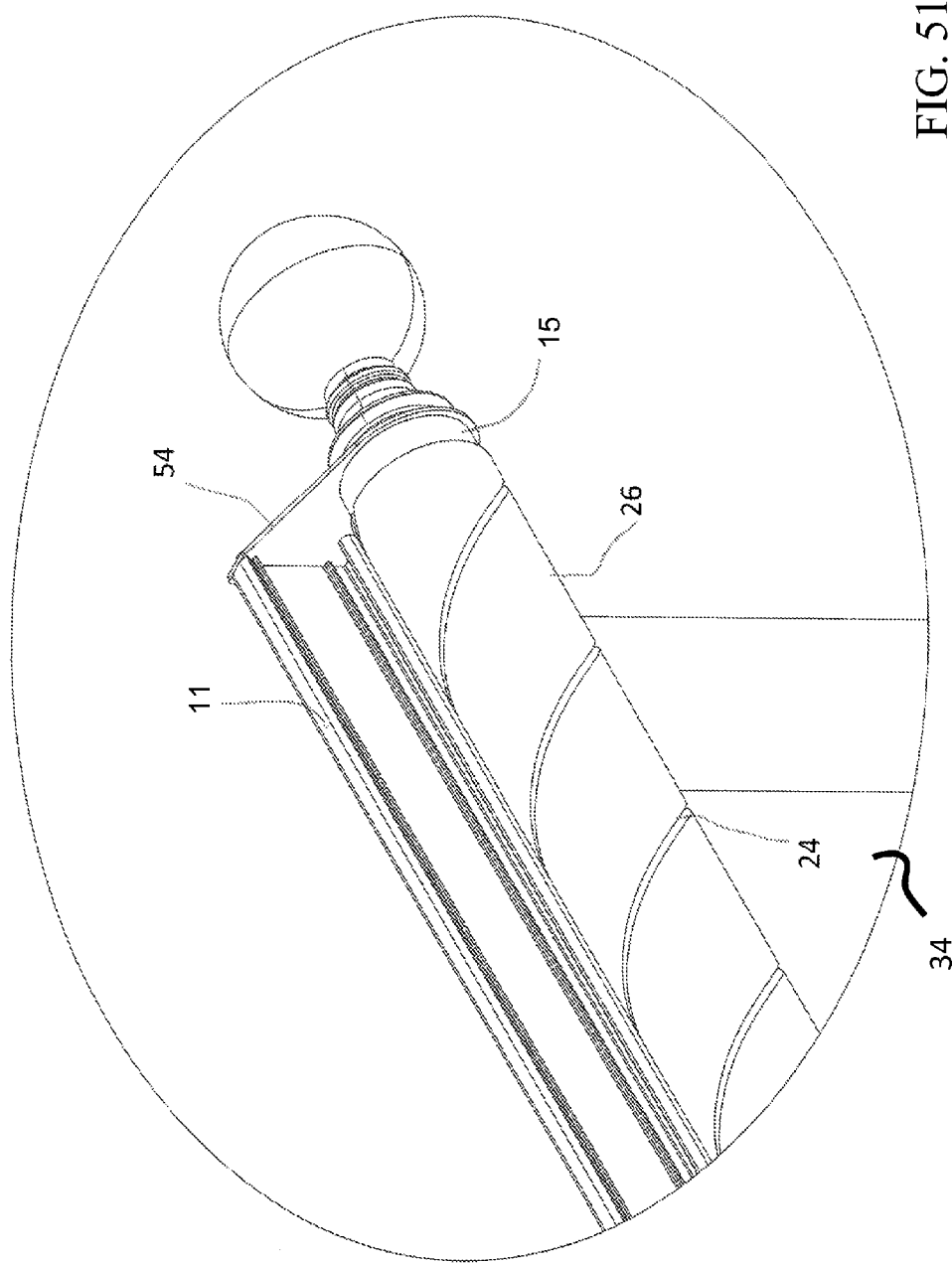

FIG. 51 is a perspective view of the tube end with the inner driver stall area.

FIG. 52 is a top view of the curtain assembly with the guide track removed to see the position of the guides and attachment elements with the inner and outer curtains deployed and the outer drive attachment element can stop the tube from rotation when it stalls against the inner attachment element in the stall area.

FIG. 53 is a top view of the curtain assembly with the guide track removed to see the position of the guides and attachment elements with the inner curtains deployed and the inter-curtain engager is in the engage-outer-drive-attachment-element position and the inner drive attachment element is in the stall area.

FIG. 54 is a top view of the curtain assembly with the guide track removed to see the position of the guides and attachment elements with the inner and outer curtains in the stored position and the outer simple attachment elements and the outer drive attachment element are in the non-driving or stall area. The inner curtain drive attachment element can stop the tube from rotation when it contacts the outer curtain drive attachment element.

Figure 55:
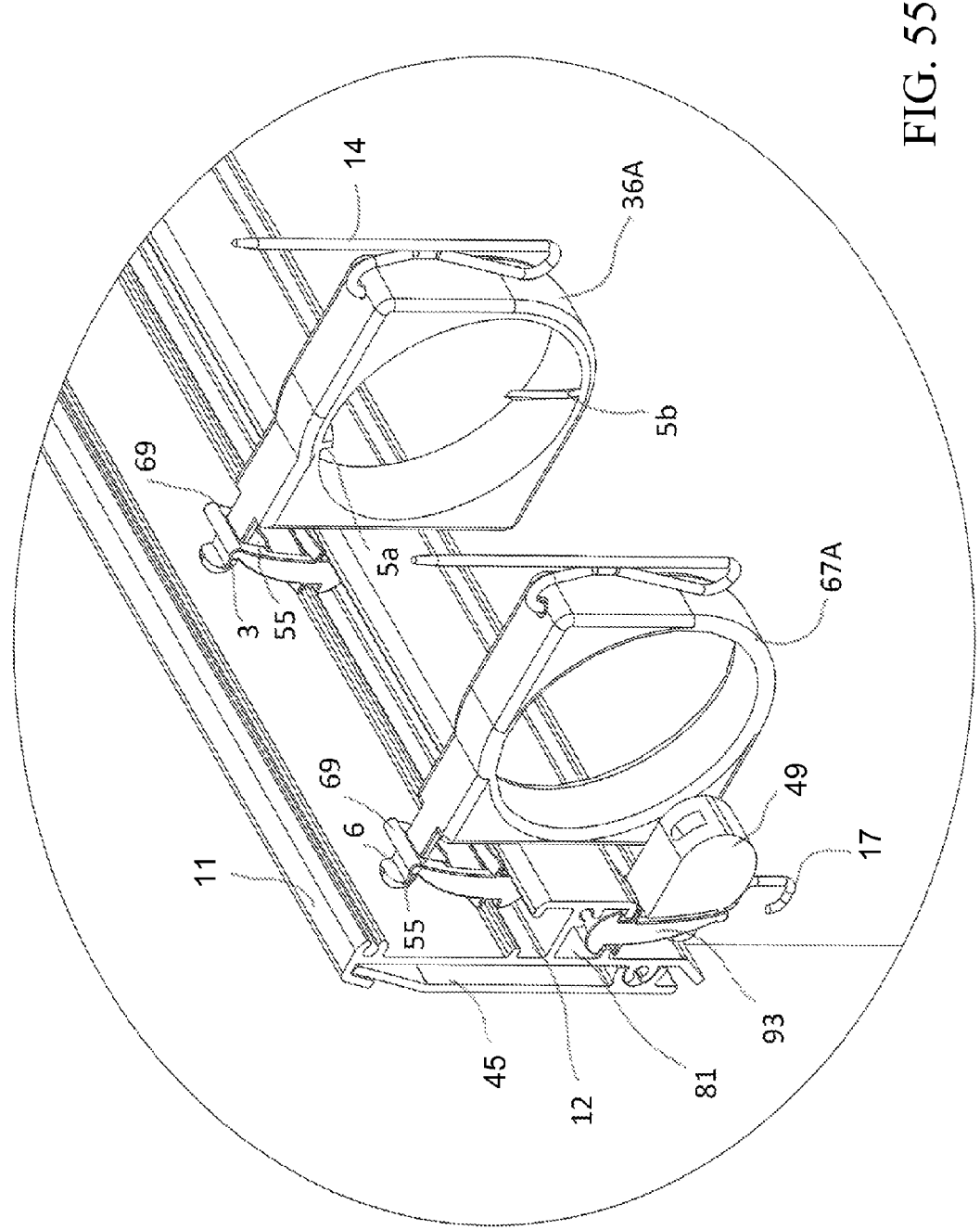

FIG. 55 is a perspective view of the area where the outer attachments are stored with the tube, inner and outer curtains removed to show the position of the inter-curtain engager and the carrier tracks.

Figure 56:
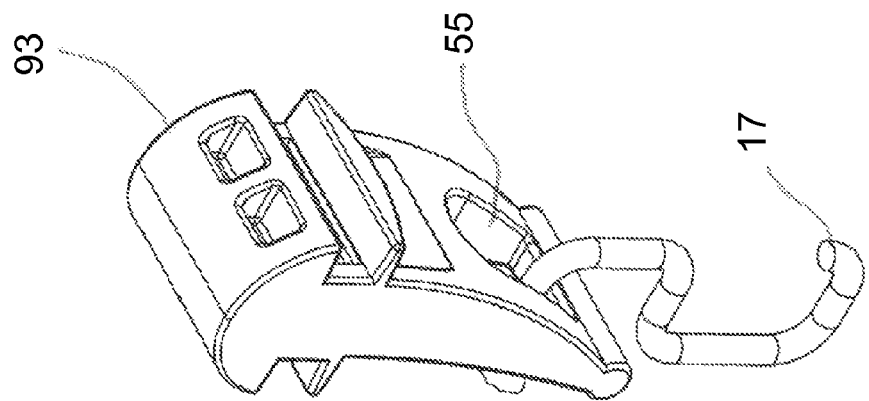

FIG. 56 is a perspective view of the inner curtain carrier and S-hook.

Figure 57:
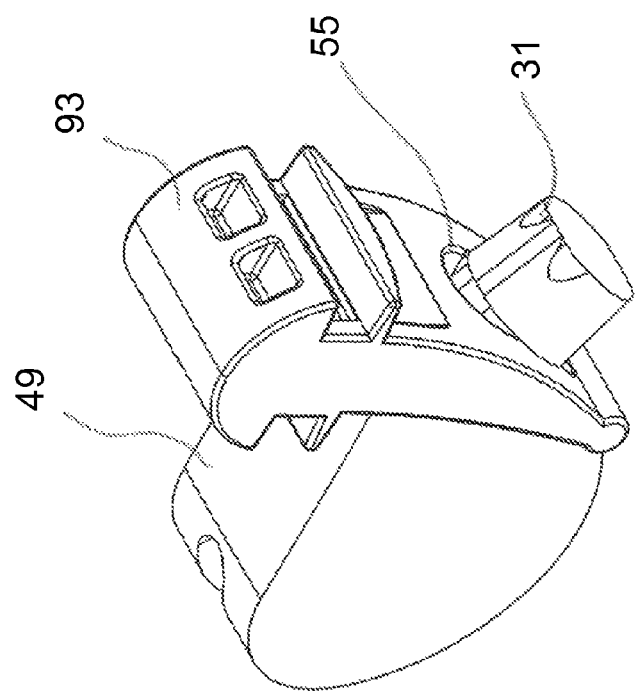

FIG. 57 is a perspective view of the inner curtain carrier with the inner curtain engager.

Figure 58:
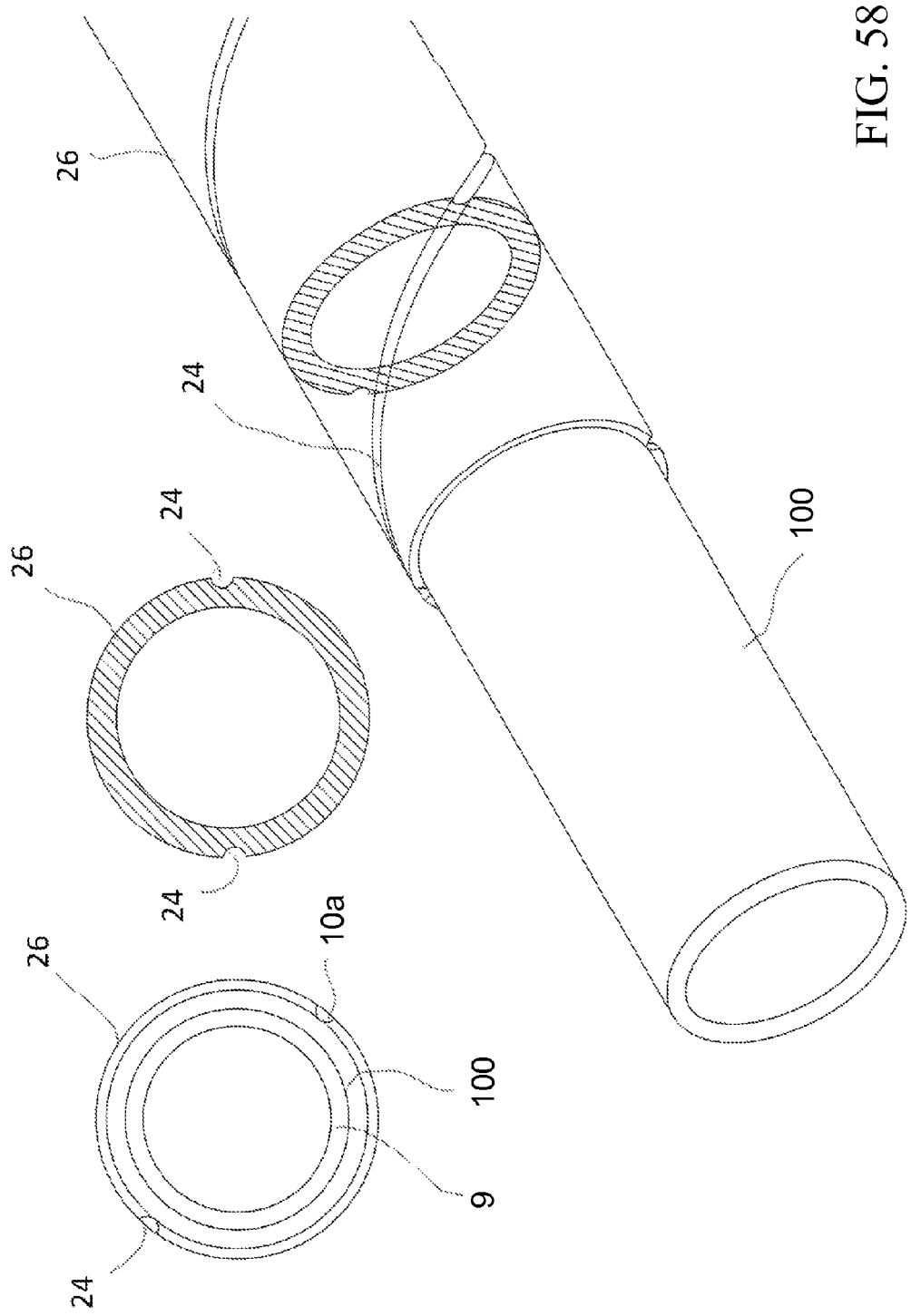

FIG. 58 is three views of the preferred tube embodiment with an outer driver stall area and two helical grooves spaced 180 degrees apart.

Figure 59:
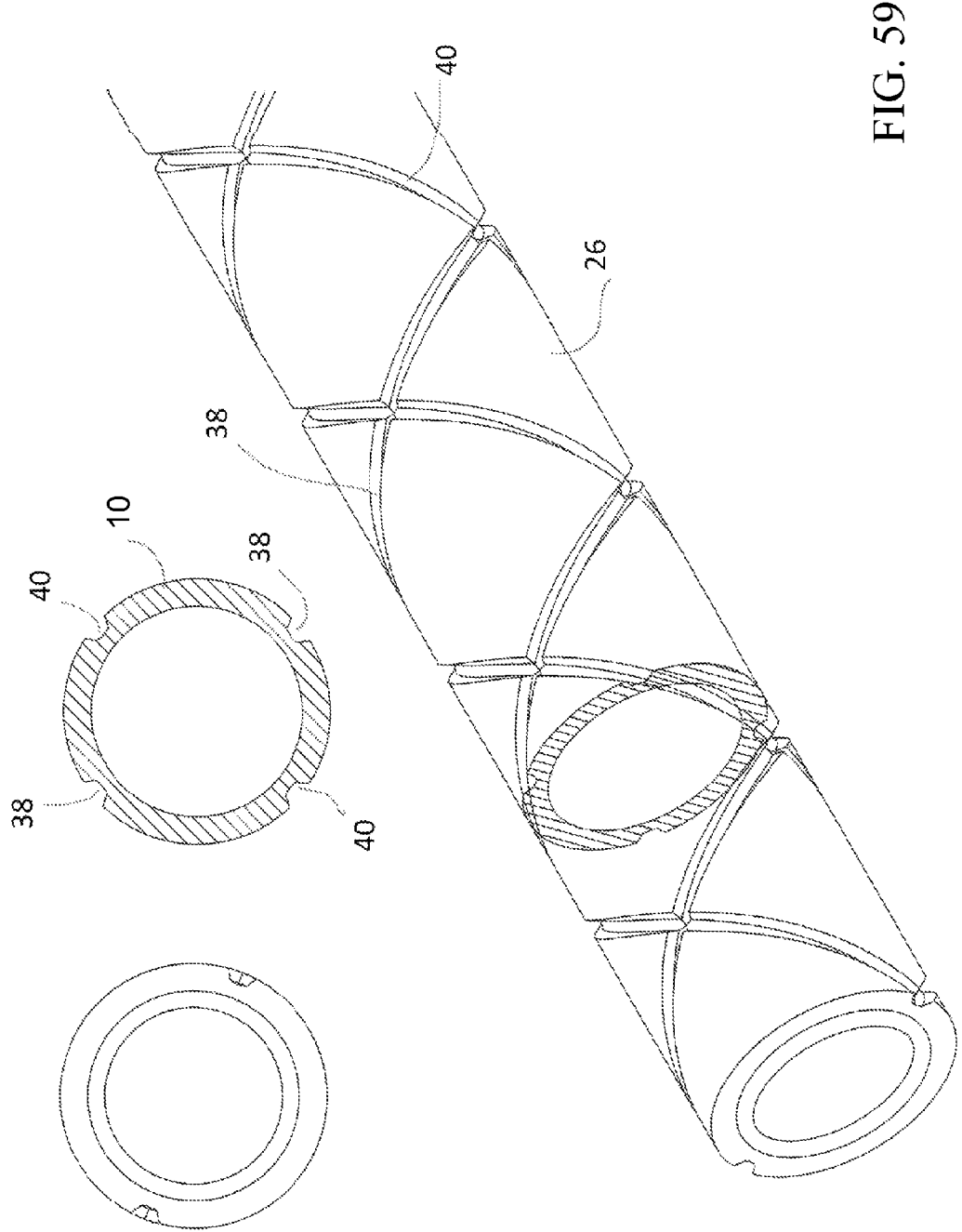
Figure 63A:
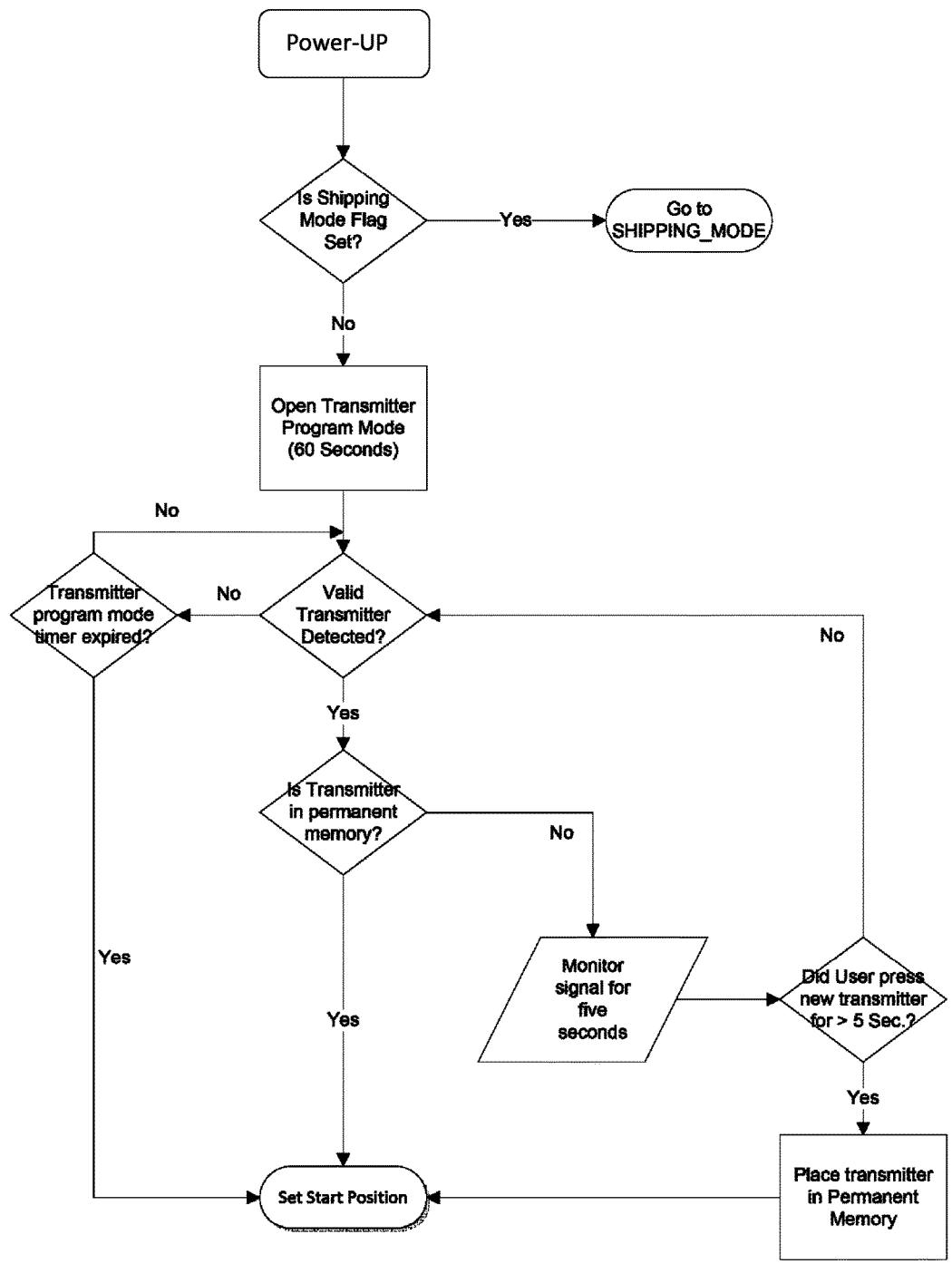
Figure 63B:
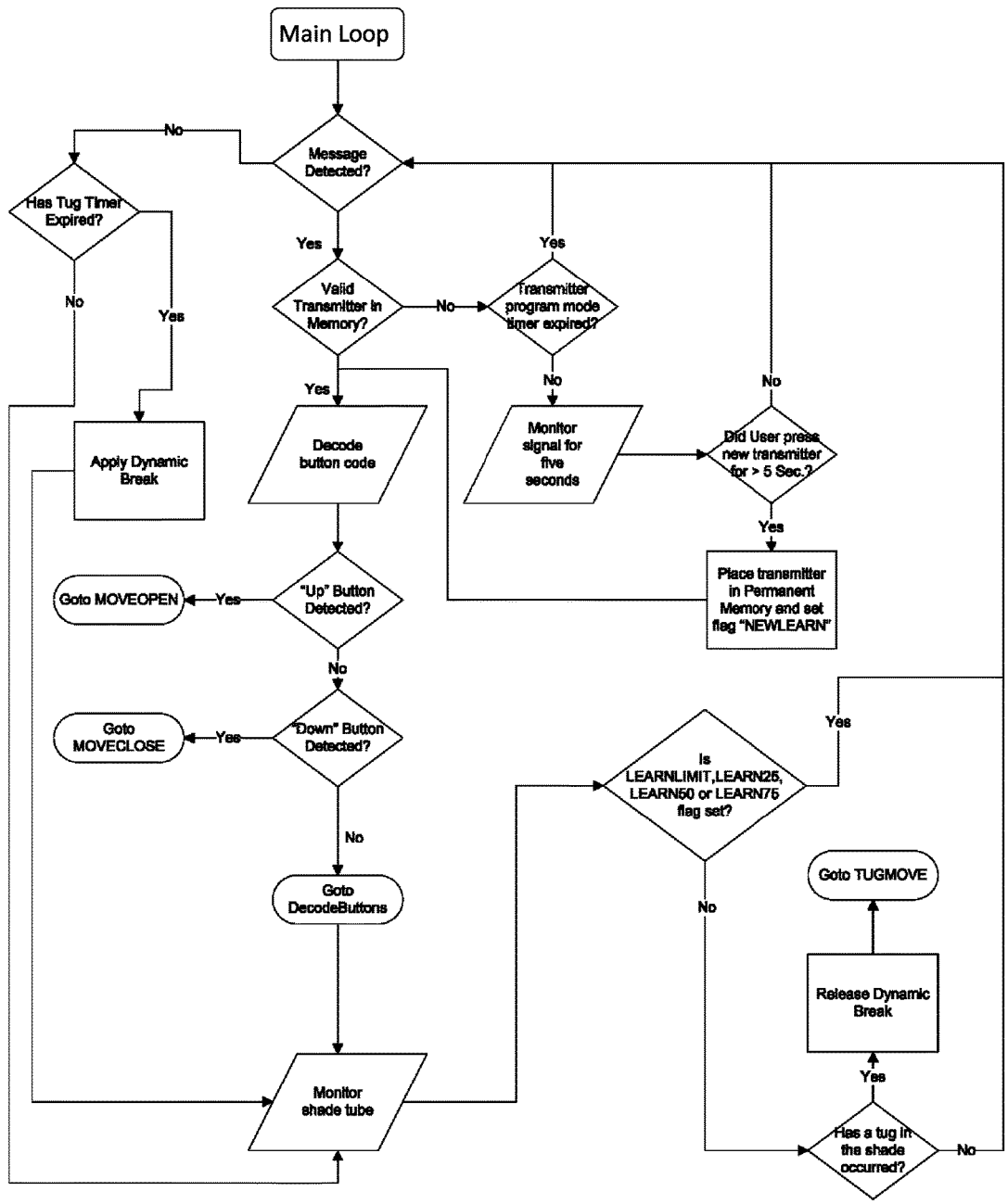
Figure 63C:
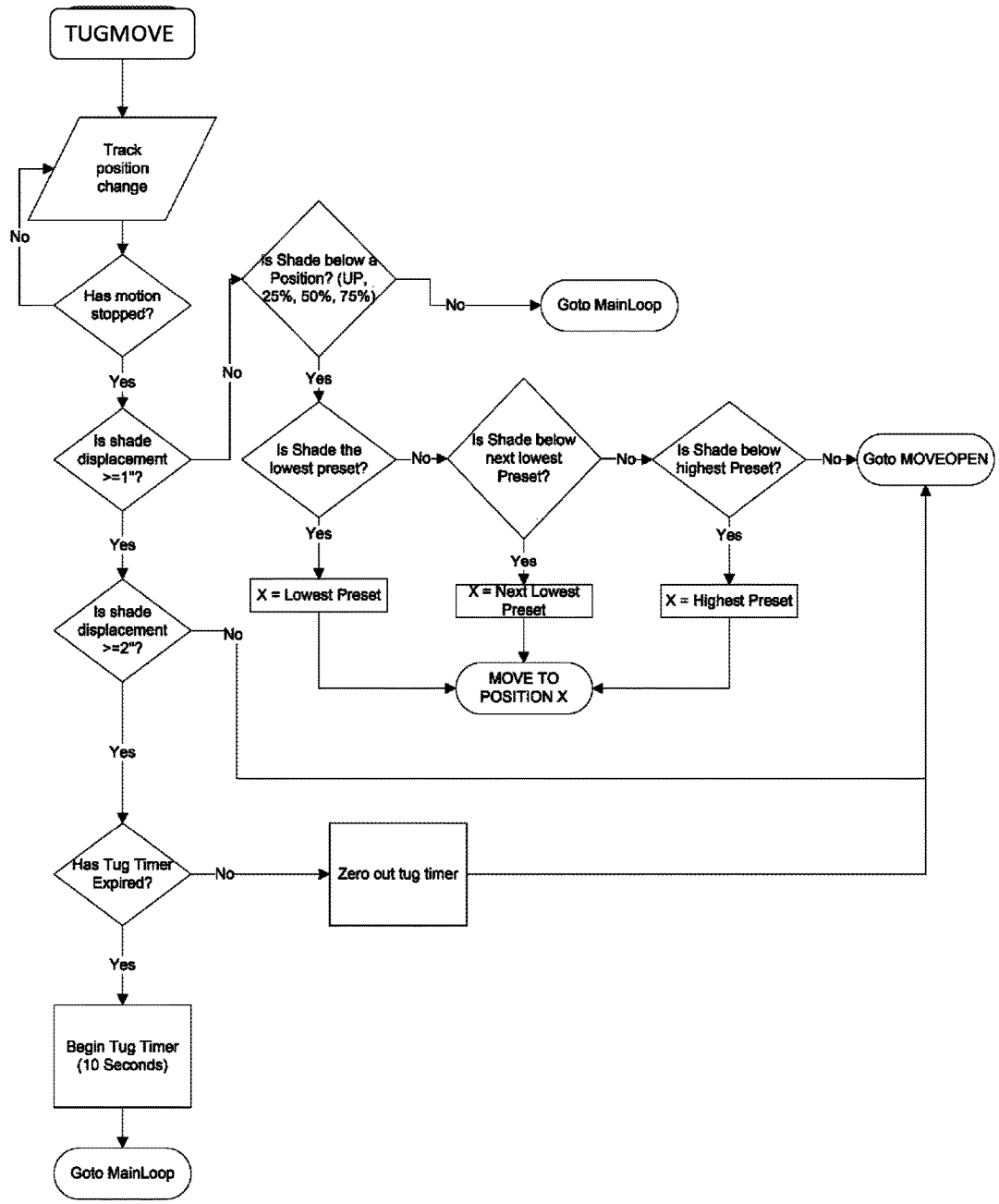
Figure 63D:
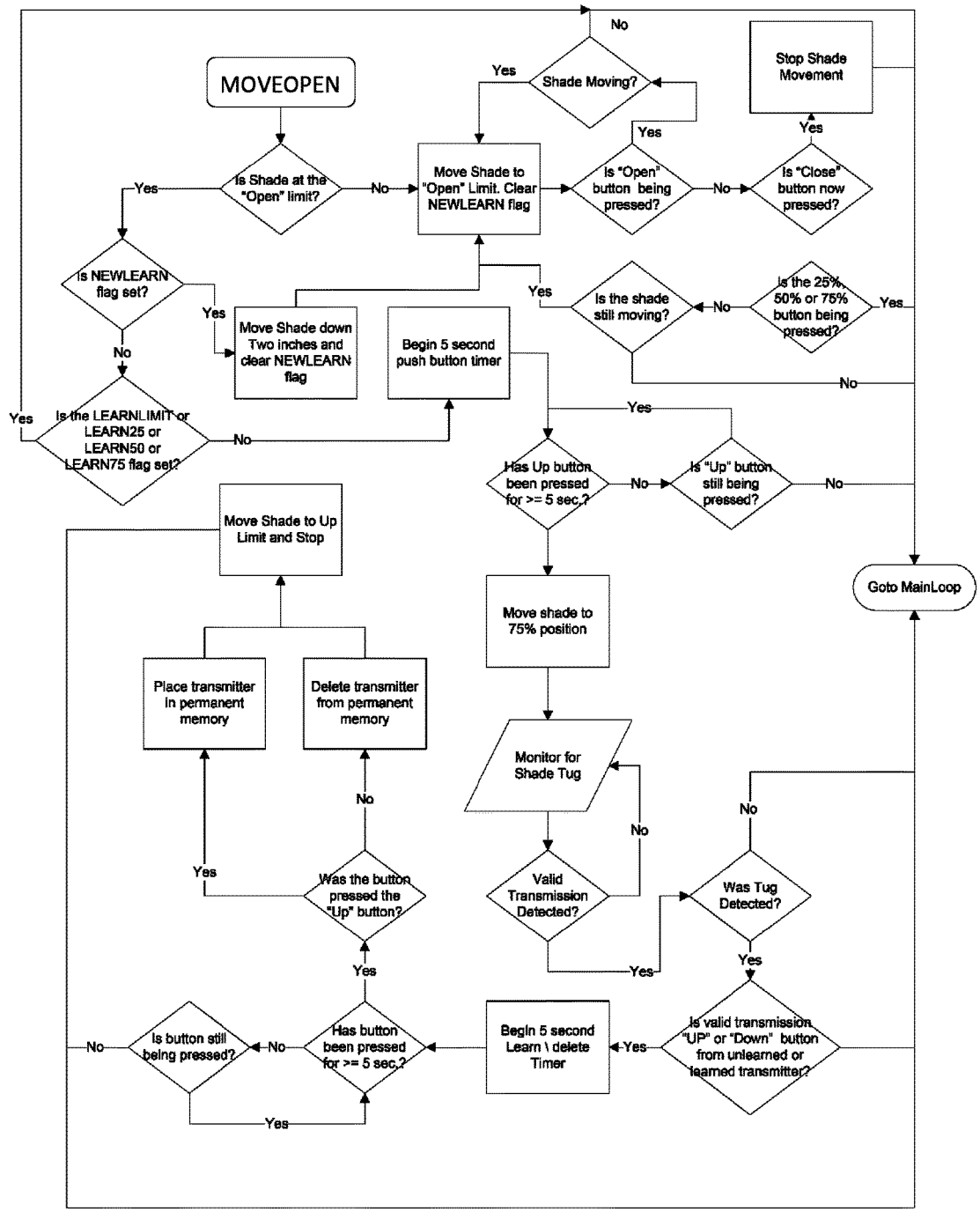
Figure 63E:
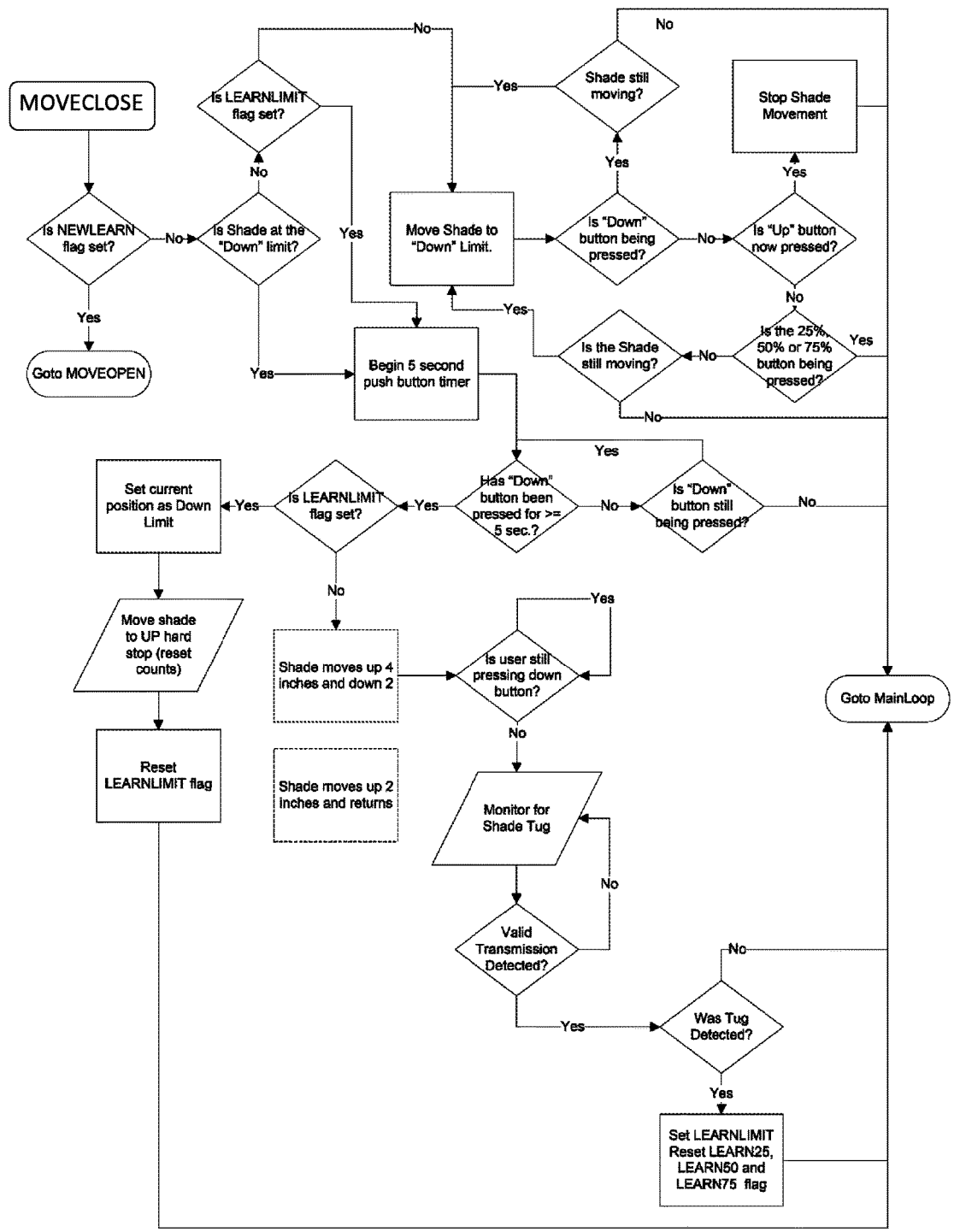
Figure 63F:
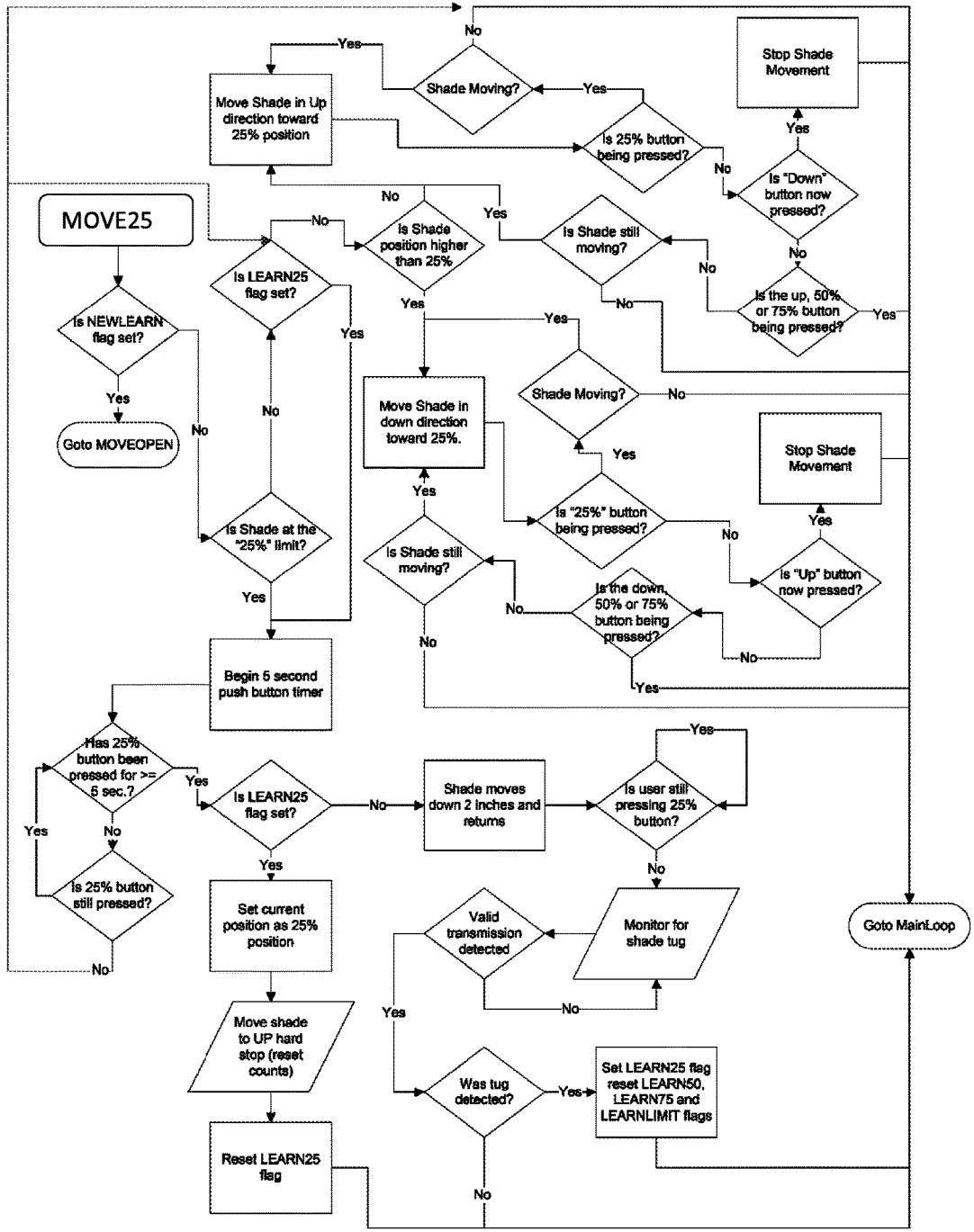
Figure 63G:
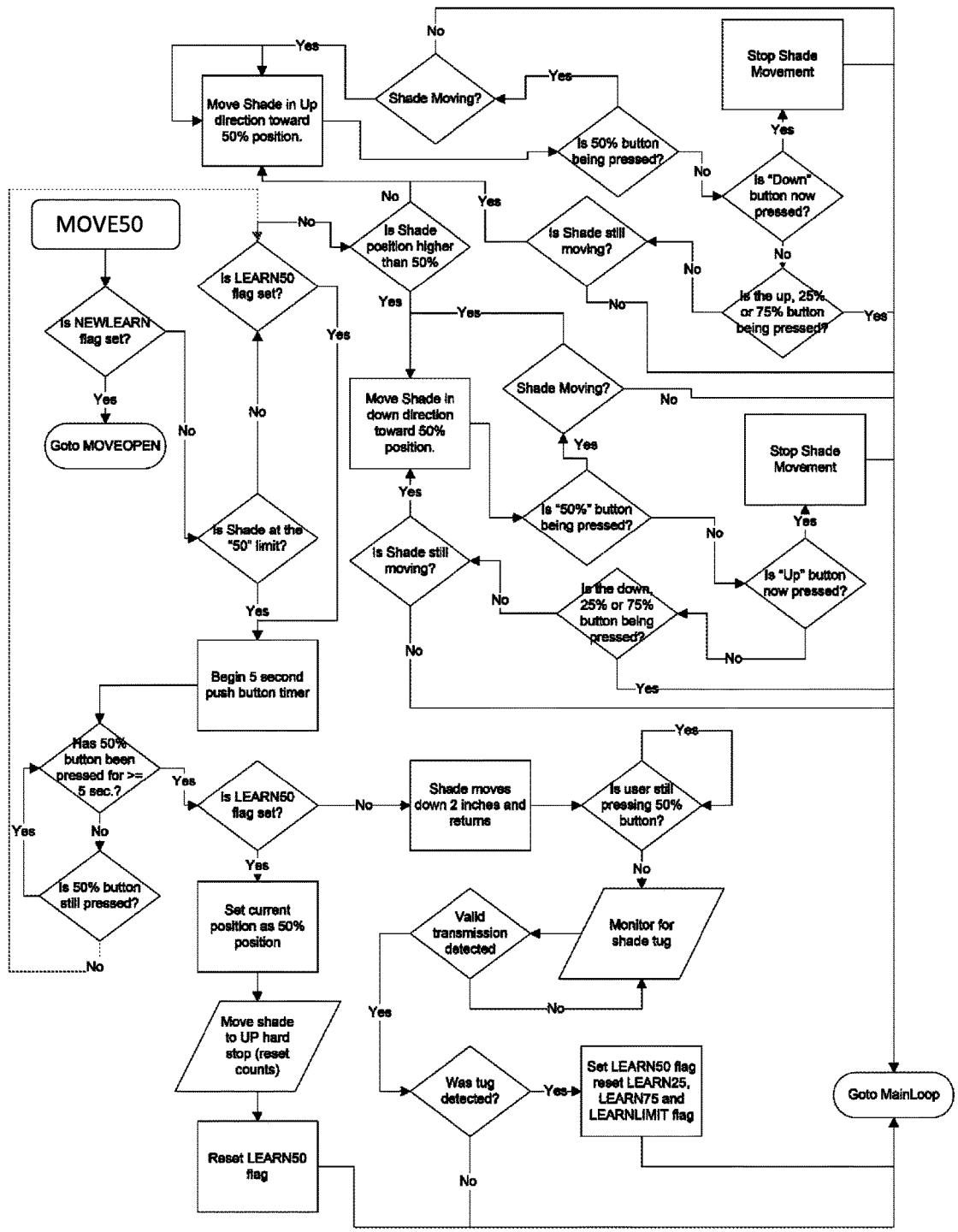
Figure 63H:
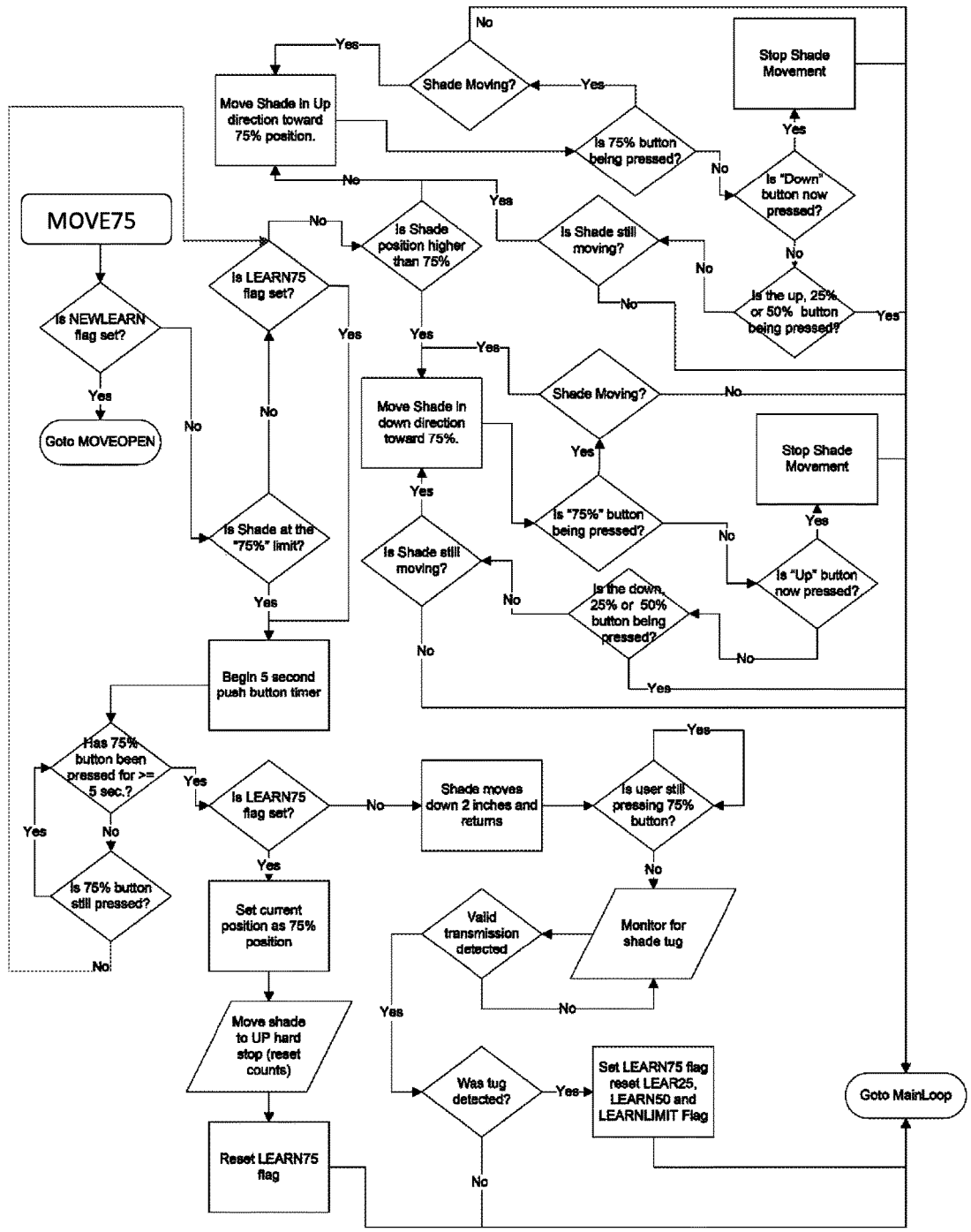
Figure 63I:
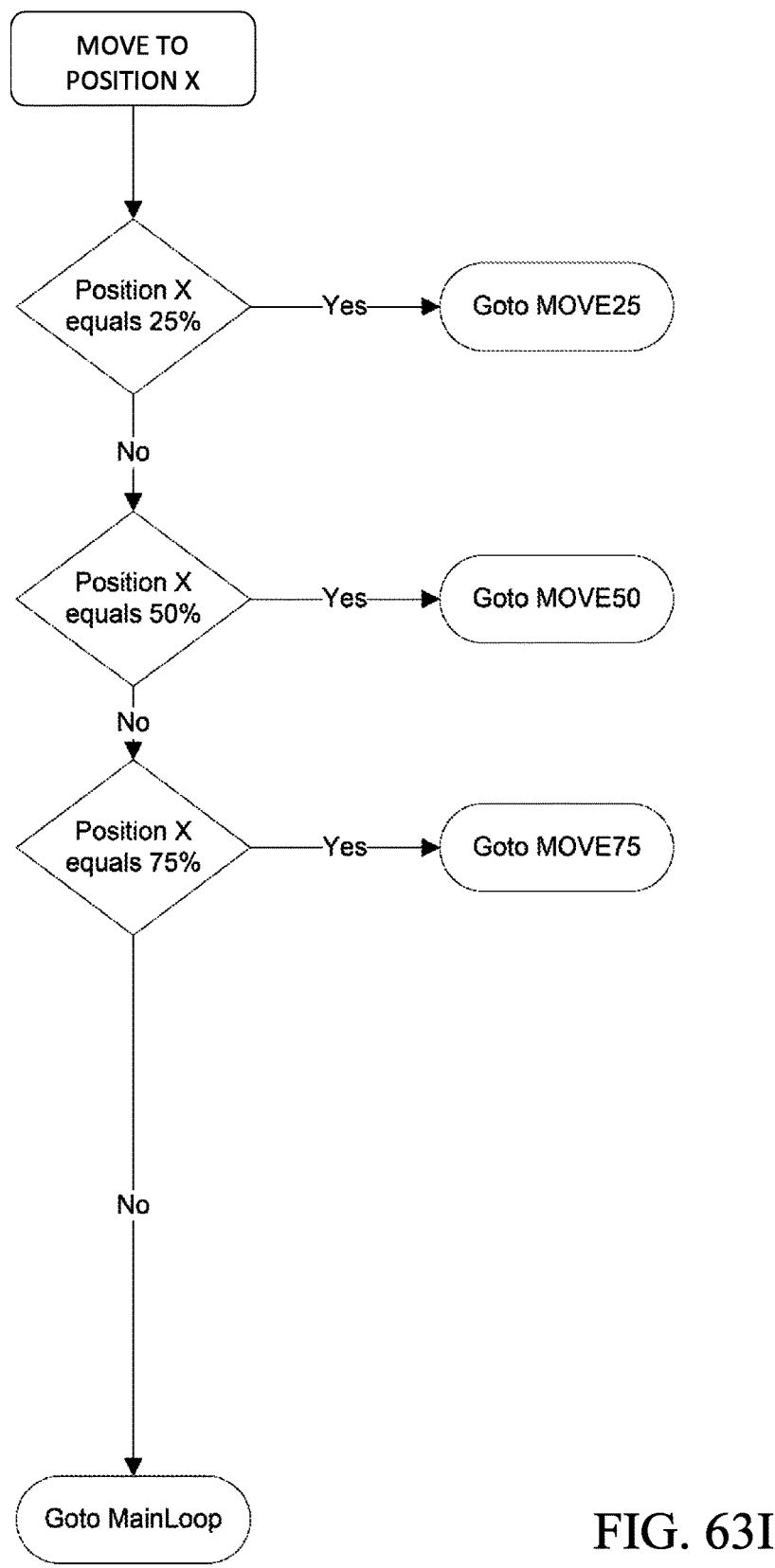
Figure 63J:
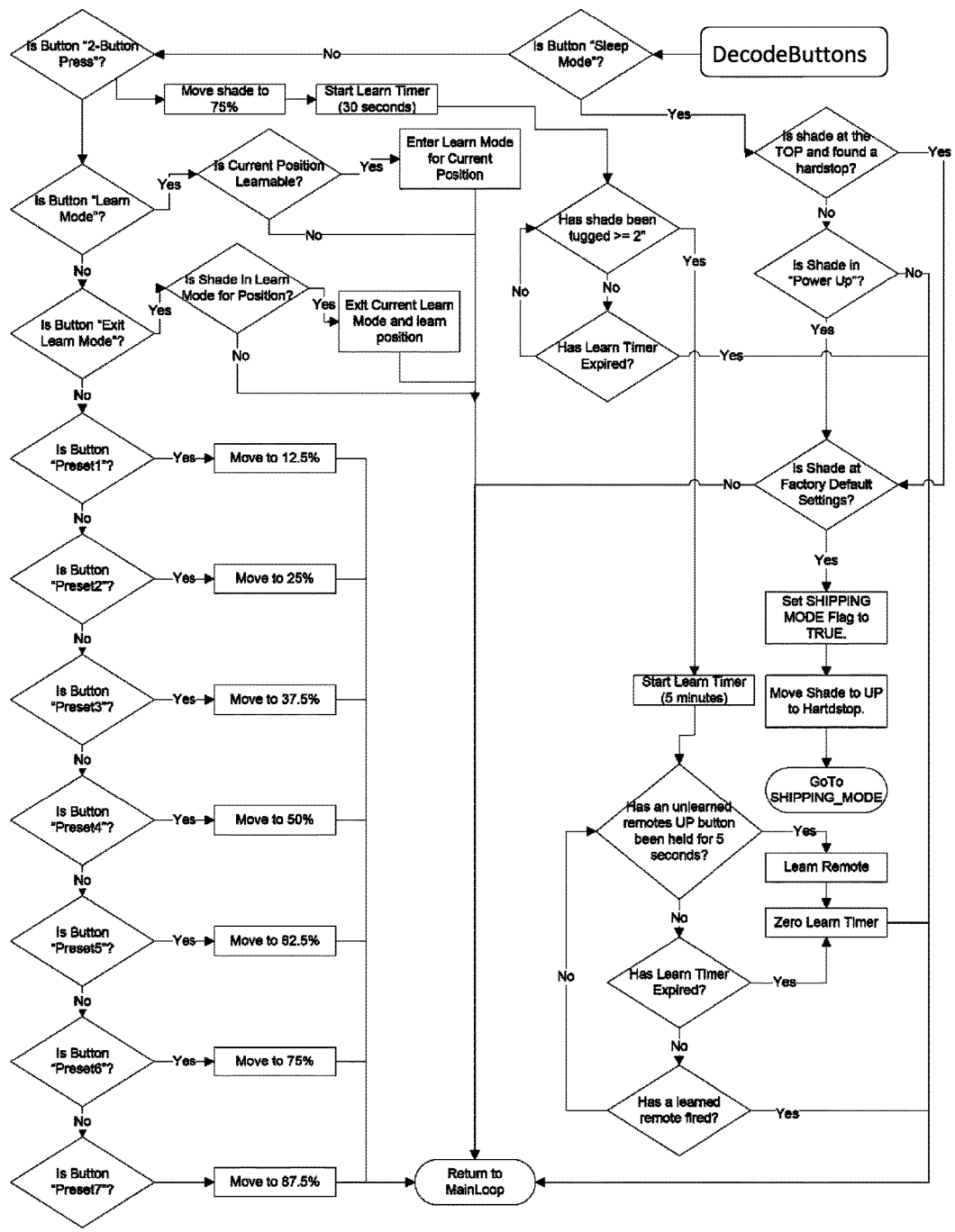
Figure 63K:
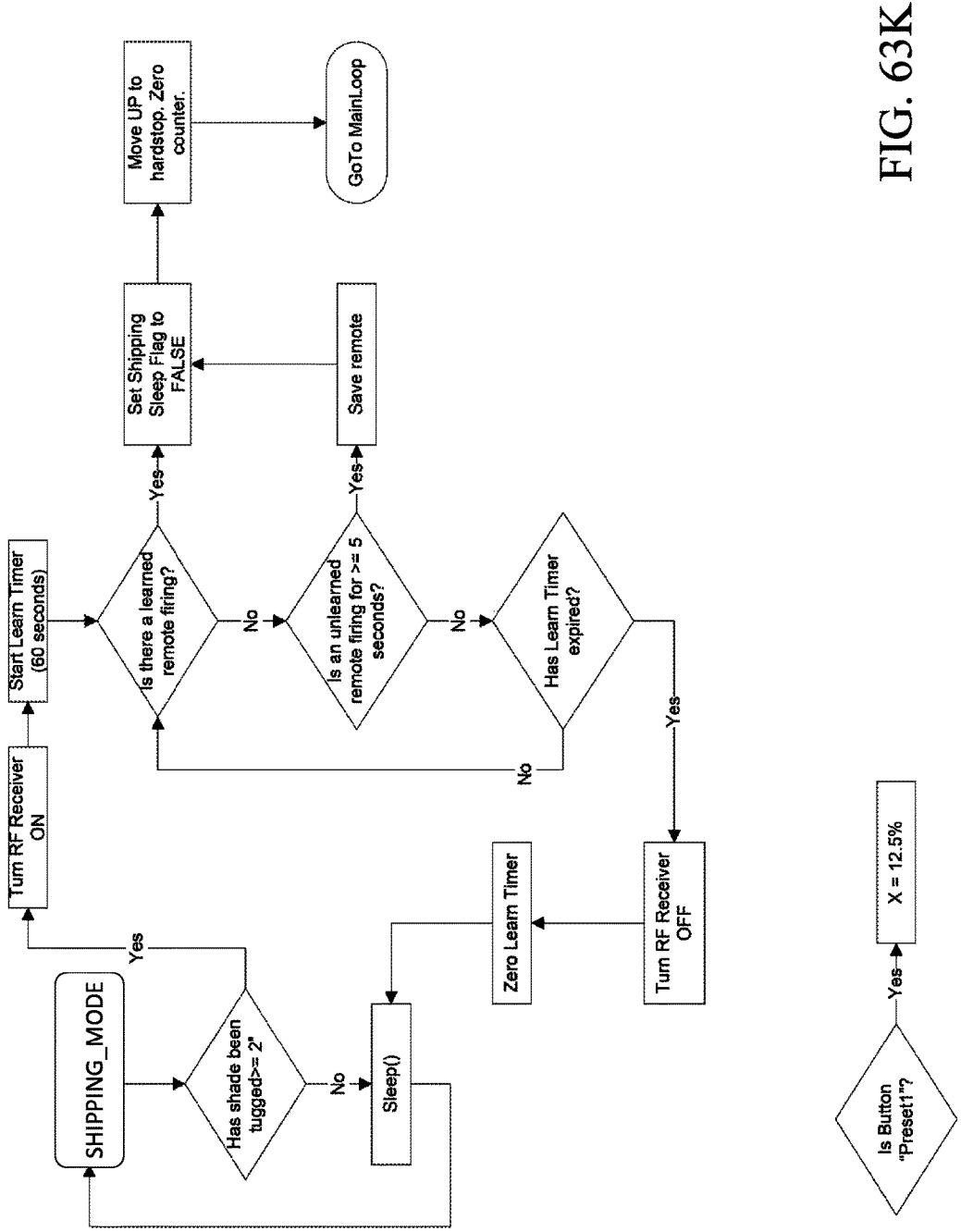
Figure 63L:
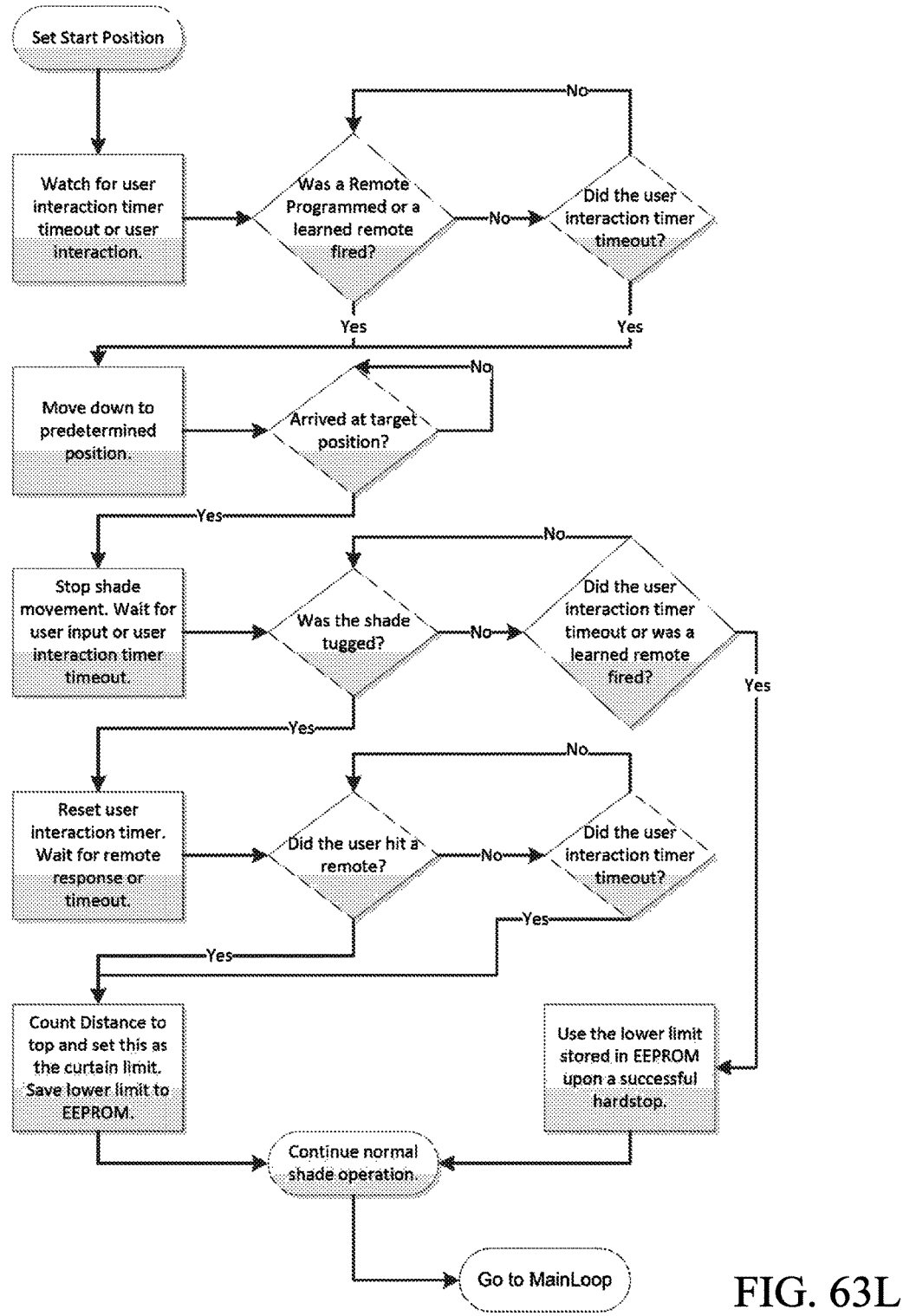

FIG. 59 is another tube embodiment with four helical grooves, two are counter clockwise spaced 180 degrees apart and two are clockwise spaced 180 degrees apart.

FIG. 60 is another embodiment of a tri-lobed tube, drive element, and internal tube driver.

FIG. 61 shows four views of the inner curtain carrier and S-hook.

FIG. 62 shows four views of the inter-curtain engager.

FIGS. 63A-63L show flowcharts for the control system for specific embodiments of the invention.

DETAILED DESCRIPTION

Figure 1:
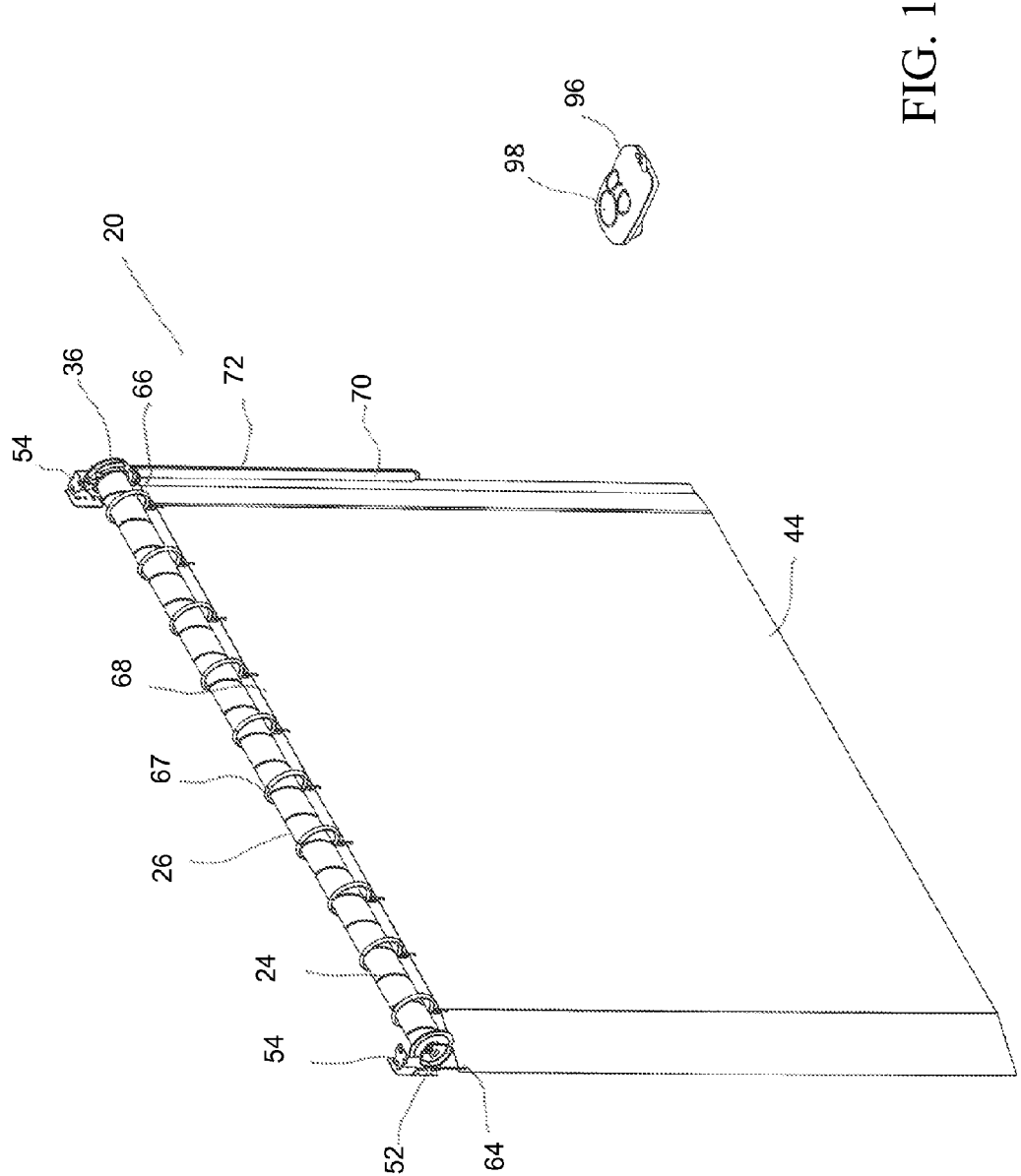
FIG. 1 is a perspective view of one embodiment of the curtain assembly showing a curtain in the deployed position and the window is covered.
Figure 2:
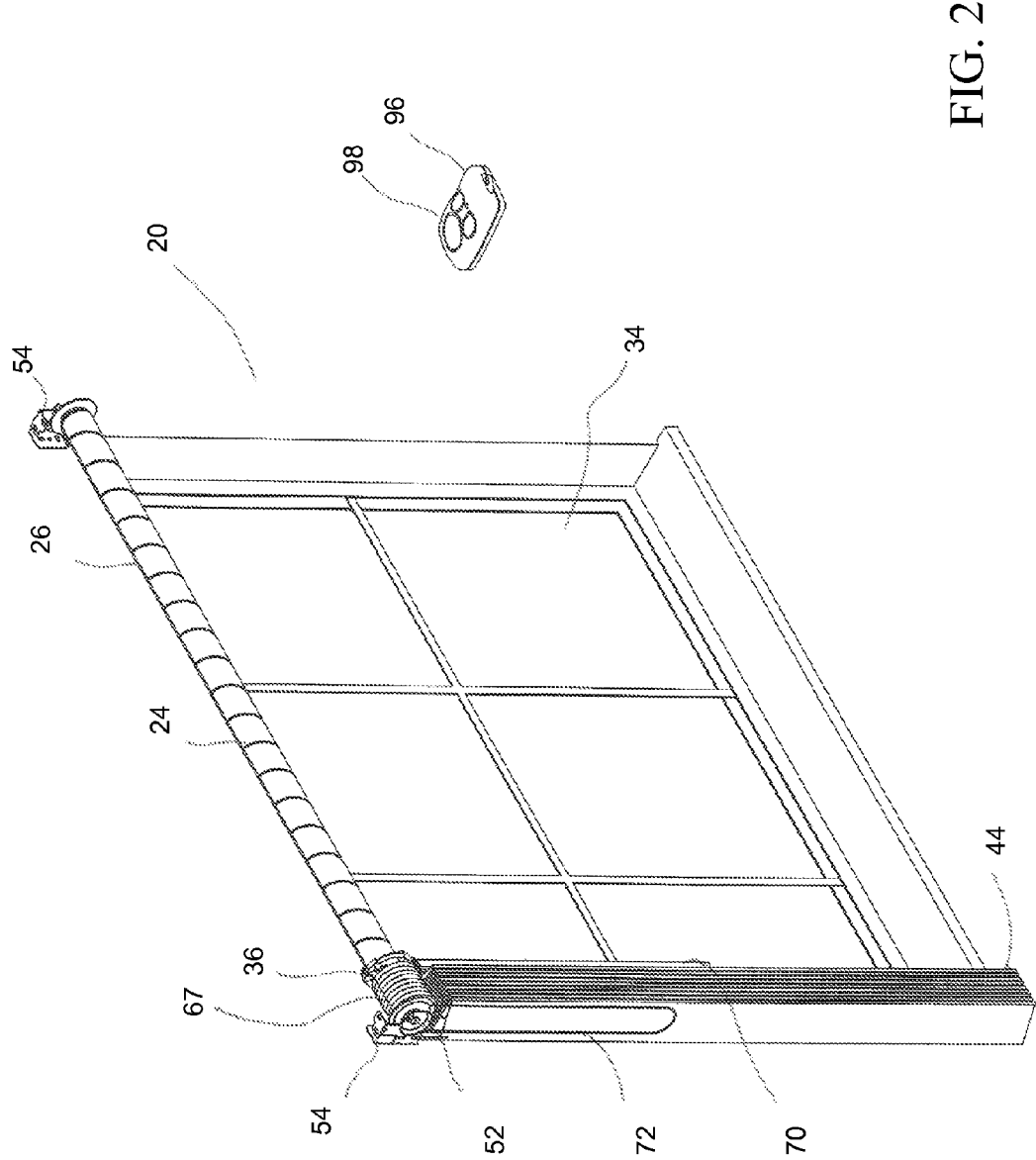
FIG. 2 is a perspective view of one embodiment of the curtain assembly showing the curtain in the stored position and the window is not covered.
Figure 3:
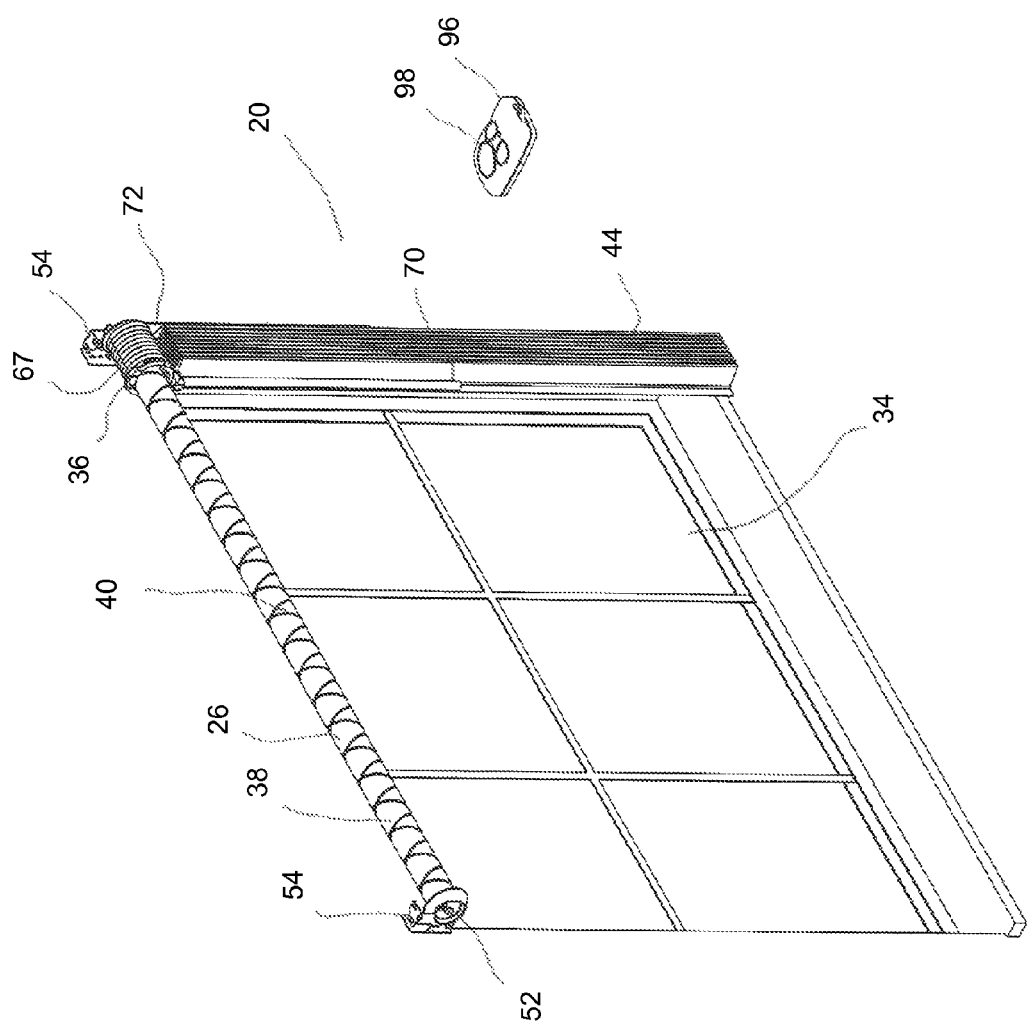
FIG. 3 is a perspective view of one embodiment of the curtain assembly showing a left hand curtain in the stored position.

Referring to FIG. 1, a curtain assembly 20 according to one embodiment of the invention is shown. The curtain assembly 20 comprises a rotatable drive element 22 wherein a helical guide structure 24 is formed into the outer surface 26 of the drive element 22, a drive attachment element 36 having a corresponding structure 62 that communicates with the helical guide structure 24 to move the drive attachment element 36 axially along the drive element 22 when the drive element 22 is rotated and a rotation assembly 32 (not shown) for rotating the drive element 22. In some embodiments of the invention, the helical guide structure 24 is a helical groove 24 and the corresponding structure 62 is a tooth. While the helical guide structure 24 is shown in FIGS. 1-3 as a helical groove, the helical guide structure 24 is not limited to a groove. Similarly, the corresponding structure 36 discussed in the embodiments below is a tooth 62 but is not limited to being a tooth. In some embodiments, one or more curtain supports 67 supported by the rotatable drive element 22 can also be utilized to support the curtain. The drive attachment element 36, as shown in FIGS. 1-3 will be explained further below.

Description of Curtains

As shown in FIG. 1, the curtain 44 used is composed of a single continuous panel of fabric that moves back and forth across the drive element 22 to the deployed position (covering the window) and to the stored position (not covering the window 34). The curtain 44 may extend to the right to the deployed position (covering the window 34) and then gather to the left to the stored position, uncovering the window 34. This is shown in FIGS. 1 and 2. For example, FIG. 1 shows that a curtain 44 extended to the right (deployed position) to cover the window 34 and FIG. 2 shows the curtain 44 gathered to the left (stored position) to uncover the window 34. In other embodiments, the curtain 44 may extend to the left to the deployed position (covering the window 34) and then gather to the right to the stored position (uncovering the window 34). For example, FIG. 3 shows a curtain assembly 20 wherein the curtain 44 is gathered to the right (stored position) to uncover the window 34. Although not shown, the curtain 44 in FIG. 3 would extend to the left to the deployed position to cover the window 34.

Again, although curtain is used to describe a preferred embodiment of the invention, other embodiments utilize other window coverings, such as verticals and draperies.

Figure 4:
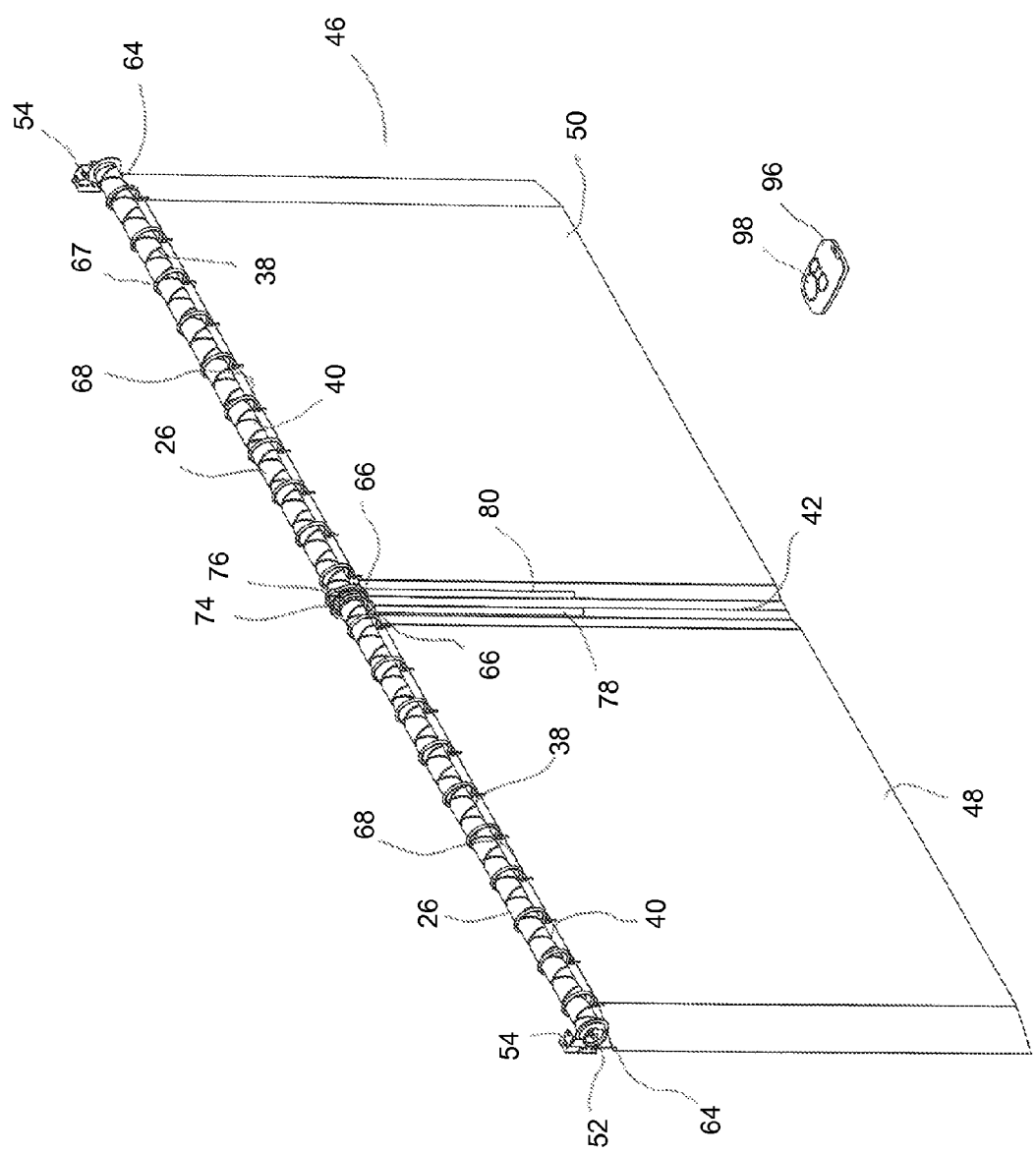
FIG. 4 is an enlarged perspective view of one embodiment of the curtain assembly showing a center closing curtain in the deployed position covering the window.

In some embodiments, the curtain 44 may be a center closing curtain 46. A center closing curtain 46 is composed of two fabric panels, a right panel 50 and a left panel 48 that meet in the center 42 of the window 34 to close and cover the window 34. FIG. 4 shows a curtain assembly 20 where a center closing curtain 46 is used and is in the deployed position. The window 34 is covered in this instance. For example, the right panel 50 extends to the left to the center of the window 42. The left panel 48 extends to the right to the center of the window 42.

Drive Element

Figure 5:
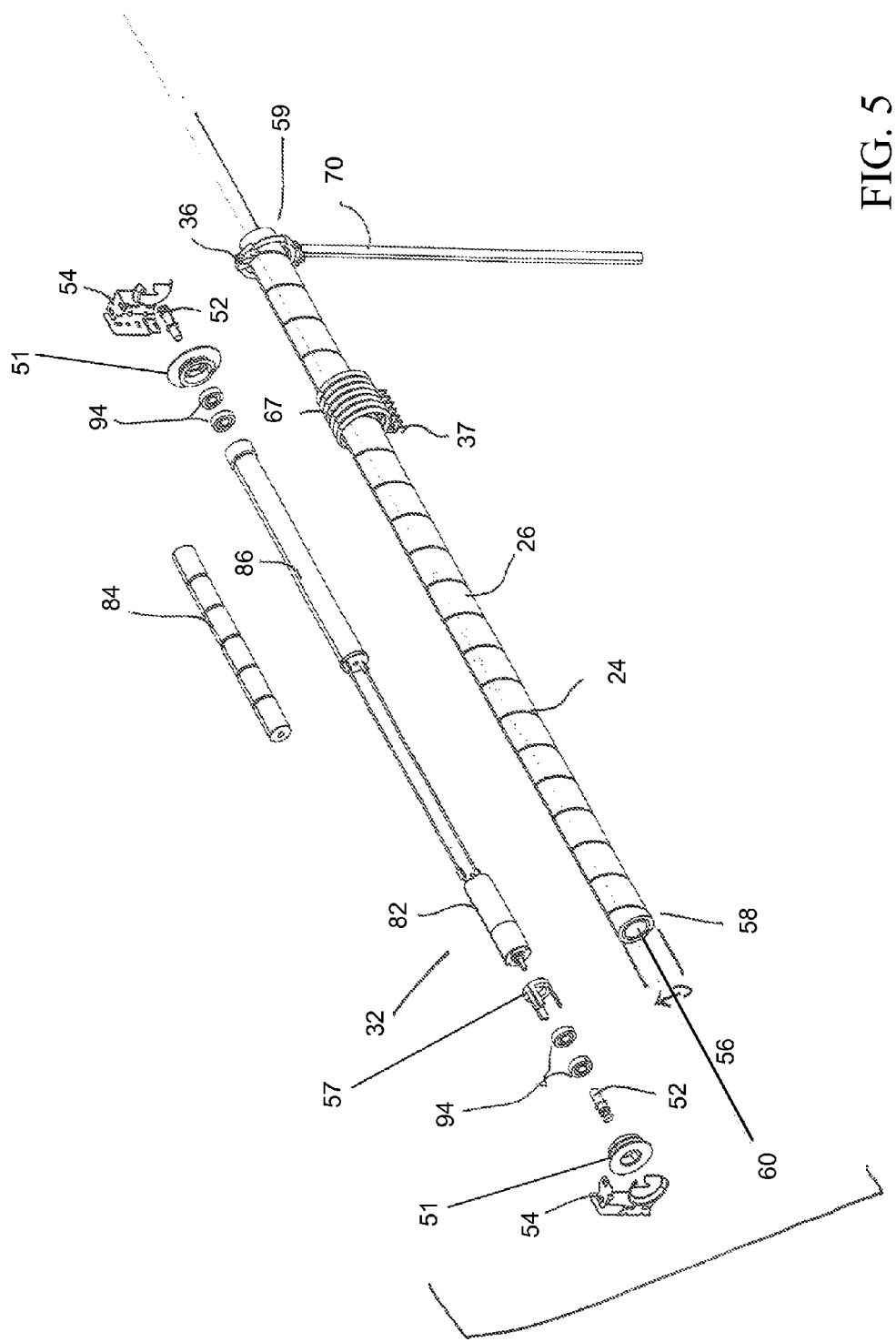
FIG. 5 is an enlarged perspective view of the components of the rotatable drive element according to one embodiment of the curtain assembly in which the rotation of the drive element is powered by a battery operated motor.

The curtain assembly 20 includes a drive element 22. FIGS. 5 and 6 show one embodiment of the drive element 22 in detail. A curtain 44 can be connected to the drive element 22 by one or more curtain supports 36 and 67 as explained below. Alternatively, at least a portion of the curtain can be supported by another structure adjacent to the rotatable drive element 22, such as a support guide (not shown).

The rotatable drive element 22 is designed to be installed above a window 34, or near the top of the window 34, similar to a traditional curtain rod. For example, as shown in FIG. 1, drive element 22 is mounted on axles 52 that are located and secured in the end brackets 54. The end brackets 54 are adapted for connection with, for example, a window frame, sash, or wall. The end brackets 54 may also include a rubber mounting disk 13, not shown, that is compressed, and, optionally, inserted into a finial 95 or other structure to create friction, when the drive element 22 is installed, to hold the drive element 22 firmly in place and minimize noise.

The drive element 22 may vary in size. For example, the drive element 22 may be the width of the window 34, narrower than the window 34, or wider than the window 34. The outer diameter 56 of the drive element 22 may similarly vary. In specific embodiments, the drive element has an outer diameter of the drive element that is 1 inch, 1¼ inches, 1½ inches, 2 inches, 1-2 inches, 1-1½ inches, 1½-2 inches, less than 1 inch, and/or greater than 2 inches. In some embodiments, the drive element 22 has a hollow portion that is sized to mount a motor 82 inside the hollow portion of the drive element 22 rather than mounting the motor 82 outside the drive element 22. Using the inside of the drive element 22 to conceal the motor 82 may give a more aesthetically pleasing design for a curtain assembly 20. Any number of materials, such as aluminum, other metals or alloys, plastics, wood, and ceramics, may be used to fabricate the drive element 22 provided the drive element 22 can support the weight of the curtain 44.

Although the FIGS. 5 and 6 show the outer surface of the drive element 22 as cylindrical in shape, the cross-sectional shape of the drive element 22 is not limited and may be non-circular. In an alternative embodiment, as shown in FIGS. 20 and 21, the rotatable drive element 22 may be tri-lobed.

Guide Structure

The drive element 22 has at least one guide structure 24 formed, for example, on, or into, the outer surface 26 of the drive element 22. For convenience, as a preferred embodiment employs a one or more helical guide structure, it is understood that descriptions of embodiments of the invention having helical guide structures also applies to embodiments having guide structures with other patterns. A preferred guide structure 24 is a helical guide structure 24. Such a guide structure may be a groove in some embodiments, as shown in FIGS. 7-9. The helical guide structure 24, however, is not limited to being a helical groove. For example, the guide structure 24 may be a ridge, protrusion, or other structure that can communicate with the corresponding structure of the drive attachment element to axially move the drive attachment element along the drive element when the drive element is rotated.

The helical groove 24 can extend along a portion of, or the entirety of, the drive element 22. In a preferred embodiment, the helical groove extends from one distal end portion, referred to as the motor end 58, to the opposing distal end portion, referred to as the bearings end 59, of the drive element 22. Alternatively, the helical guide structure 24 can begin and end at any desired point along the longitudinal axis of the drive element 22, and/or stop and start over various portions of the drive element, depending on the application. The length of the helical groove 24 is a factor in determining how far a curtain 44 will travel across the drive element, i.e., the entire length of the drive element 22 as opposed to some shorter section of the drive element 22. The angle of the helical groove determines how far the drive attachment element will move along the drive element for a given amount of rotation of the drive element.

In an embodiment, the helical groove 24 is formed in either a clockwise direction or a counterclockwise direction. FIG. 7 illustrates a drive element 22 having a counterclockwise helical groove 38. FIG. 8 illustrates a drive element 22 having a clockwise helical groove 40.

In one embodiment, the drive element 22 has two helical grooves 24, one formed in the clockwise direction and one formed in the counterclockwise direction. FIG. 9 illustrates a drive element 22 in which there are a counter clockwise helical groove 38 and a clockwise helical groove 40. In yet other embodiments, the drive element 22 may have four helical grooves, two clockwise helical grooves 38 and two counter clockwise helical grooves 40 as shown in FIGS. 22-24.

When two clockwise helical grooves 38 or two counter-clockwise helical grooves 40 are utilized, the two clockwise helical grooves 38, or the two counter-clockwise helical grooves 40 are preferably spaced approximately 180 degrees apart. Other spacings can also be utilized. The clockwise helical grooves 38 and the counterclockwise helical grooves 40 preferably form the same angle with the longitudinal axis. The profile of the helical grooves 38, 40 can be self-centering to allow the drive tooth 62 to traverse the intersection of the clockwise helical groove 38 and the counter clockwise helical groove 40 without binding. A beveled groove, which allows such self-centering, is shown in FIG. 17.

The helical grooves 24 may be formed by forming grooves into the outer surface 26 of the drive element 22 such that the grooves 24 are recessed from the outer surface 26 of the drive element 22. Alternatively, the helical guide structures 24 may be formed as one or more protrusions that project or bulge from the outer surface 26 of the drive element 22. The protrusions may be formed in a variety of manners, for example, by winding material around the outer surface 26 of the drive element 22, forming, e.g., extruding the drive element in a manner that creates indentations in and/or projections from the outer surface of the drive element, or forming the drive element so as to have an outer surface able to apply a force in the longitudinal direction to a structure 62 of the corresponding drive attachment element 36 when the corresponding structure is engaged with the structure 24 upon rotation of the drive element about the longitudinal axis.

In an alternative embodiment, a sleeve, or outer tube 63, having helical guide structure 24 and sized to fit around a portion of the drive element 22 may be used. In this case, the drive sleeve has at least one helical groove 24 in a clockwise or counter clockwise direction formed on the outer surface of the sleeve. The sleeve/outer tube can be interconnected to an inner tube 61, or other inner drive element 9 (e.g., rod), that is rotated so as to cause the rotation of the sleeve/outer tube. The inner drive element 9 can provide sufficient stiffness to keep the sleeve from bending too much along the longitudinal axis of the sleeve from the weight of the curtains, so that the sleeve need not be sufficiently stiff to keep from bending too much along the longitudinal axis of the sleeve from the weight of the curtains. The drive element 22, which then comprises the inner drive element 9 and the outer tube or sleeve, again translates the torque from the rotation assembly to axially movement of the curtain support 67 or drive attachment element 36 across the drive element 22. In an embodiment, the drive sleeve is secured to the inner drive element to form the drive element 22 such that the sleeve does not slide up or down the inner drive element or rotate around the inner drive element 9. It may also be desired to remove the sleeve from the inner drive element 9 and replace it with another sleeve. Using a drive sleeve has the advantage that the geometry of the helical groove 24 including its length may be easily changed by removing the sleeve and replacing it without fabricating a new drive element 22.

The helical grooves 24 may also vary in angle and therefore, may differ in the amount of time (rotations of the drive element) that it takes to travel across the drive element 22. For example, a helical groove 24 with a larger angle, with respect to a plane through a cross-section of the drive element, may create a shorter path for the structure to travel and lead to a faster moving curtain 44 for a certain rotation speed of the drive element. In some embodiments, the angle of the helical grooves 24, with respect to a cross-sectional plane of the drive element, may vary along the drive element in the direction of the longitudinal axis 60 of the drive element 22 such that the curtain 44 may move at different speeds along the drive element 22, for a given rotational speed of the drive element, if desired. The angle of the helical groove 24, with respect to a cross-sectional plane of the drive element, varies from greater than 0 degrees and less than 90 degrees, preferably varies from 10 degrees to 80 degrees, more preferably varies from 20 degrees to 70 degrees, even more preferably varies from 30 degrees to 60 degrees, and is most preferably 45 degrees.

Rotation Assembly

The drive element 22 can be connected to a rotation assembly 33 for rotating the drive element 22, where the rotation of the drive element 22 moves the drive attachment element 36 along the drive element via the helical groove 24 of the drive element 22.

The rotation assembly 33 may be a pull cord 72 connected to the drive element 22 or a motor assembly 32. The drive element 22 may be rotated manually. For example, a pull cord 72 as shown in FIGS. 1-3 may be connected to the drive element 22 such that the drive element 22 can be manipulated manually to rotate when it is desired to deploy or store the curtain 44. The use of pull cords 72 is well known in the art.

A motor assembly 32 may be used to rotate the drive element 22. The motor 82 may be mounted either inside or outside the drive element 22. In one embodiment, the motor 82 is mounted inside the drive element 22 and generally concealed from plain view. Components including axles 52 and bearings 94 may also be located inside the rotatable drive element 22.

A slip ring 28 may be used to transfer current from the power supply external to the drive element 22 to the motor 82 in the drive element 22 as shown in FIG. 6. Alternatively, batteries 84 in a battery tube 86 may be used as shown in FIG. 5 to power the motor 82. The batteries 84 in the battery tube 86 may be in a spring loaded sleeve to assist with loading and unloading the batteries 84 from the battery tube. In some embodiments, a motor drive adapter 92 as shown in FIG. 6 may also be used to securely attach or connect the motor 82 to the drive element 22. In other embodiments, the motor housing fits tightly against the drive element 22 and turns the drive element 22 when the motor output shaft is held in end bracket 54 to prevent it from turning. FIG. 5 shows the interconnection of end caps 51, axles 52, bearings 94, bearing housings 57 (note the bearing housing 57 is shown on the motor end in FIG. 5, but the bearing housing 57 on the battery end is not shown), motor 82, and battery tube 86. FIG. 6 shows a slip ring 28, which is optional, and allows the circuit to be completed while rotating.

In a motorized operation, the user may push a button 98 on a remote control 96 to turn on the motor 82 to rotate the drive element 22 such that the curtain 44 moves across the drive element 22 between a stored position and a deployed position depending on the user's preference. The remote control 96 and button 98 are shown in FIGS. 1-3. In other embodiments, the motor 82 may respond to a signal from the remote control 96 that is initiated by a voice command to the remote control, which then causes the motor 82 to rotate the drive element 22.

The curtain assembly 20 may also include a remote control 96 having a control board that generates a signal when the user makes a selection on the remote control 96. The control board has a transmitter that can wirelessly communicate with a receiver that is remotely located from the transmitter. For example, the receiver may be located in the motor 82 in the drive element 22. The receiver receives the transmitted signal from the transmitter and transmits it to the motor 82, which will cause the motor 16 to turn on, rotate the drive element 22, and moves the curtain 44.

As the drive element rotates, either manually or by a motor 82, the curtain 44 is engaged on the drive element 22 and moves axially along the drive element 22 to either a deployed or stored position.

Curtain Support, Drive Attachment Element and Structure

The curtain assembly 20 can include a drive attachment element 36 having a structure 62 that communicates with the guide structure 24 to move the drive attachment element 36 axially along the drive element 22 when the drive element 22 is rotated. The curtain assembly can also include one or more idler attachment elements 67 that interconnect with the drive element to support the window covering, e.g. curtain. In specific embodiments, the drive attachment element 36 has a corresponding feature 62 that is a tooth 62 as described below.

Figure 12:
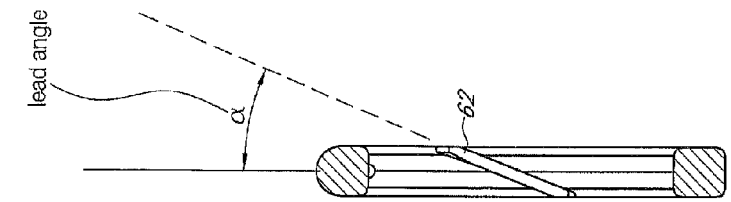
FIG. 12 is an enlarged cross-sectional view of the drive attachment element 36 showing the angle of the drive tooth 62 according to one embodiment.
Figure 10:
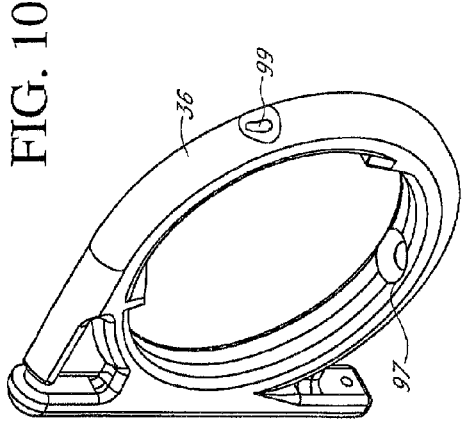
FIG. 10 is an enlarged perspective view of the drive attachment element according to one embodiment.
Figure 11:
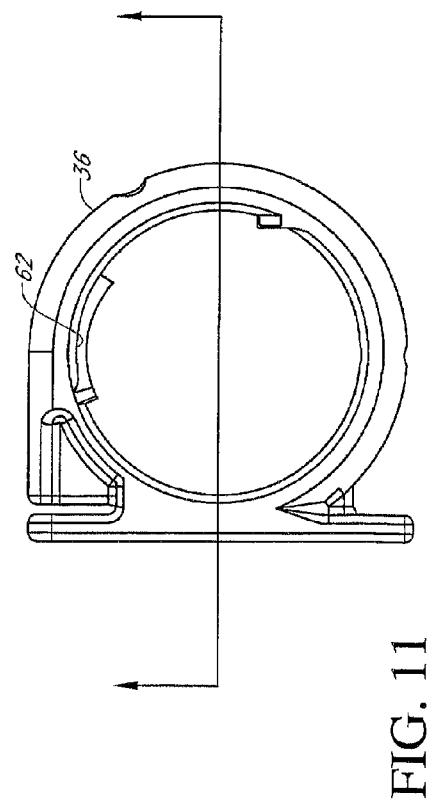
FIG. 11 is an enlarged side view of the drive attachment element 36 showing the structure 62 as a tooth according to one embodiment.

The curtain assembly 20 of the present invention may include in some embodiments at least one drive attachment element 36 having a feature 62 that communicates with a helical guide structure 24 to move the drive attachment element 36 axially along the drive element 22 when the drive element 22 is rotated. The helical guide structure may be a helical groove 24 and the feature 62 may be a tooth. Referring to FIG. 1, one end, such as the motor end, of the curtain can be fixed 64 and the adjacent opposing end, such as the bearings end, of the curtain 66 can be attached to the drive attachment element 36. The feature 62 as a tooth is shown in FIGS. 10-12. FIG. 10 shows an enlarged perspective view of the drive attachment element 36. FIG. 11 is an enlarged side view of the drive attachment element 36 showing the drive tooth 62 according to one embodiment. FIG. 12 is an enlarged cross-sectional view of the drive attachment element 36 showing the angle $\alpha$ (approximately 30 degrees) of the drive tooth 67. This angle $\alpha$ is the same angle as the helical groove makes with respect to a cross-sectional plane of the drive element.

As shown in FIGS. 10-12, the drive attachment element 36 can be ring-shaped and slides over the drive element 22. A different construction, however, may be used for the drive attachment element 36. As an example, the drive attachment element may have one or more additional structures 62, which may follow a corresponding one or more additional grooves, and/or one or more of the structures 62 can be located at a different rotational position with respect to the longitudinal axis of the drive element when the structure is mounted onto the drive element. The drive attachment element 36 is preferably provided with a slot 99 into which a traditional curtain hook 37 can be used to connect the end of the curtain to the drive attachment element 36. Curtain pins and curtain rings that are well known in the art to hang curtains may be used.

The structure 62 is designed to communicate with or engage the helical groove 24 of the drive element to move the drive attachment element 36 axially along the drive element, thereby moving the curtain. In one embodiment, the feature is a tooth formed on an angle on the inner surface of the body of the drive attachment element. The angle $\alpha$ of the drive tooth 62 is specifically designed to engage the helical groove on the drive element 22. In an embodiment, a design consideration is to maximize the amount of contact between the rotating drive element 22 and the drive attachment element 36 to move the weight of the curtain. The location of the tooth 62 with respect to the drive attachment element 36, in some embodiments of the present invention, are adjustable such that the angle the location of the tooth makes with respect to the drive element when the drive attachment element is interconnected to the drive element is adjustable. This adjustability allows the user of the curtain assembly to set the correct location of the drive attachment element(s) 36 in relationship to the axial position along the drive element for a particular rotational position of the drive element, as where the tooth is positioned and where the helical groove is located for a particular angular position of the drive element determines the axial position of the drive attachment element and, therefore, the axial position of the point of the curtain attached to the drive attachment element. In this way, if it is desired for a distal end of the curtain to reach the distal end of the drive element at a particular degree of rotation of the drive element (e.g., 720°, or 3600°), then the relative rotational position of the tooth to the drive attachment element can be adjusted.

In some embodiments, the drive attachment element 36 has a first drive tooth 88 and a second drive tooth 90 as shown in FIGS. 13-16. Both the first drive tooth 88 and the second drive tooth 90 are configured to communicate with different helical grooves 24 of the drive element 22. The first drive tooth 88 and the second drive tooth 90 are positioned inside the drive attachment element 36 at the top and the bottom of the drive attachment element 36, respectively. FIGS. 15 and 16 show cross-sectional views of the top and the bottom of the drive attachment element 36 which show the angle $\alpha_1$ of the first drive tooth and the angle of the second drive tooth $\alpha_2$. The angles $\alpha_1$ $\alpha_2$ are both 45 degrees. The angles $\alpha_1$, $\alpha_2$ of the first drive tooth 88 and the second drive tooth 90 are not limited to 45 degrees and are configured to communicate with the corresponding helical groove 24 of the drive element 22. In a preferred embodiment, also shown in FIGS. 22-26, there are four helical grooves 26. Two are clockwise spirals 38 and two are counter-clockwise 40.

One issue with this type of helical pattern on center closing curtains is keeping the timing of the drive attachment elements and the helical groove such that the two curtains always meet in the center of the opening when the drive element is drive (rotated to the close position. This issue is further complicated by being able to cut down the length of the tube to fit smaller windows. If a quad-helix drive element (two clockwise and two counterclockwise helixes) is cut down to a length that is not a multiple of ½ the pitch of the helixes, the drive attachment elements of the right curtain and the left curtain (for a dual curtain assembly) may not meet in the middle of the drive element. See FIG. 26. The adjustable drive attachment element can allow the teeth to be repositioned inside the drive attachment element such that the drive attachment element can start from a different axial position along the drive element and end at the desired axial position in the center, or other desired axial position. This adjustment of the position of the tooth with respect to the drive attachment element can correct the offset caused by the odd length of the drive element, e.g., from cutting an end off, and allows the right curtain drive attachment element and the left attachment element to meet in the middle.

The gear teeth between the "Clicker" and "Gear Ring" parts of the adjustable drive attachment element, in a specific embodiment, do not allow the "Clicker" to rotate when it is on the tube. In this case, removing the adjustable drive attachment element from the drive element allows the user to adjust the "Clicker" manually by disengaging it from the Gear Ring. The outward force of the drive element on the Clicker's gear teeth essentially locks it into the Gear Ring. Specific embodiments allow the tooth to be repositioned about one inch in either direction. For a drive element where ½ the pitch length is two inches, rotating the tube 180 degrees before installing the adjustable drive attachment element changes the starting position by ½ pitch length, which will correct the adjustable drive attachment element's starting position to an acceptable degree. Although the structure 62 described in the embodiments above is a tooth, other embodiments for the structure 62 may be used as well.

Simple Attachment Elements

The curtain assembly 20 may further comprise a plurality of idle attachment elements 67 connected to the drive element 22 for sliding movement along the drive element 22. The remaining attachment points 68 of the curtain 34 that are not connected to the drive attachment element 36 can then be suspended from the drive element 22 using one or more idler attachment elements 67.

Referring to FIG. 1, the curtain has one fixed end 64 and an adjacent opposing end 66 that is connected to the drive attachment element 36. The remaining ends (or attachment points) of the curtain 68 are positioned between the fixed end 64 and the adjacent opposing end 66 that is connected to the drive attachment element 36. These remaining attachment points 68 may be suspended from the drive element 22 using a plurality of idler attachment elements 67. The idler attachment elements 67 are interconnected to the rotatable drive element 22 as shown in FIGS. 1-4. Such interconnection of idler attachment elements 67 can be such that the idler attachment element surrounds a portion of, or all of, the circumference of the cross-section of the drive element and hangs freely on the drive element. In other embodiments, the idler attachment elements can be also interconnected with a structure external to the drive element.

The idler attachment elements 67 may be shaped similar to the drive attachment element 36. In some embodiments, the idler attachment elements 67 may have a smooth bore to allow free movement along the drive element 22 as the curtain moves. In other embodiments, the idler attachment elements 67 may have a tooth to assist in the movement of the curtain across the drive element. In embodiments having a tooth, the drive element can have a region that frees the tooth when the simple attachment element reaches a certain axial region of the drive element, such as an end of the drive element, going one axial direction, and re-engages the tooth as the idler attachment element is pulled in the other axial direction out of the same axial direction.

As shown in FIGS. 1-4, the idler attachment elements 67 may be rings that slide over the drive element 22. The idler attachment elements 67 may be provided with a slot or a hole (not shown) into which a traditional curtain hook (or loop) 37 is used to attach the remaining attachment points 68 of the curtain 44 to the idler attachment element 67 as shown in FIGS. 4-6. Curtain pins and curtain rings that are well known in the art to hang curtains may be used.

Pull Rods and Programming

In some embodiments, the drive attachment element 36 has a single tooth 62 and is a loose fit on the drive element 22. In these cases, the curtain assembly 20 can include a draw rod 70 connected to the drive attachment element 36 wherein the drive tooth 62 is disengaged from the guide structure 24 of the drive element 22 by applying force on the draw rod 70. The draw rod 70 may be an elongated rod or any other mechanism that is configured to allow the user to manually disengage the drive attachment element 36 from the guide structure 24. The draw rod can then be used to axially move the drive attachment element along the drive element.

The motor 82 for the curtain assembly 20 may be programmed from the factory with a preset number (integer or fractional) of drive element 22 revolutions to move the curtain axially across the drive element 22. There are a variety of reasons, however, why this preset number of revolutions may change. For example, the drive element 22 may be shortened (e.g., cut) to accommodate a narrower window 34 or the curtain has been manually moved with the draw rod 70 and not moved by the pull cord 72.

Therefore, in an embodiment, the initial setup of the motor 82 is able to count the number of revolutions the drive element 22 makes to fully open and fully close the curtain 44. This setup may be accomplished by a setup routine in which a program button is pressed once on a remote control 96 to start the motor 82 moving the curtain 44 and then pressing the button a second time, either to stop the movement or after the movement has stopped, which stores the number of revolutions the curtain 44 has moved.

In a specific embodiment, the number of revolutions can be confirmed by pressing the program button a third time, which reverses the motor 82 and moves the curtain 44 in the opposite direction. Pressing the program button a fourth time, either to stop the curtain 44 or after the movement has stopped, can cause the number of counts to be compared, and set a new count in the memory to complete the set up routine. If the program button on the remote control 96 is not pressed the second time, the motor 82 can run until the preset count is reached, then shut off. Alternatively, the assembly can implement some sort of maximum axial distance detector or force detector, or clutch, such that the motor stops, or stops rotating the drive element, respectively, when a threshold force is encountered trying to move the drive attachment element.

If it is desired to automatically move the curtain after the curtain was manually moved, the user can press the program button twice on the remote control 96, which will cycle the curtain twice. This resynchronizes the curtain movement count by first moving the curtain to one distal end of the drive element followed by moving the curtain 44 to the opposite distal end of the drive section, i.e., two cycles.

When the curtain 44 is moved towards its fully deployed position, as shown in FIG. 1, the drive attachment element 36 is driven by the rotation of the helical groove 24 on the drive element 22 acting on the feature in the drive attachment element until the drive element 22 rotates a set number of revolutions and stops in the fully deployed position.

Center Closing Embodiments

Referring to FIG. 4, a specific embodiment of the curtain assembly 20 is shown in which the curtain 44 used is a center closing curtain 46. As described above, a center closing curtain 46 is composed of two fabric panels, a right panel 50 and a left panel 48, which meet in the center of the window 42 to close and cover the window 34.

The center closing curtain 46 is in the deployed position and the window 34 is covered in FIG. 4. The drive element 22 has a clockwise helical groove 38 and a counter clockwise helical groove 40 formed on the outer surface 26 of the drive element 22. The clockwise helical groove 38 and counter clockwise helical groove 40 have the same angle and oppose each other to create the correct movement of the center closing curtain 46 when the drive element 22 rotates.

To accommodate a center closing curtain 46, the curtain assembly 20 has a left drive attachment element 74 and a right drive attachment element 76 as shown in FIG. 4. The left drive attachment element 74 is connected to the adjacent opposing end 66 of the left panel 48 and the right drive attachment element 76 is connected to adjacent opposing end 66 of the right panel 50. In other words, the left panel 48 has a fixed end 64 and an adjacent opposing end 66 that is connected to the left drive attachment element 74. The right panel 50 has a fixed end 64 and an adjacent opposing end 66 that is connected to the right drive attachment element 76. There may also be a left draw rod 78 and a right draw rod 80 attached to the left drive attachment element 74 and the right drive attachment element 76, respectively.

The tooth 62 of the right drive attachment element 76 can follow the counter-clockwise helical groove 40 and the tooth 62 of the left drive attachment element 74 can follow the clockwise helical groove 38, such that when the drive element is rotated in a first rotational direction the left panel 48 and right panel 50 both close and when the drive element is rotated in the opposite direction the left panel 48 and right panel 50 both open. In a specific embodiment, the drive element has only one or more clockwise helical grooves 24 on the left end of the drive element, on which the closed left panel 48 hangs, and the drive element has only one or more counter-clockwise helical grooves on the right end of the drive element, on which the closed right panel 50 hangs.

Dual Curtain

Referring to FIGS. 27-30, a dual curtain assembly 1 is provided. The dual curtain assembly 1 comprises a rotatable drive element 22 wherein at least one helical structure 24 is formed on the outer surface 26 of the drive element 22; curtain drive elements 36A and 36B having a corresponding structure that communicates with the helical structure 24 to move the curtain supports axially along the drive element 22 when the drive element 22 is rotated and; a rotation assembly 33 for rotating the drive element 22.

In some embodiments of the invention, the helical structure 24 is a helical groove and the corresponding structure is a tooth. While the helical structure 24 is shown in FIGS. 27-30 as a helical groove, the helical structure is not limited to a groove. Similarly, the corresponding structure discussed below in some embodiments is a tooth but is not limited to being a tooth. In some embodiments, the curtain support includes an outer curtain outer curtain drive attachment element 36A and an inner curtain drive element 36B as shown in FIGS. 27-30 and explained further below.

The curtain assembly 1 may further comprise an outer curtain 44A and an inner curtain 44B; the outer curtain 44A is suspended from the rotatable drive element 22 while the inner curtain 44B is suspended from hooks 17 in carrier tracks 12 and 81 that move along the support guide 11. The rotatable drive element 22 comprises at least one drive element 22 having opposing distal end portions 35, 36, where the distal end having the motor can be referred to as the motor end 58 and the other distal end can be referred to as the bearing end 59, wherein at least one helical groove 24 is formed in either a clockwise direction or a counterclockwise direction on the outer surface 26 of the drive element 22 extending from one distal end portion 35, 36 of the drive element 22 to the opposing distal end portion 35, 36 of the drive element 22.

When the drive element 22 is rotated, either the outer curtain 44A or the inner curtain 44B will move along the drive element 22, while the other curtain is held in place in a non-driving or stall area. Once the moving driver attachment element 36A or 36B has reached a stall area at the end of the drive element 22, the non-moving driver attachment element will be tugged to engage the helical groove 24. This movement of the outer curtain 44A and the inner curtain 44B, along the helical groove 24 of the drive element 22 is explained in greater detail below. Whether the outer curtain 44A moves or the inner curtain 44B moves is determined by the sequence of the movement of the curtains. A system for selecting either the outer curtain 44A or the inner curtain 44B is explained below.

As shown in FIG. 27, the outer curtain 44A and inner curtain 44B may be composed of a single continuous panel of fabric that moves back and forth across the drive element 22 to the deployed position (covering the window 34) and to the stored position (not covering the window 34). Although, there is no limitation on the type of fabric used for the curtains 44A and 44B, in one embodiment, the outer curtain 44A is a blackout curtain and the inner curtain 44B is a sheer curtain. Using a blackout curtain with a sheer curtain to cover the same window 34 allows the user to use the sheer curtain when some light is desired and then also to use the blackout curtain when no light is desired. For example, the blackout curtain may be stored and the sheer curtain may be deployed, if some light is desired and privacy is needed. The blackout curtain may be deployed and the sheer curtain may be deployed when no light is desired. The blackout curtain may be stored and the sheer curtain may also be stored, when light is desired and privacy is not needed. The dual curtain assembly 1 disclosed herein allows for these combinations of positions for the outer curtain 44A (blackout curtain) and the inner curtain 44B (sheer curtain) as shown in FIGS. 27-30.

FIG. 27 illustrates a curtain assembly 1 when the outer curtain 44A is a blackout curtain in the deployed position and the inner curtain 44B is a sheer curtain in the deployed position. Therefore, in FIG. 27, the window 34 is covered by the outer curtain 44A or the blackout curtain and the inner curtain 44B. FIG. 28 illustrates a curtain assembly 1 when the outer curtain 44A is a blackout curtain in the stored position and the inner curtain 44B is a sheer curtain in the deployed position. The window 34 is covered by the sheer curtain and the blackout curtain is stored in this instance. FIG. 29 illustrates a curtain assembly 1 when the outer curtain 44A is a blackout curtain in the stored position and the inner curtain 44B is a sheer curtain in the stored position. The window 34 is left uncovered in this instance.

FIG. 30 illustrates the preferred embodiment curtain assembly 1 when the outer curtain 44A is a blackout curtain in the deployed position and the inner curtain 44B is a sheer curtain in the deployed position. Therefore, in FIG. 27, the window 34 is covered by the outer curtain 44A or the blackout curtain and the inner curtain 44B. Further, the outer curtain has the stationary end attached to the end bracket 54 and the movable end wrapped around the other end bracket 54 on the distal end. There is also a cut away area to show the position of an external power supply 43.

Drive Element and Drive Section

The rotatable drive element 22 and drive element 22 will now be explained in detail below. The curtain assembly 1 includes a rotatable drive element 22. FIGS. 31 and 32 show the rotatable drive element 22 and its components in greater detail. Both the outer curtain 44A and the inner curtain 44B are connected to the rotatable drive element 22 by the outer curtain outer curtain drive attachment element 36A or the inner curtain attachment drive element 5 or various attachment and suspension elements as explained below. The rotation assembly 33 which rotates the drive element 22 moves these attachment drive elements which are connected to the curtains 44A and 44B separately across the drive element 22.

The rotatable drive element 22 is designed to be installed above a window 34 similar to a traditional curtain rod. For example, as shown in FIG. 27, drive element 22 is mounted on axles 52 that are located and secured in the end brackets 54. The end brackets 54 are adapted for connection with a window frame, sash or wall. The end brackets 54 may also include a rubber mounting disk 13 that is compressed when the drive element 22 is installed to hold the drive element 22 firmly in place and minimize noise.

The drive element 22 is connected to a rotation assembly 33 for rotating the drive element 22 wherein the rotation of the drive element 22 moves the outer curtain drive attachment element 36A and the inner curtain drive element 36B separately across the helical groove 24 of the drive element 22. The rotation assembly 33 may be a draw cord 72 connected to the drive element 22 or a motor 82. The drive element 22 may be rotated manually. For example, a draw cord 72 as shown in FIGS. 27-29 may be connected to the drive element 22 such that the drive element 22 can be manipulated manually to rotate when it is desired to deploy or store the curtains 44A or 44B. The use of pull cords 72 is well known in the art.

The drive element 22 may also be connected to a motor 82, which can be used to rotate the drive element 22. The motor 82 may be mounted either inside or outside the drive element 22. In one embodiment, the motor 82 is mounted inside the drive element 22 and generally concealed from plain view. Components including axles 52 and bearings 94 may also be located inside the rotatable drive element 22. A slip ring 28 may be used to transfer current from the power supply 43 external to the drive element 22 to the motor 82 in the drive element 22 as shown in FIG. 32. Alternatively, batteries 84 in a battery tube 86 may be used as shown in FIG. 31 to power the motor 82. The batteries 84 in the battery tube 86 may be in a spring loaded sleeve to assist with loading and unloading batteries 84 from the battery tube 86. In some embodiments, the motor drive adapter 27 as shown in FIG. 59 may also be used to securely attach or connect the motor 82 to the drive element 22. In other embodiments, the motor housing 53 fits tightly against the drive element 22 and turns the drive element 22 when the motor output shaft 87 is held in end bracket 54 to prevent it from turning.

In a motorized operation, the user may push a button 98 on a remote control 96 to turn on the motor 16 to rotate the drive element 22 such that the sequence selected curtain 44A or 44B moves across the drive element 22 between a stored position and a deployed position depending on the user's preference. The remote control 96 and button 98 are shown in FIGS. 27-29. In other embodiments, the remote control may respond to a voice command and send a signal to the motor controls, which then causes the motor 82 to rotate the drive element 22.

The curtain assembly 1 may also include a remote control 96 having a control board which generates a signal when the user makes a selection on the remote control 96. The control board has a transmitter which can wireless communicate with a receiver which is remotely located from the transmitter. For example, the receiver may be located in the drive element 22. The receiver receives the transmitted signal from the transmitter and transmits it to the motor 82, which will cause the motor 82 to turn on, rotate the drive element 22, and moves one of the curtains 44A or 44B.

As the drive element 22 rotates, either manually or by a motor 82, the outer curtain drive attachment element 36A or the inner curtain drive attachment element 36B is engaged on the drive element 22 and moves across the drive element 22 to either a deployed or stored position while the other curtain 44A or 44B remains in place. When the moving curtain 44A or 44B reaches the end of the drive element 22, the stationary curtain 44A or 44B will be pulled into engagement with the helical groove 24 and move across the drive element 22 to a new position.

The rotatable drive element 22 is preferably cylindrical in shape as shown in FIGS. 31, 32, 34, and 59, which shows the drive element 22 having an inner tube, referred to as an inner drive element 9, and an outer tube or sleeve 63. However, the shape of inner drive element 9 and an outer tube or sleeve 63 of the drive element 22 are not limited and can be non-circular. In an alternative embodiment, as shown in FIG. 60, the rotatable drive element 22 may be tri-lobed. In this case the drive element is a spiraled tube having creases that a ball bearing can ride in.

The drive element 22 may vary in size. For example, the drive element 22 may be the width of the window 34 or it may be wider than the window 34. There is no limitation on the diameter of the drive element 22 other than space needed inside a room. Preferably, the drive element 22 is configured to mount a motor 82 inside the drive element 22 rather than mounting the motor 82 outside the drive element 22. Using the inside of the drive element 22 to conceal the motor 82 may give a more aesthetically pleasing design for a curtain assembly 1 or 20. Any number of materials may be used to fabricate the drive element 22 provided the drive element 22 can support the weight of the outer and inner curtains 44A, 44B.

The drive element 22 comprises a guide structure 24, such as a helical groove, over at least one or more portions of the length of the drive element 22. The drive element 22 has opposing distal end portions 35, 59 and may be any length along the longitudinal axis 60 of the drive element 22. The longitudinal axis 60 of the drive element 22 is shown in FIGS. 27-30. The length of the guide structure along the drive element 22 is a factor in determining how far the curtain 44A or 44B will travel across the drive element 22, i.e., the entire length of the drive element 22 as opposed to some shorter section of the drive element 22.

In an embodiment, the drive element 22 has at least one helical groove 24 that is formed in either a clockwise direction or a counterclockwise direction on the outer surface 26 of the drive element 22 extending from one distal end portion 35, 59 of the drive element 22 to the opposing distal end portion 35, 59 of the drive element 22. FIG. 49 illustrates a left hand drive element 22 in which the helical groove 24 is in a clockwise direction and also illustrates a right hand drive element 22 in which the helical groove 24 is in a counterclockwise direction.

In some embodiments, the drive element 22 may have two helical grooves 24, one formed in the clockwise direction and one formed in the counterclockwise direction as shown in FIG. 59. A drive element 22 having a drive element 22 with helical grooves 24 in both directions is particularly useful for center closing curtains 46 as explained below.

In the preferred embodiment, the drive element 22 may have two helical grooves 24 in the same direction, where the inner drive attachment element 36B has two teeth 5a and 5b spaced 180 degrees apart and the outer drive attachment element 36A has two teeth 4a and 4b spaced 180 degrees apart, such that tooth 4a, and tooth 5a, engages one of the helical grooves and tooth 4b, and tooth 5b, engages the other helical groove at the same time, respectively, so as to add stability with respect to driving Drive attachment element 36A, and 36B, respectively.

In other embodiments, the drive element preferably has four helical grooves 24, two clockwise helical grooves 24 and two counterclockwise helical grooves 24 as shown in FIG. 59. A cross-sectional view of the rotatable drive element having four helical grooves 24, two clockwise helical grooves and two counterclockwise helical grooves is shown in FIG. 59. Helical grooves are preferably spaced approximately 180 degrees apart. The clockwise helical grooves 24 and the counterclockwise helical grooves 24 preferably opposed each other and are spaced 180 degrees apart. The profile of the helical grooves 24 is self-centering to allow the first outer drive tooth 4a and the first inner drive tooth 5a to traverse the intersection of the clockwise helical groove and the counter clockwise helical groove without binding.

The helical groove 24 forms a path through the drive element 22 of the drive element 22 as shown in FIGS. 27-30. As the drive element 22 rotates, one of the curtains 44A or 44B is pulled along the helical groove 24 across the drive element 22 into a deployed or stored position. Both the clockwise and the counterclockwise helical grooves 24 will cause the curtain 44A or 44B to move axially across the drive element 22 when the drive element 22 rotates and the curtain drive elements 36A or 36B are engaged with the helical groove 24.

The helical grooves 24 may be formed by forming grooves into the outer surface 26 of the drive element 22 such that the grooves are recessed from the outer surface 26 of the drive element 22. Alternatively, the helical grooves 24 may be formed as protrusions that project or bulge from the outer surface 26 of the drive element 22. The protrusions may be formed any means, for example, by winding material around the outer surface 26 of the drive element 22.

The angle of the helical groove 24 may vary and therefore, may differ in the amount of time that it takes to travel across the drive element 22. For example, a helical groove 24 with a larger angle may create a shorter path for the curtain 44A, 44B to travel and result in a faster moving curtain 44A or 44B for a given rotational speed of the drive element. In some embodiments, the angle of the helical grooves 24 may vary along the drive element 22 such that the curtain 44A, 44B may move at different speeds along the drive element 22, for a given rotational speed of the drive element, if desired. The angle of the helical groove 24 preferably varies from 30 degrees to 60 degrees and is most preferably 45 degrees.

In an alternative embodiment, the drive element 22 may be formed from a drive sleeve or outer tube 63 that is sized to fit around a portion of an inner drive element 9, which can be, for example, an inner tube 61. In this case, the drive sleeve has at least one helical groove 24 in a clockwise or counter clockwise direction formed on the outer surface of the sleeve. The drive element 22 must be able to translate the torque from the rotation assembly to axially movement of the curtain support or attachment elements 36A, 36B across the drive element 22, and the drive sleeve may be made from a high lubricity material. Therefore, the drive sleeve can be secured to the inner drive element 9 such that the sleeve does not slide up or down the drive element 22 or rotate around the inner drive element 9. It may also be desired to remove the sleeve from the inner drive element 9 and replace it with another sleeve. Using a sleeve to form the drive element 22 has the advantage that the helical groove 24 or the length of the drive element 22 may be easily changed by removing the sleeve and replacing it without fabricating a new drive element 22.

Attachment Elements and Teeth

In some embodiments, the curtain assembly 1 may include at least one outer curtain drive attachment element 36A connected to the drive element 22 and has a drive teeth 4a and 4b that communicates with the helical groove 24 to move the outer curtain drive attachment element 36A axially along the drive element 22 when the drive element 22 is rotated. The outer curtain drive attachment element 36A is connected one end of the outer curtain 44A. The curtain assembly 1 may include at least one inner drive attachment element 36B connected to the drive element 22 and has a drive teeth 5a and 5b that communicates with the helical groove 24 to move the inner drive attachment element 36B axially along the drive element 22 when the drive element 22 is rotated. The inner drive attachment element 36B is connected one end of the inner curtain 44B.

FIGS. 45-47 show the front and cross-sectional views of the outer curtain drive attachment element 36A as well as the drive teeth 5a and 5b. Both the first outer drive tooth 5a and the second outer drive tooth 5b are configured to communicate with the helical groove 24 of the drive element 22. The first outer drive tooth 5a and the second outer drive tooth 5b are positioned inside the outer drive attachment element 36A which shows the angle α of one drive tooth and both the angles are 45 degrees.

FIGS. 39-41 show the front and cross-sectional views of an embodiment of an inner drive attachment element as well as the drive teeth 4a and 4b. Both the inner drive tooth 4a and the inner drive tooth 4b are configured to communicate with the helical groove 24 of the drive element 22. The inner drive tooth 4a and the inner drive tooth 4b are positioned inside the drive attachment element which shows the angle α of one drive tooth and both the angles are 45 degrees. In this embodiment, the inner carrier attachment post 31 is located at a portion of the inner drive attachment element designed to interconnect with a carrier in the inner curtain carrier track 81.

FIGS. 36-38 show the front and cross-sectional views of an alternative inner drive attachment element 36B as well as the drive teeth 4a and 4b. Both the inner drive tooth 4a and the inner drive tooth 4b are configured to communicate with the helical groove 24 of the drive element 22. The inner drive tooth 4a and the inner drive tooth 4b are positioned inside the drive attachment element which shows the angle α of one drive tooth and both the angles are 45 degrees. In this embodiment, the inner carrier attachment post 31 can be the same as the outer carrier attachment post 6 of FIGS. 45-47 designed to interconnect with a carrier in the outer curtain carrier track 12, and the attachment points of the inner curtain can attach via hooks to the receiver for hooks 99.

As shown in various figures, the outer curtain outer curtain drive attachment element 36A and the inner curtain drive element 36B are ring-shaped and slide over the drive element 22. Although a different construction may be used for the outer curtain outer curtain drive attachment element 36A and the inner curtain drive element 36B, they are be able to connect to the appropriate ends of the outer curtain 44A and the inner curtain 44B and engage the helical groove 24 and move across the drive element 22.

The outer curtain outer curtain drive attachment element 36A is preferably provided with a slot or a hole 99 into which a traditional curtain hooks or pins can be used to connect the ends and upper edge of the outer curtain 44A to the appropriate attachment element. FIG. 34 illustrates an example of the hole 99 and a pin hook 14 on an outer curtain idler attachment element 67A. In another embodiment, as shown in FIG. 60, a traditional curtain ring is used. The inner curtain 44B is suspended by S-hooks 17 in inner curtain carrier track 81 in support guide 11. Curtain pins, hooks and rings are well known in the art to hang curtains 44A, 44B.

The drive tooth 5a on the outer drive attachment element 36A and the drive tooth 4a on the inner drive attachment element 36B may have the same construction. The outer drive tooth 5a and the inner drive tooth 4a are both designed to engage with the helical groove 24 of the drive element 22 to drive the curtain 44A or 44B across the drive element 22. In one embodiment, the drive tooth 5a is formed on an angle inside the body of the outer curtain drive attachment element 36A. The angle is specifically designed to engage the helical groove 24 on the drive element 22. A design consideration is to maximize the contact between the rotating drive element 22 and the outer drive attachment element 36A and/or inner drive attachment element 36B to carry the weight of the curtain 44A or 44B. The outer curtain outer curtain drive attachment element 36A and the drive teeth 5a and the inner curtain drive attachment element 36B teeth and the inner curtain teeth 4a, in some embodiments of the present invention, are adjustable. The adjustability of these components allow the user of the curtain assembly to set the correct timing on the location of the outer curtain drive attachment element(s) 36A and inner curtain drive attachment element(s) 36B in relationship to the helical grooves 24.

Although the curtain support described in the embodiments above is an outer curtain outer curtain drive attachment element 36A and an inner curtain drive attachment element 36B, other embodiments for the curtain support may be used as well.

Outer Curtain Idler Attachments

The curtain assembly 1 may further comprise a plurality of outer curtain idler attachment 67A connected to the rotatable drive element 22 for sliding movement along the drive element 22 wherein the adjacent ends of the outer curtain 44A that are not connected to the outer curtain drive attachment element 36A are suspended from the drive element 22 using one or more outer idler attachment elements 67A.

The outer curtain 44A has the movable end connected to the outer drive attachment element 36A. The non-movable end of the outer curtain 44A can be attached to the end bracket 54. Outer idler attachment elements 67A may be used to suspend the remaining attachment points of outer curtain 44A to the drive element 22. The outer idler attachment elements 67A are connected to the rotatable drive element 22 as shown in FIGS. 31-32 and 34-35. An enlarged view of the outer idler attachment 67A is shown in FIGS. 42-44.

The outer idler attachment 67A may be shaped similar to the outer drive attachment element 36A and inner drive attachment element 36B. The outer idler attachment 67A can have a smooth bore to allow free movement along the drive element 22 of the tube as the curtain 44A is moved or may have a tooth on each outer idler attachment 67A to assist in the movement of the curtain 44A.

The outer idler attachments are also linked to the outer curtain carriers 69 by the insertion of the outer carrier attachment post 6 on the outer idler attachment elements 67A into the aperture 55 on outer curtain guide carrier 69. The outer current carriers are then positioned in the outer curtain carrier track 12 in the support guide 11. This prevents the outer curtain idler attachment 67A from rotating or binding the rotation of the element 22.

The outer curtain idler attachment 67A are preferably provided with a slot or a hole 99 into which a traditional curtain hook or pin can be used to attach the ends of the outer curtain 44A to the outer curtain idler attachment. FIG. 42 illustrates an example of this hole 99 and a pin hook 14 on an outer curtain idler attachment 67A.

The inner curtain 44B can have the stationary end connected to the end bracket 54 and other end attached to the inner drive attachment element 36B. The inner curtain carrier track 81 and hooks 17 may be used to suspend the remaining attachment points of the inner curtain 44B to the inner curtain carrier track 81 of the support guide 11 along the axis of the drive element 22.

The outer curtain 44A is connected to the outer drive attachment element 36A and the inner curtain 44B is attached to the inner drive attachment element 36B. This arrangement ensures that the outer curtain 44A and inner curtains 44B drive attachment elements 36A and 36B are linked together on the same drive element 22 and they are able to move in sequence across the drive element 22.

Outer Driver Stall Area and Inner Driver Stall Area

The curtain assembly 1 preferably includes at least one outer driver stall area 100 positioned to one end of the drive element 22 to engage and disengage the outer drive attachment element 36A from the helical groove 24 of the drive element 22.

The curtain assembly 1 also preferably includes at least one inner driver stall area 15 positioned on the distal end of the drive element 22 that is configured to hold the inner curtain drive element 36B in place while the outer drive attachment element 36A moves through the drive element 22.

FIGS. 33-34 show an outer driver stall area 100 at one distal portion 35, 59 of the drive element 22. FIG. 51 shows the inner driver stall area 15 at the opposing distal end 35, 59 of the drive element 22. FIG. 49 shows a rotatable drive element 22 having an outer driver stall area 100 at each distal end portion of the drive element 22 and an inner driver stall area 15 positioned in between the two stall areas s 100. The rotatable drive element 22 shown in FIG. 49 will accommodate the outer curtains 44A and inner curtains 44B, as center closing curtains.

Enlarged views showing details of the outer driver stall area 100 are shown in FIG. 34. The outer driver stall area 100 is a section of the drive element 22 along the drive element 22 without a helical groove 24 formed on the outer surface 26 of the drive element 22. The outer driver stall area 100 interrupts the movement of the outer curtain 44A or the inner curtain 44B along the helical groove 24 therefore allowing the curtain assembly 1 to change which attachment element (either the outer curtain drive attachment element 36A or the inner curtain drive element 36B) is engaged with the helical groove 24.

The outer driver stall area 100 also serves to collect or provide a space for the outer curtain idler attachment elements 67A as well as the outer curtain drive attachment element 36A. For example, when the outer curtain drive attachment element 36A is engaged and moves through the drive element 22, it will reach the outer driver stall area 100 at the end of the drive section. The outer driver stall area 100 stops the movement of the outer curtain drive attachment element 36A in the helical groove 24 and temporarily stores the outer curtain drive attachment element 36A. The outer curtain idler attachment elements 67A that are holding the remaining adjacent end of the curtain 44A are pushed by the outer curtain drive attachment element 36A and ultimately stack up in the outer driver stall area 100 until the outer curtain drive attachment element 36A becomes disengaged with the helical groove 24 and will remain stalled until the drive element 22 rotates in the opposite direction. As this disengagement occurs, the outer curtain drive attachment element 36A pushes against the outer curtain idler attachment 67A in the outer driver stall area 100 which moves the inter-curtain engager 49 toward the end bracket 54. The inner curtain 44B, being the correct length, pulls the inner curtain drive element out of the inner driver stall area 15 and into engagement with the helical grooves 24.

In some embodiments, the inner driver stall area 15 is positioned at the distal end 59 of the drive element 22 opposite the outer driver stall area 100 and functions to hold the inner curtain drive element 36B stalled in place. In other embodiments, at least one inner driver stall area 15 is positioned between two outer driver stall areas 100, as shown in FIG. 49. The position of the inner driver stall area 15 on the drive element 22 defines the end of the portion of the drive element 22 where the inner curtain drive element 36B travels on the drive element 22.

As described above, FIG. 27 shows a curtain assembly 1 when the outer curtain 44A (blackout) is in the deployed position and the inner curtain 44B is also in the deployed position. At this moment, the outer curtain 44A is fully extended and the curtain drive attachment element 36A is in the helical groove 24 at one distal end of the drive element 22 and the inner curtain drive element 36B is in the inner driver stall area 15 at the same end of the drive element 22. To change the positions of the curtains such that the outer curtain 44A is in the stored position and the inner curtain 44B stays in the deployed position as shown in FIG. 28, the drive element 22 starts to rotate in the opposite direction. The rotation of the drive element 22 will move the outer curtain drive attachment element 36A, attached to outer curtain 44A, collapsing curtain 44A into the stored position until outer curtain drive attachment element 36A moves into the outer driver stall area 100 where it will push against the outer idler attachment elements 67A in the outer driver stall area and force the inter-curtain engager 49 toward the end bracket 54 creating a tug pressure on the inner curtain 44B and the inner curtain drive element 36B because the inner curtain 44B is the correct length and extended. This tug pressure pulls the inner curtain drive element 36B out of the inner driver stall area 15 and into engagement with the helical groove 24 positioning the curtains as shown in FIG. 28. When the inner curtain 44B is fully extended, the inner curtain drive element 36B will move into the inner driver stall area 15. Because the inner curtain is now extended, the outer curtain drive attachment element 36A will be pulled into the helical groove 24 prepared to deploy the outer curtain 44A. Because the inner driver stall area 15 does not have a helical groove 24, the inner curtain attachment 36B element is prevented from moving or stalled along the drive element 22.

As the outer drive attachment element 36A moves through the drive element 22, the outer curtain 44A will move from the stored position to the fully deployed position and the outer drive attachment element 36A moves up to and against the inner curtain drive element 36B in the inner driver stall area 15 and stops the drive element 22 from rotating. The curtain assembly 1 will then be as shown in FIG. 27, with the outer curtain 44A in the deployed position and the inner curtain 44B in the deployed position.

To move the inner curtain 44B to the stored position as shown in FIG. 29, the drive element 22 will rotate and the outer drive attachment element 36A moving into the outer driver stall area 100 will pull the inner curtain drive element 36B from the inner driver stall area 15 thereby engaging the inner curtain drive element 36B with the helical groove 24. The inner curtain drive element 36B will move the curtain 3 through the drive element 22 from the deployed position to the stored position at the other distal end of the drive element 22 until the inner curtain drive element 36B pushes against the outer drive attachment element 36A and stops the drive element 22 from rotating. At this point, the inner drive attachment element 36B is engaged with the helical groove 24.

Guide Mechanism

The curtain assembly 1 preferably includes a support guide 11 wherein the guide means facilitates the movement of the outer and inner curtains 44A, 44B along the drive element 22 without misalignment. The support guide 11 may also assist with the spacing of the curtain panels when the outer curtain 44A or the inner curtain 44B is fully extended in the deployed position.

In one embodiment, the support guide 11 is an elongated pair of channels positioned parallel to the rotatable drive element 22. The support guide 11 is shown in several of the figures, including an end view in FIG. 48. The inner curtain carrier track 81 and the outer curtain carrier track 12 are the same part but are numbered differently and discussed differently because their functions are different. The inner curtain carriers 93 have apertures 55 where an inner carrier attachment post 31 on the inner curtain drive element 36B is inserted at one end of the inner curtain and an inner carrier attachment post 31 on the inter-curtain engager 49 is inserted on the other end. The remaining inner curtain carriers 93 have S-hooks 17 inserted into the aperture 55 as known in the art.

The outer drive attachment element 36A and the outer curtain idler attachment 67A preferably have a hanger pin hole 99 wherein the pin hooks 14 are connected to the attachment elements and support the outer curtain 44A. Further, these attachment elements 36A and 67A to the outer curtain 44A are guided and held from rotation by the insertion of the outer carrier attachment posts 6 into the apertures 55 in curtain carriers 69 riding in the outer curtain carrier track 12 in support guide 11.

This arrangement provides the user with the option of manually operating the movement of the curtains 44A or 44B across the drive element 22. For example, the user may decide to manually operate the curtain assembly 1. The user could turn off the motor 82 and rotate the drive element 22 manually by using the pull cord 72.

The motor 82 for the curtain assembly 1 may be programmed from the factory with a preset number of drive element 22 revolutions to move the curtain the width of the window 34 opening. However, there are a variety of reasons why this preset number of revolutions may change. For example, the drive element 22 may be shortened to accommodate a narrower window 34.

Therefore, the initial setup of the motor 82 may be able to count the number of revolutions the drive element 22 makes to fully open and fully close the curtains 44A or 44B. This may be accomplished by a setup routine where pressing a program button 98 on a remote control 96 once to start the motor 82 moving the curtain 44A, 44B and then pressing the button 98 another time to stop the movement which will store the number of revolutions the curtain 44A, 44B has moved.

The number of revolutions can be confirmed by pressing the program button 98 a third time, which will reverse the motor 16 and move the curtain 44A, 44B in the opposite direction. Pressing the program button 98 a fourth time will stop the curtain 44A, 44B, compare the counts, and set a new count in the memory to complete the set up routine. If the program button 98 on the remote control 96 is not pressed the inner time, the motor 82 will run until the preset count is reached, then the motor 82 will shut off. If the number of revolutions is ever lost, the controls can reset a zero position when the outer curtain drive attachment element 36A stops the drive element 22 from rotating when the outer curtain 44A is fully deployed, as shown in FIG. 52 or when the outer curtain 44A and the inner curtain 44B are fully stored and the inner curtain drive element 36B stops the drive element 22 from rotating, as shown in FIG. 54.

In specific embodiments, the drive element 22 stops rotating when the inner driver attachment element 36B and the outer driver attachment element 36A are brought into contact at either end of the drive element. When the inner driver attachment element 36B and the outer driver attachment element 36A are brought into contact, the inner driver attachment element 36B and the outer driver attachment element 36A bind together and their teeth bind in the drive element's grooves. The interconnection of the inner driver attachment element 36B and the outer driver attachment element 36A to the support guide 11 in opposite orientations helps to cause this binding. Once the inner driver attachment element 36B and the outer driver attachment element 36A bind together, the drive element is bound, and the controller board senses that the driver element is no longer rotating and stops running the motor.

In specific embodiments, the stall area 100 and/or 15 prevents one of the inner driver attachment element 36B and the outer driver attachment element 36A from moving down the drive element 22. When the inner driver attachment element 36B and the outer driver attachment element 36 meet each other, the axial force (down the rotational axis of the rotating drive element) binds the stalled driver to the still-driving driver. This, coupled with the weight of the curtain hanging from the outer driver and the interconnection of the inner driver attachment element 36B and the outer driver attachment element 36A to the support guide, causes the driver whose teeth are still engaged to the tube to bind up with the rotational drive element. At that point, this driver is being torqued so as to try and rotate around the axis of rotation and prevented from such rotation by the support guide, which stalls the motor and signals the controller board to stop running the motor.

The dual curtain assembly mounted in rubber mounting disk 13 increases the sensitivity of motion such that a person can pull on the stored or deployed curtain and activate the motor to move the curtain in the opposite direction from the last movement. The motor controls will count the number of revolutions and when the predetermined count is matched it will shut the motor down.

Center Closing Embodiments

An alternative embodiment of the dual curtain assembly 1 is shown in FIGS. 49 and 50 in which the outer curtain 44A and the inner curtain 44B are center closing curtains. A center closing curtain is composed of two fabric panels, a right panel and a left panel, that meet in the center of the window 34 to close and cover the window 34. In FIG. 50, the outer curtain 44A is a center closing blackout curtain that is in the deployed position and the inner curtain 44B is a center closing sheer curtain that is also in the deployed position. In FIG. 49, the outer curtain 44A is a center closing blackout curtain that is in the stored position and the inner curtain 44B is a center closing sheer curtain that is in the deployed position. In this embodiment, the drive element 22 of the drive element 22 preferably has four helical grooves 24, two formed in the clockwise direction and two formed in the counterclockwise direction. For example, the opposing helical grooves 24 shown in FIG. 59 create the correct movement of the center closing curtains with one motor 82 turning the drive element 22 in one direction. FIG. 59 shows an enlarged cross-sectional view of the rotatable drive element according to one embodiment of the curtain assembly showing the four helical grooves formed on the outer surface of the drive element. FIG. 59 also shows an enlarged perspective view of the rotatable drive element according to one embodiment of the curtain assembly showing the four helical grooves formed on the outer surface of the drive element.

To accommodate center closing curtains, the curtain assembly 1 has a left outer drive attachment element 36A, a right outer drive attachment element 36A, a left inner drive element 36B and a right inner drive attachment element 36B as shown in FIGS. 49 and 50. The left outer drive attachment element 36A is connected to one end of the left panel of the outer curtain 44A. The right outer drive attachment element 36A is connected to one end of the right panel of the outer curtain 44A. The left inner drive element 36B is connected to an adjacent end of the left panel of the inner curtain 44B and the opposite end of the inner curtain is attached to the end bracket 54. The right inner drive attachment element 36B is connected to adjacent end of the right panel of the inner curtain 44B and the opposite end of the inner curtain is attached to the end bracket 54.

FIG. 49 shows an embodiment of a rotatable drive element 22 in which the outer curtain 44A and the inner curtain 44B are both center closing curtains. There is an outer driver stall area 100 positioned at each distal end of the rotating drive element 22 and an inner driver stall area 15 positioned between the outer driver stall area s 100. For example, there is a left outer driver stall area 100 positioned along the drive element 22 to engage and disengage the left outer drive attachment element 36A from the helical groove 24 of the drive element 22 and a right outer driver stall area 100 positioned along the drive element 22 to engage and disengage the right outer drive attachment element 36A from the helical groove 24 of the drive element 22. The inner driver stall area 15 is configured to hold the left inner n drive element 36B in place while the left drive attachment element 36B moves through the drive element 22. The same inner driver stall area 15 is also configured to hold the right inner drive attachment element 36B in place while the right inner drive attachment element 36B moves through the drive element 22. Alternative embodiments can have two separate inner driver stall area 15. FIG. 49 illustrates that the left and right inner drive attachment elements 36B will meet in the center 42 of the window 34 when the outer curtain 44A is deployed and the inner curtain 44B is stored to minimize light leakage. Therefore, the single inner driver stall area 15 in some embodiments is wide enough to fit both the left inner curtain drive attachment element 36B and the right inner curtain drive attachment element 36B.

FIGS. 63A-63L show flowcharts implemented by the control system for specific embodiments of the invention.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A method of operating a window covering assembly, the steps comprising:
providing a drive element extending a lateral length from a first end to a second end, the drive element having a first clockwise helical guide structure and a first counterclockwise helical guide structure wherein the first clockwise helical guide structure and first counterclockwise helical guide structure intermittently intersect one another;
positioning a first drive attachment element around the drive element;
attaching shade material to the first drive attachment element;
operably connecting a motor to the drive element such that operation of the motor rotates the drive element;
driving the first drive attachment element in a first lateral direction by rotating the drive element in a first rotational direction thereby moving the shade material from an open position to a closed position;
driving the first drive attachment element in a second lateral direction, opposite the first lateral direction, by rotating the drive element in a second rotational direction, opposite the first rotational direction thereby moving the shade material from a closed position to an open position.

2. The method of claim 1, further comprising the step of engaging the first drive attachment element with the first clockwise helical guide structure.

3. The method of claim 1, wherein the first clockwise helical guide structure is a groove and the first counterclockwise helical guide structure is a groove.

4. The method of claim 1 wherein the drive element includes a second clockwise helical guide structure and a second counterclockwise helical groove.

5. The method of claim 1 wherein the drive element includes a second clockwise helical guide structure positioned on an opposite side of the drive element from the first clockwise helical guide structure; and a second counterclockwise helical guide structure positioned on an opposite side of the drive element from the first counter clockwise helical guide structure.

6. The method of claim 1, further comprising the steps of: positioning a second drive attachment element around the drive element; driving the second drive attachment element in an opposite lateral direction from the first drive attachment element as the drive element is rotated.

7. The method of claim 1 wherein the first clockwise guide structure and the first counterclockwise guide structure are grooves.

8. The method of claim 1 wherein the drive element is formed of two or more tubes connected together in end-to-end relation.

9. A method of operating a window covering assembly, the steps comprising:
providing a drive element extending a lateral length from a first end to a second end, the drive element having a first clockwise helical groove and a first counterclockwise helical groove wherein the first clockwise helical groove and the first counterclockwise helical groove intermittently intersect one another;
engaging a tooth of a first drive attachment element with the first clockwise helical groove; engaging a tooth of a second drive attachment element with the first counterclockwise helical groove;
operably connecting a motor to the drive element such that the motor operably rotates the drive element;
attaching shade material to the first drive attachment element;
driving the first drive attachment element and the second drive attachment element simultaneously in opposite lateral directions by rotating the drive element in a single rotational direction thereby moving the shade material from an open position to a closed position or from a closed position to an open position.

10. The method of claim 9 wherein the drive element is formed of two or more tubes connected together in end-to-end relation.

11. The method of claim 9 wherein the drive element includes a second clockwise helical groove and a second counterclockwise helical groove.

12. A method of operating a window covering assembly, the steps comprising:
providing a drive element extending a lateral length having a first clockwise helical groove and a first counterclockwise helical groove wherein the first clockwise helical groove and the first counterclockwise helical groove intermittently intersect one another;
placing a first drive attachment element around the drive element;
attaching shade material to the first drive attachment element;
placing a second drive attachment element around the drive element;
attaching shade material to the second drive attachment element;
rotating the drive element by a motor such that the first drive attachment and second drive attachment element are driven in opposite lateral directions thereby moving the shade material from an open position to a closed position or from a closed position to an open position.

13. The method of claim 12 further comprising the steps of:
engaging the first drive attachment element with the first clockwise helical groove; and engaging the second drive attachment element with the first counterclockwise helical groove.

14. The method of claim 12 wherein the drive element includes a second clockwise helical groove and a second counterclockwise helical groove.

15. The method of claim 12 wherein the drive element is formed of two or more tubes connected together in end-to-end relation.

16. A method of operating a window covering assembly, the steps comprising:
providing a drive element extending a lateral length and having an axis of rotation extending along the lateral length of the drive element, the drive element having a first clockwise helical groove and a second clockwise helical groove positioned on an opposite side of the drive element from the first clockwise helical groove, the drive element having a first counterclockwise helical groove and a second counterclockwise helical groove positioned on an opposite side of the drive element from the first counterclockwise helical groove wherein the first clockwise helical groove and the first counterclockwise helical groove intermittently intersect one another;

attaching first shade material to the drive element;

opening the first shade material by rotating the drive element in a first rotational direction;

closing the shade material by rotating the drive element in a second rotational direction.

17. The method of claim 16 further comprising the step of connecting the first shade material to the drive element by a first drive attachment element positioned around the drive element.

18. The method of claim 16 further comprising the step of connecting a second shade material to the drive element by a second drive attachment element positioned around the drive element.

19. The method of claim 16 wherein the drive element is formed of two or more tubes connected together in end-to-end relation.

* * * * *